(12) United States Patent
Harada et al.

(10) Patent No.: US 11,864,685 B2
(45) Date of Patent: Jan. 9, 2024

(54) COFFEE MACHINE

(71) Applicant: DAITO GIKEN, INC., Tokyo (JP)

(72) Inventors: Takeo Harada, Tokyo (JP); Masato Saito, Tokyo (JP)

(73) Assignee: DAITO GIKEN, INC., Tokyo (JP)

( * ) Notice: Subject to any disclaimer, the term of this patent is extended or adjusted under 35 U.S.C. 154(b) by 0 days.

(21) Appl. No.: 18/025,098

(22) PCT Filed: Feb. 18, 2022

(86) PCT No.: PCT/JP2022/006674
§ 371 (c)(1),
(2) Date: Mar. 7, 2023

(87) PCT Pub. No.: WO2022/196246
PCT Pub. Date: Sep. 22, 2022

(65) Prior Publication Data
US 2023/0240468 A1   Aug. 3, 2023

(30) Foreign Application Priority Data
Mar. 19, 2021 (JP) ................................ 2021-045956

(51) Int. Cl.
*A47J 31/42* (2006.01)
*A47J 42/16* (2006.01)
*A47J 42/46* (2006.01)

(52) U.S. Cl.
CPC .............. *A47J 31/42* (2013.01); *A47J 42/16* (2013.01); *A47J 42/46* (2013.01)

(58) Field of Classification Search
CPC .. A47J 31/42; A47J 42/06; A47J 42/16; A47J 42/46

USPC .......................................................... 99/286
See application file for complete search history.

(56) References Cited

U.S. PATENT DOCUMENTS

| | | | | |
|---|---|---|---|---|
| 5,193,438 | A * | 3/1993 | Courtois | A47J 42/18 99/289 R |
| 7,350,455 | B2 * | 4/2008 | Vetterli | A47J 42/50 99/280 |
| 11,166,585 | B2 * | 11/2021 | Ceotto | A47J 31/42 |
| 2013/0082130 | A1 | 4/2013 | Hulett et al. | |
| 2019/0038064 | A1 * | 2/2019 | Kihara | A23F 5/262 |
| 2021/0307558 | A1 * | 10/2021 | Lee | A47J 31/42 |

FOREIGN PATENT DOCUMENTS

| | | |
|---|---|---|
| JP | H05-44026 U | 6/1993 |
| JP | 2005-245305 A | 9/2005 |
| JP | 2014-530684 A | 11/2014 |

(Continued)

OTHER PUBLICATIONS

Apr. 12, 2022 International Search Report issued in International Patent Application No. PCT/JP2022/006674.

(Continued)

*Primary Examiner* — Reginald Alexander
(74) *Attorney, Agent, or Firm* — Oliff PLC

(57) ABSTRACT

A coffee machine provided with a second grinder for grinding coffee beans, and provides a coffee machine that is controlled in consideration of a state for grinding coffee beans in the grinder. A coffee machine including a second grinder for grinding coffee beans, in which an input amount of coffee beans to be put into the second grinder is controlled.

3 Claims, 47 Drawing Sheets

(56) References Cited

FOREIGN PATENT DOCUMENTS

| JP | 2018-69136 A | 5/2018 | | |
|---|---|---|---|---|
| JP | 2019-30433 A | 2/2019 | | |
| JP | 2020-78778 A | 5/2020 | | |
| WO | WO-2020161630 A1 | * | 8/2020 | ............ A47J 31/404 |

OTHER PUBLICATIONS

Apr. 26, 2022 Japanese Office Action issued in the corresponding Japanese Application No. 2021-045956.
Sep. 20, 2022 Decision to Grant a Patent issued in Japanese Patent Application No. 2021-045956.
Jun. 24, 2022 Written Opinion issued in Japanese Patent Application No. 2021-045956.
Jun. 24, 2022 Written Amendment issued in Japanese Patent Application No. 2021-045956.

* cited by examiner

[Figure 1]
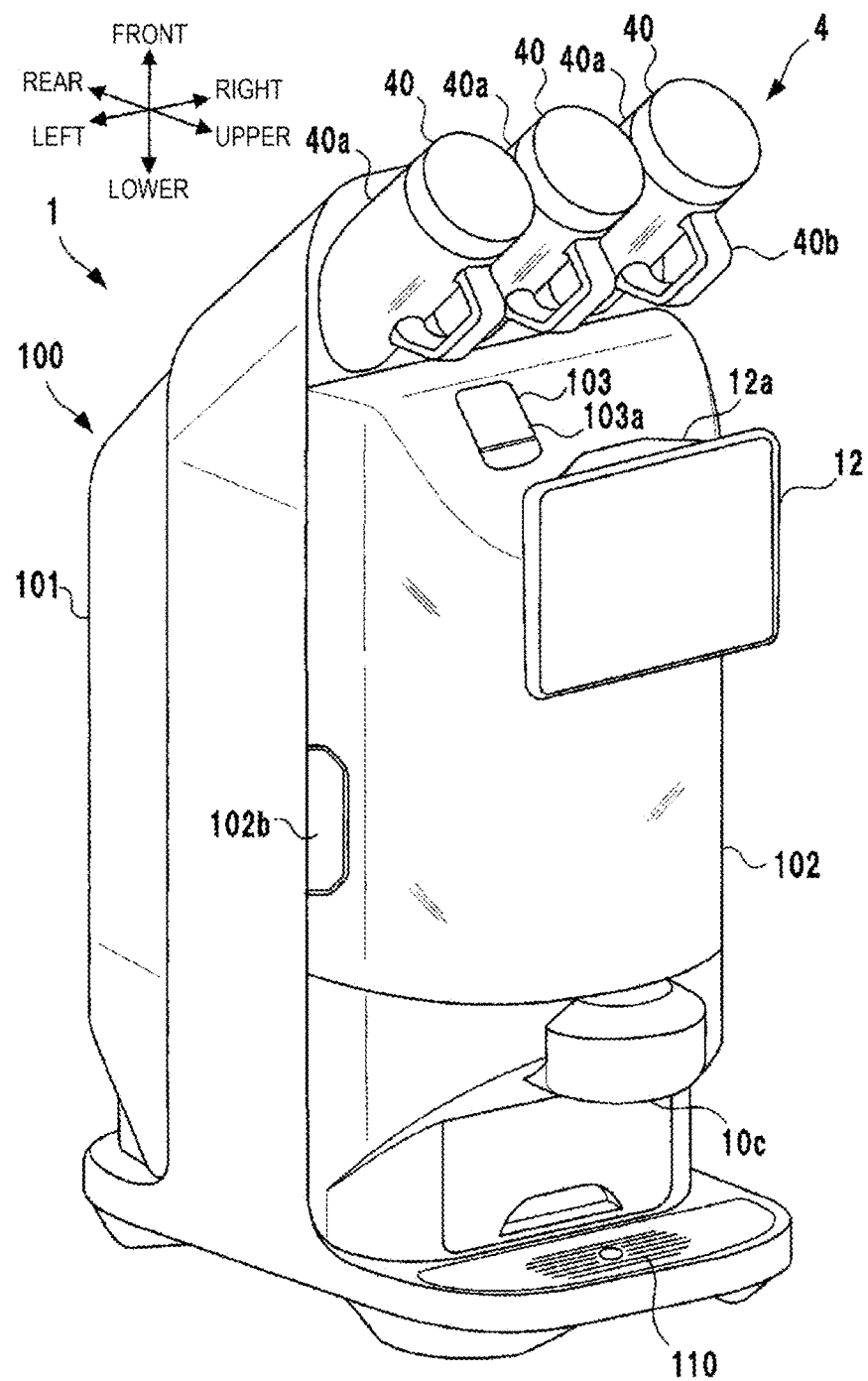

[Figure 2]
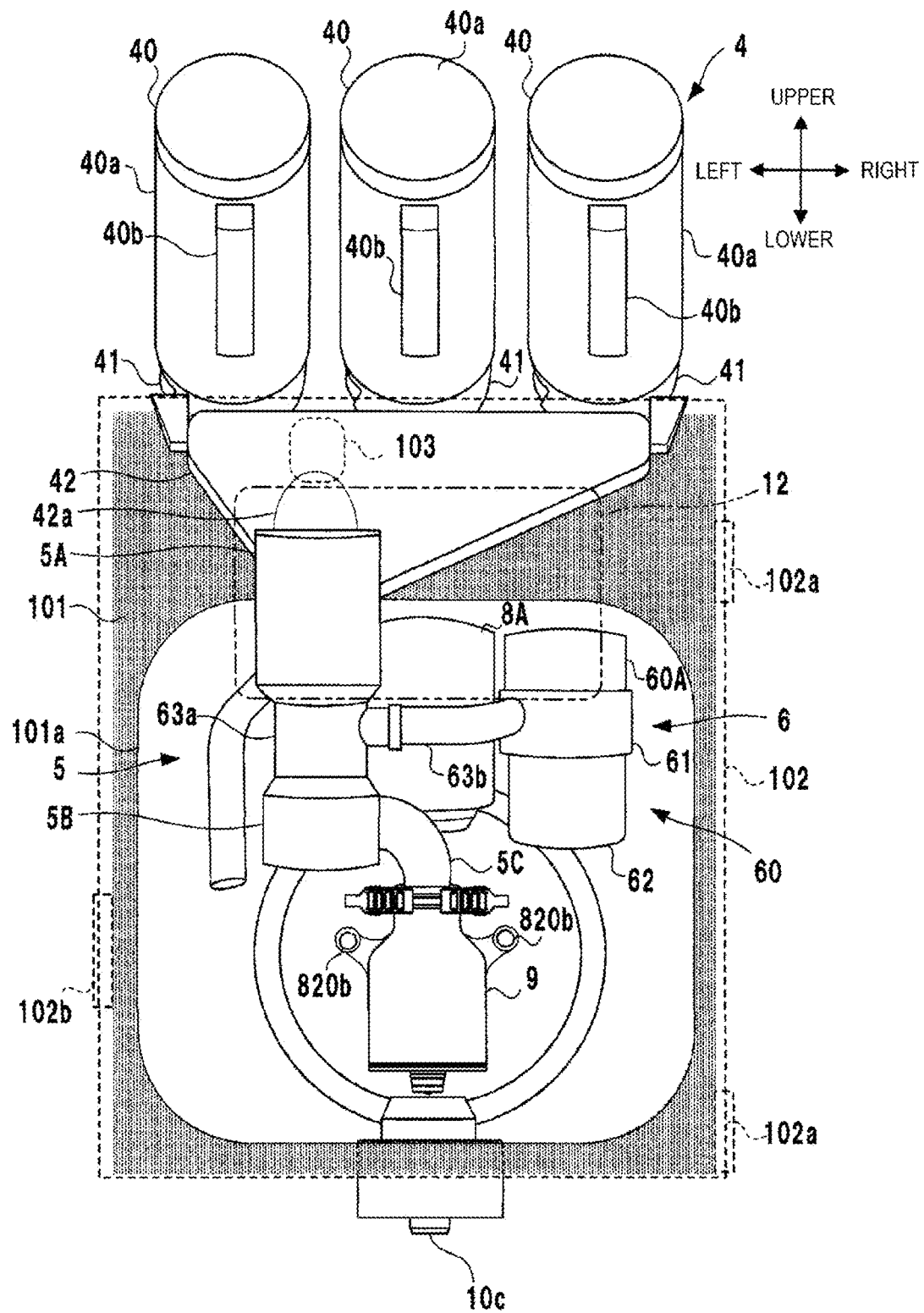

[Figure 3]
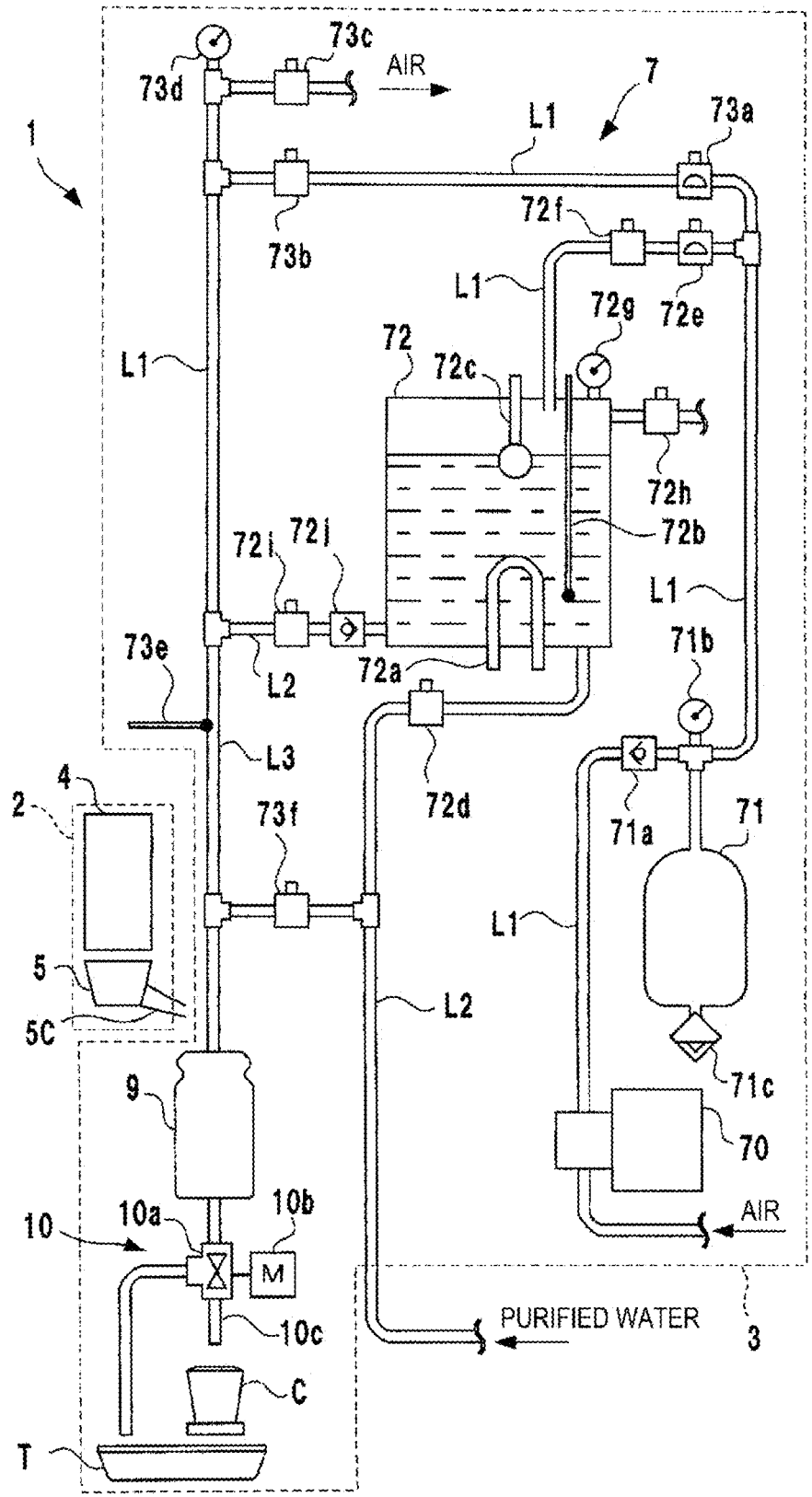

[Figure 4]
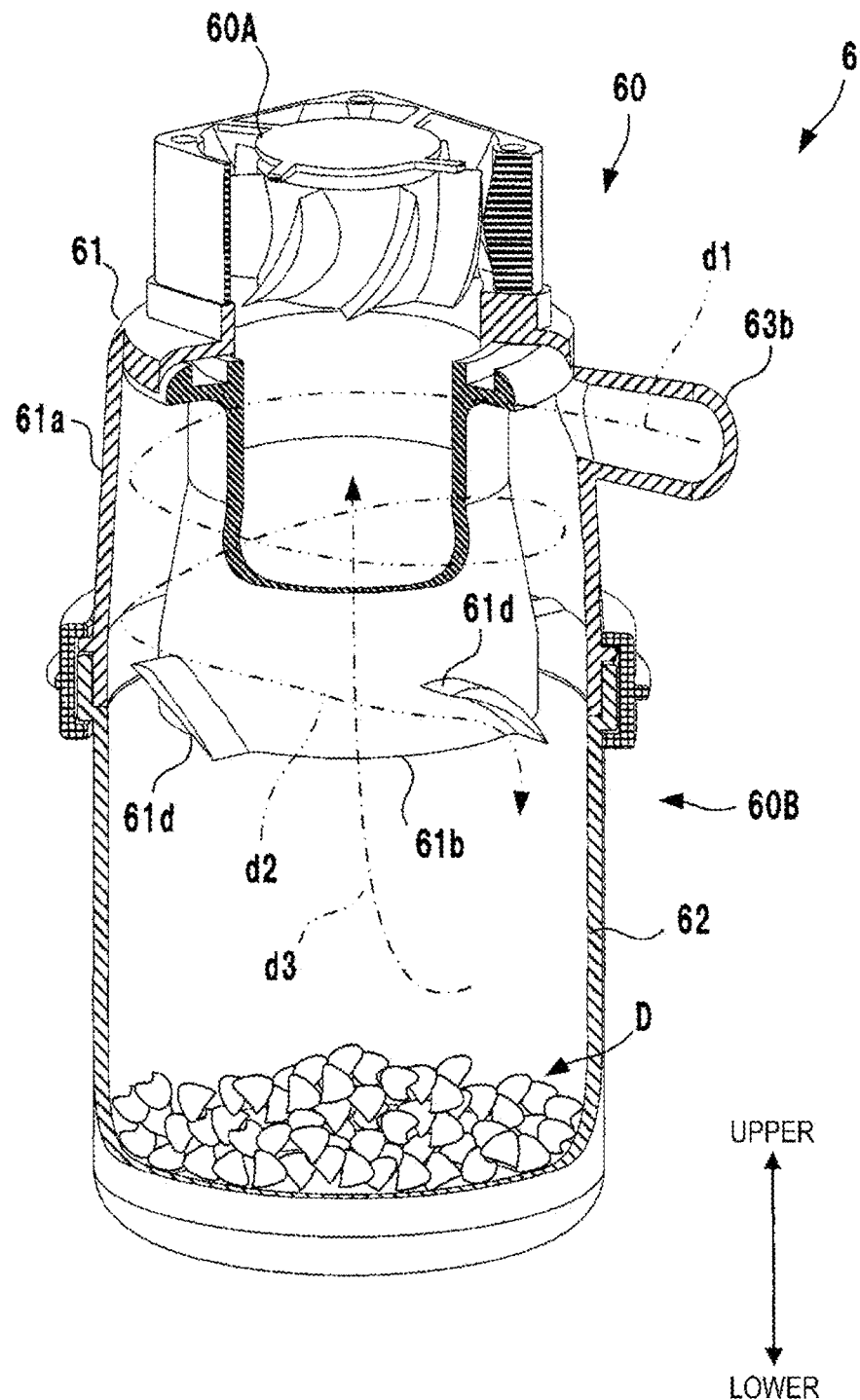

[Figure 5]
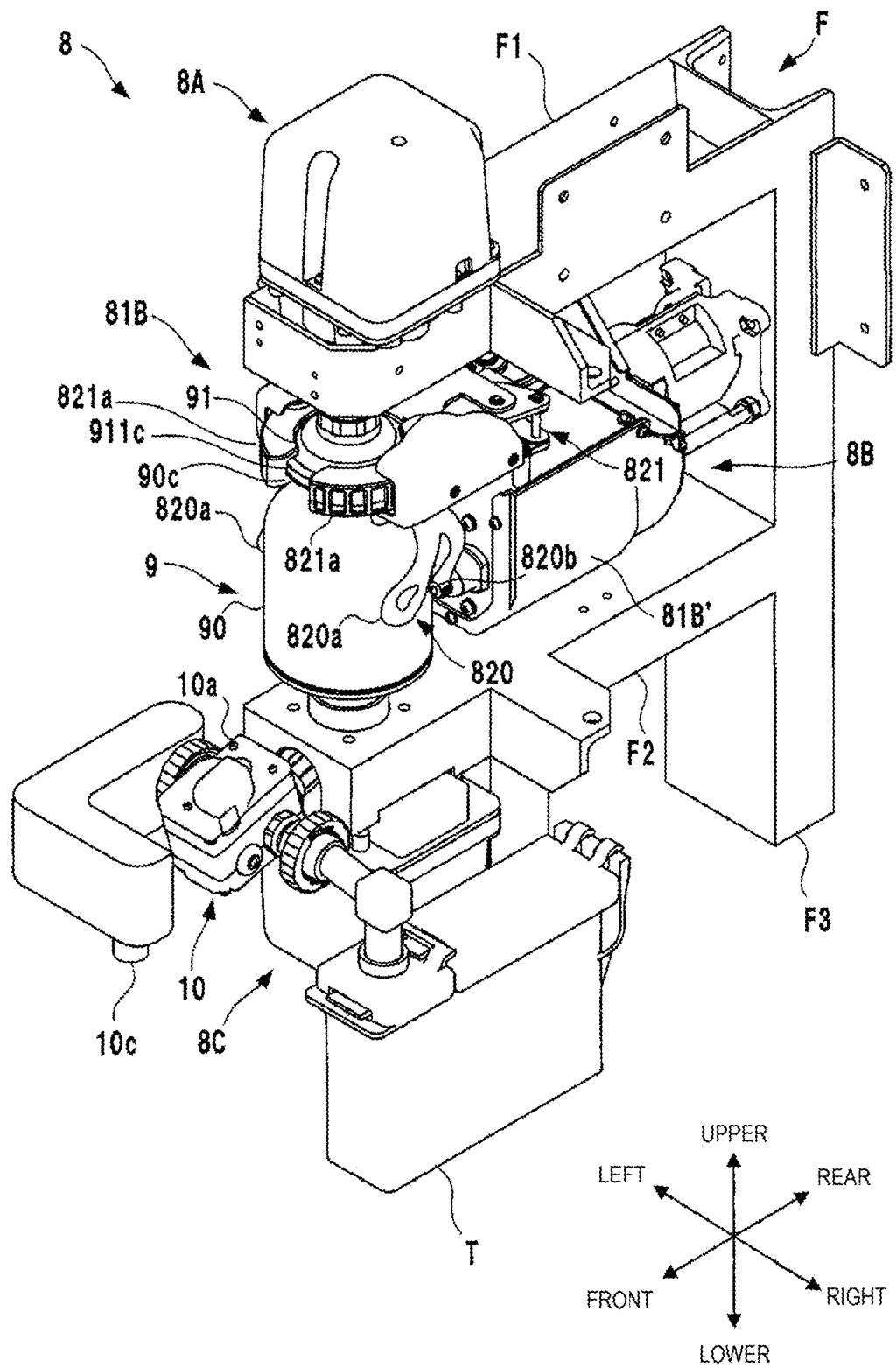

[Figure 6]
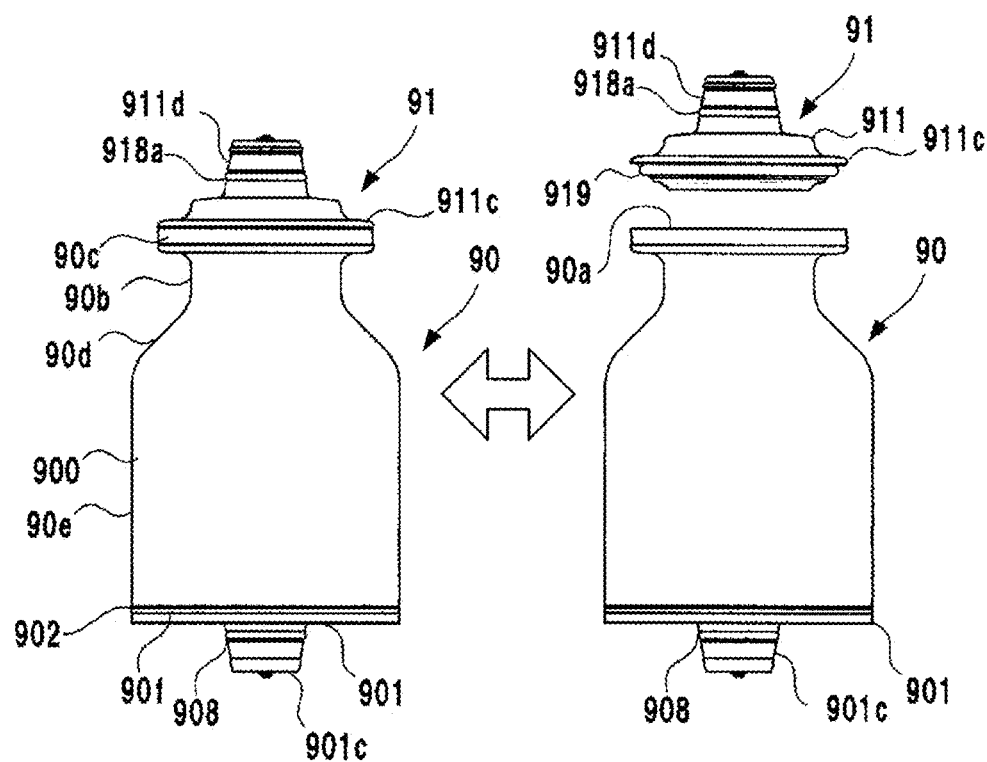

[Figure 7]
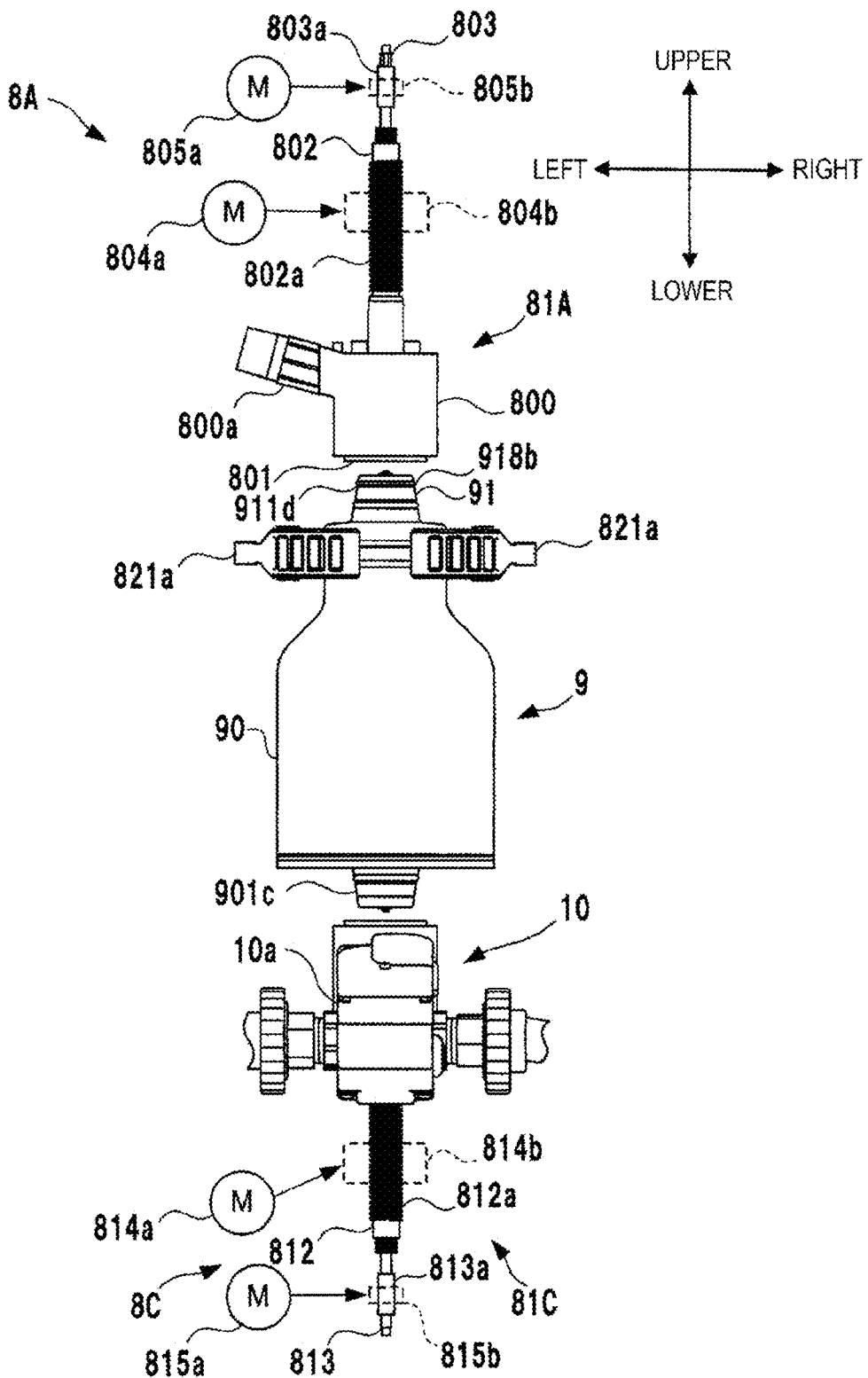

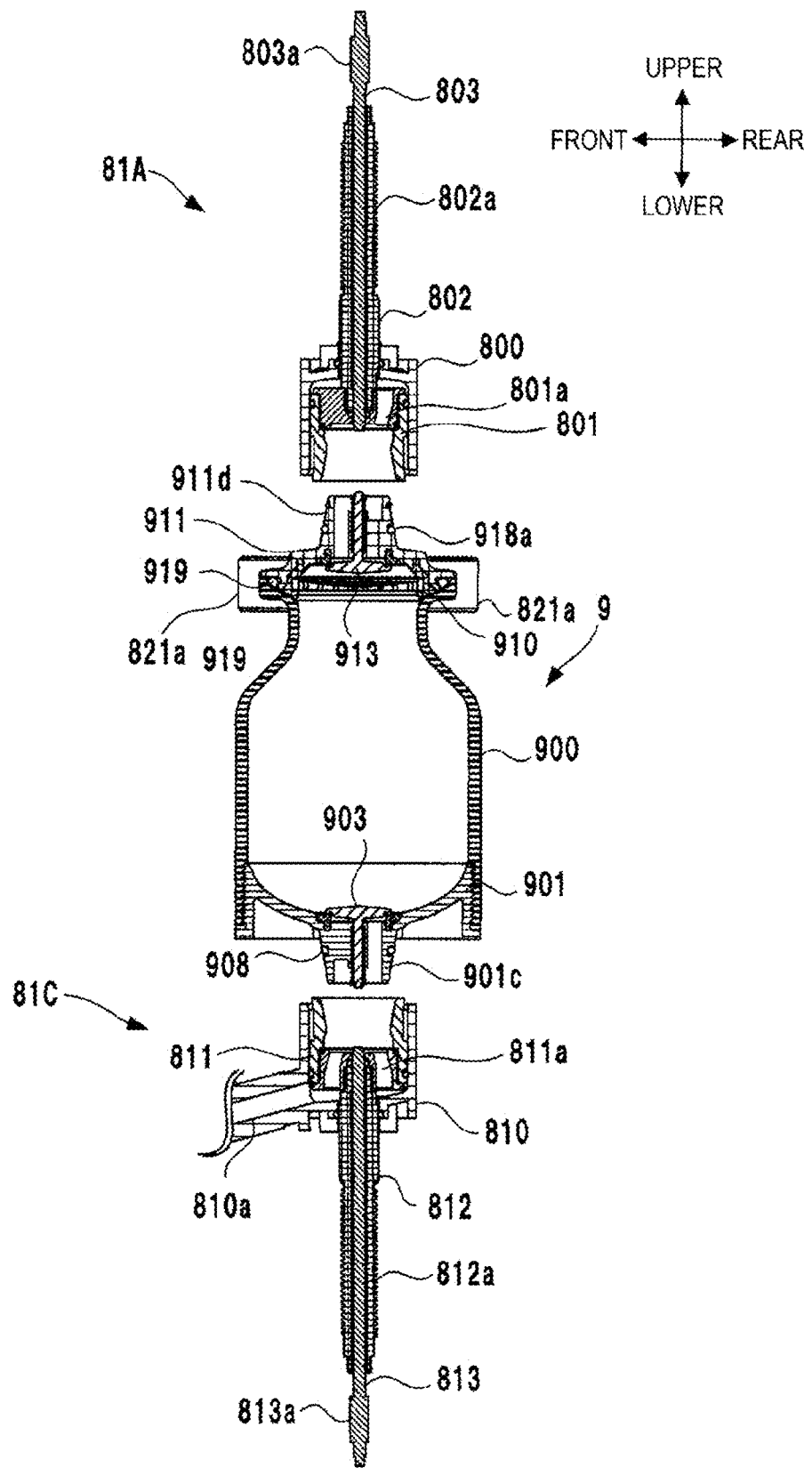
[Figure 8]

[Figure 9]
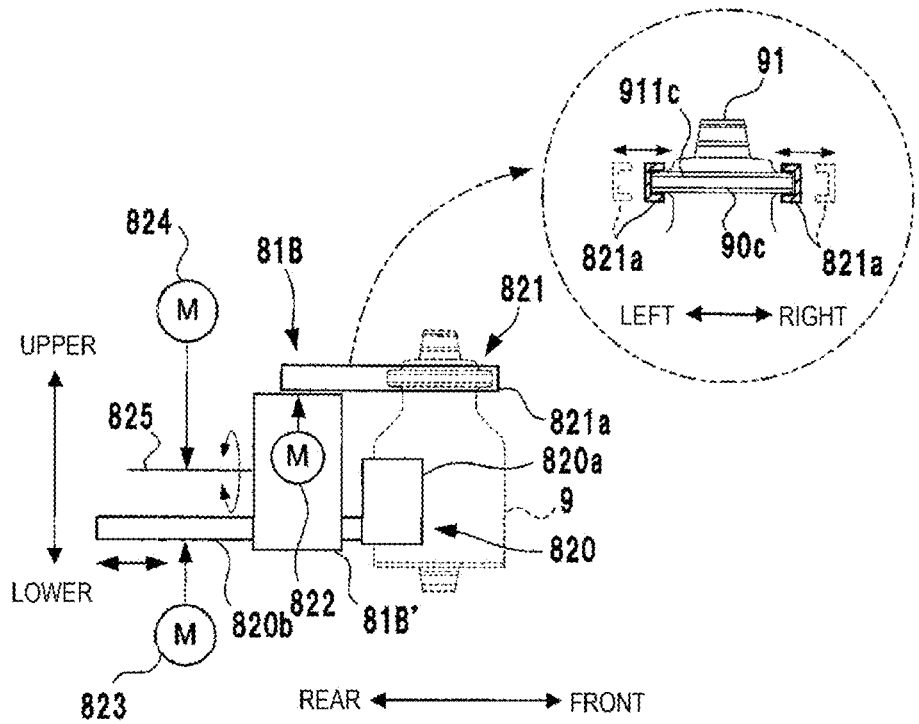
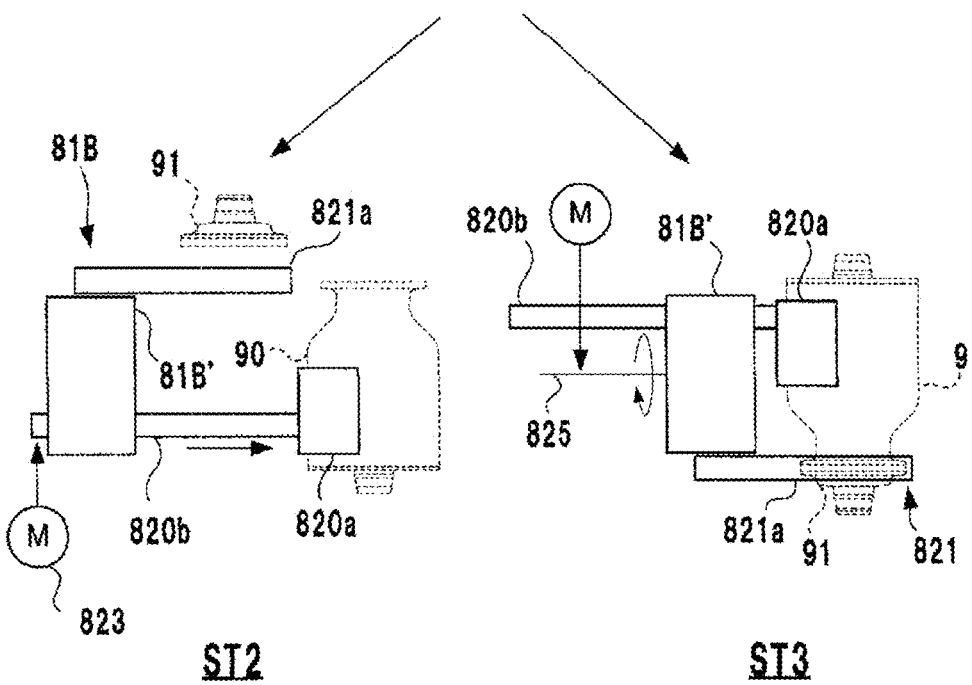

[Figure 10]
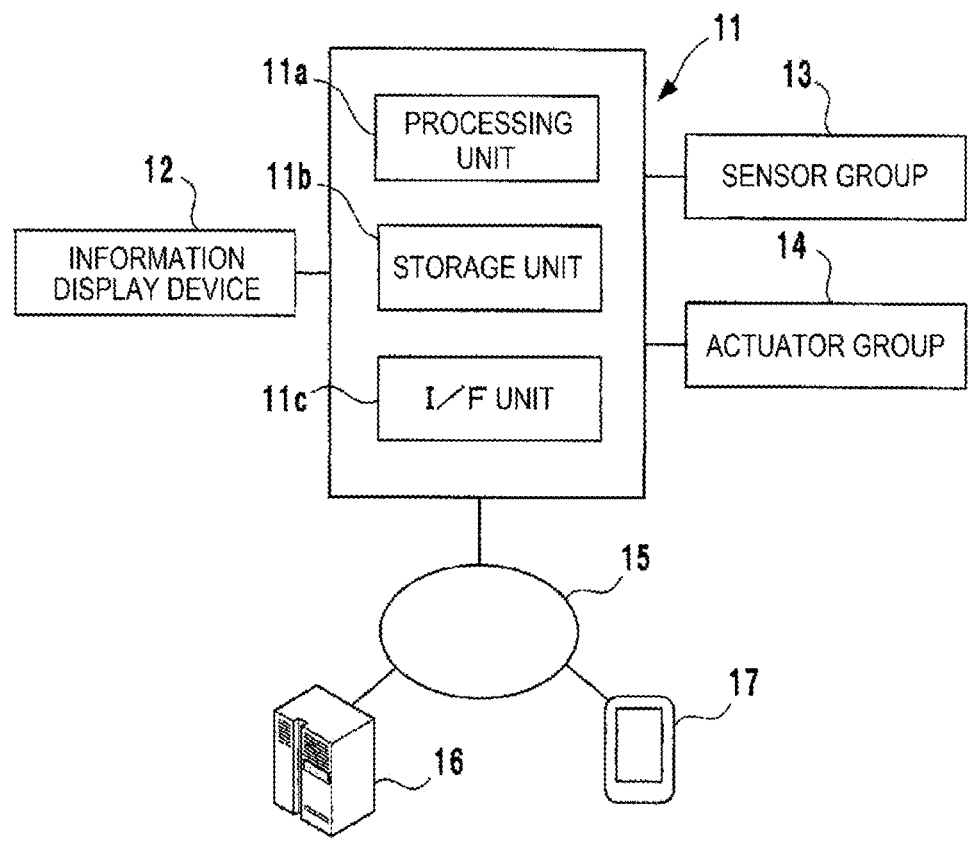

[Figure 11]
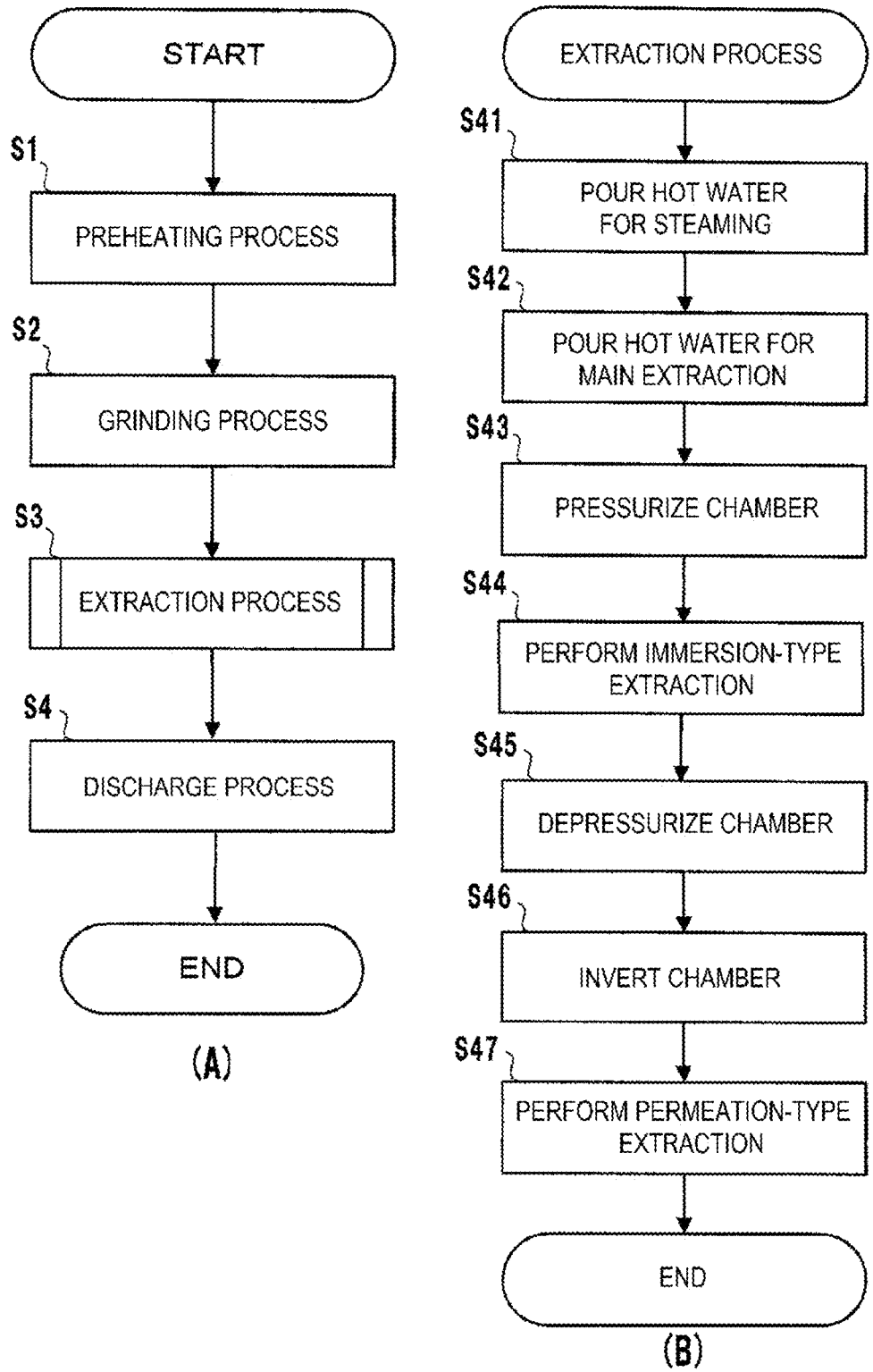

[Figure 12]
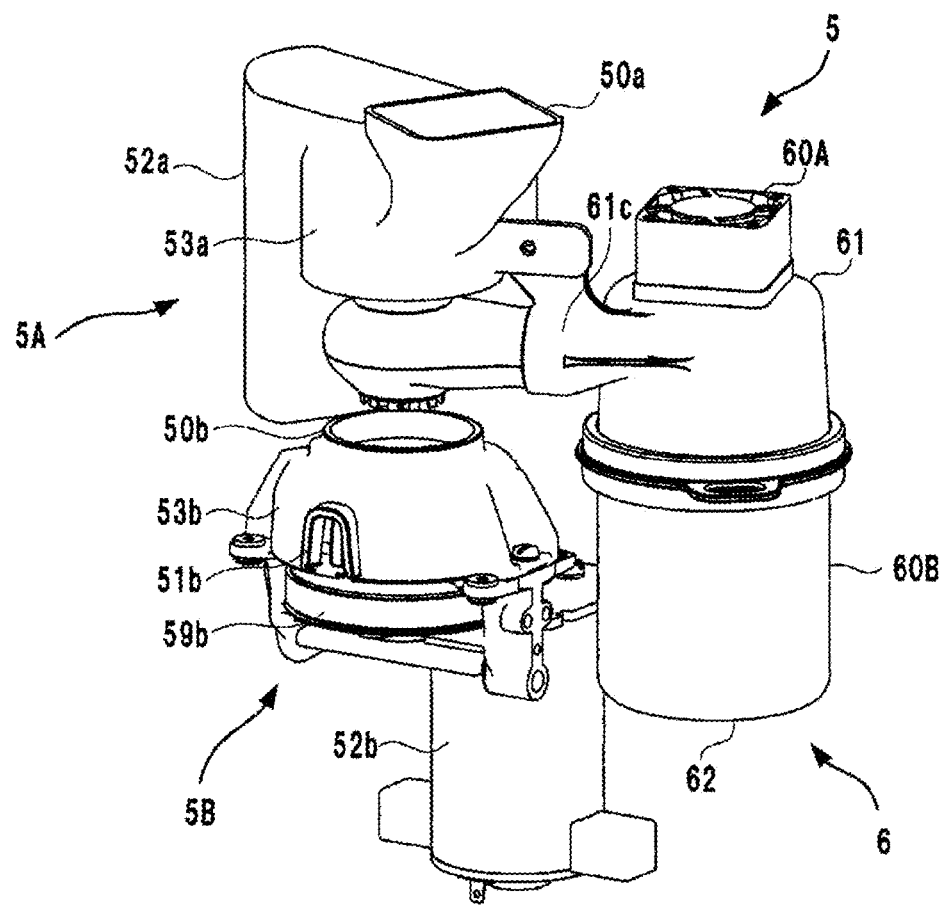

[Figure 13]
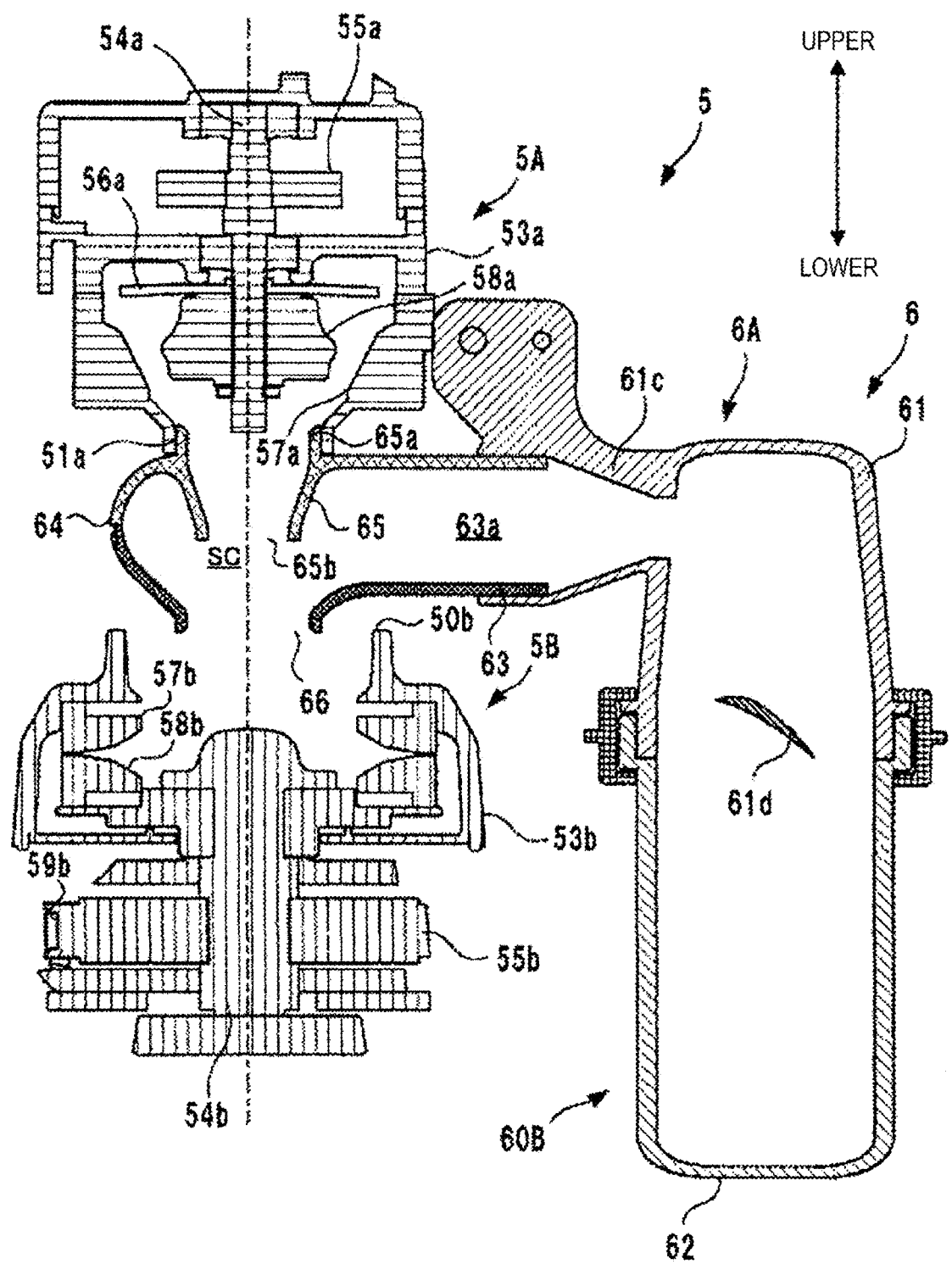

[Figure 14]
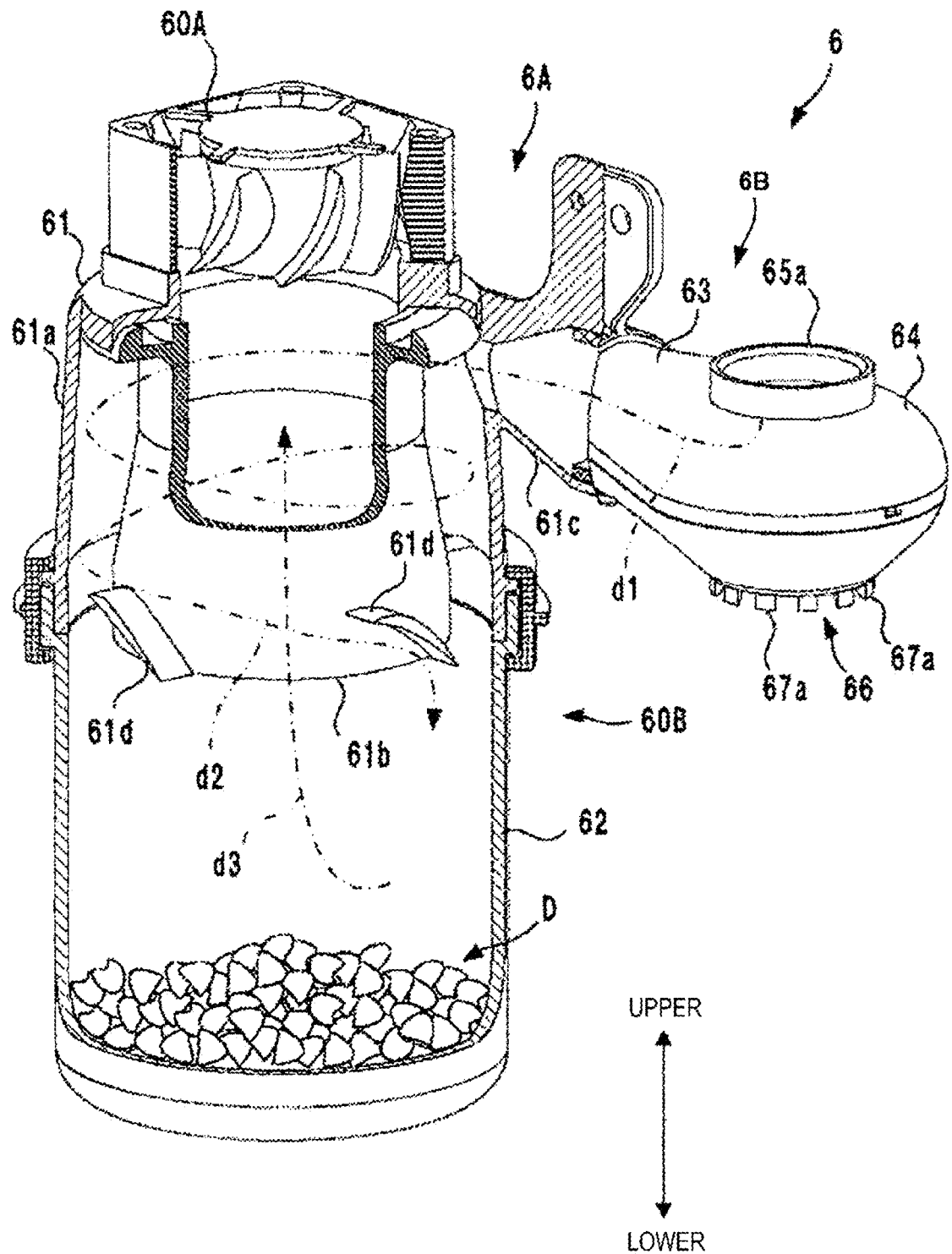

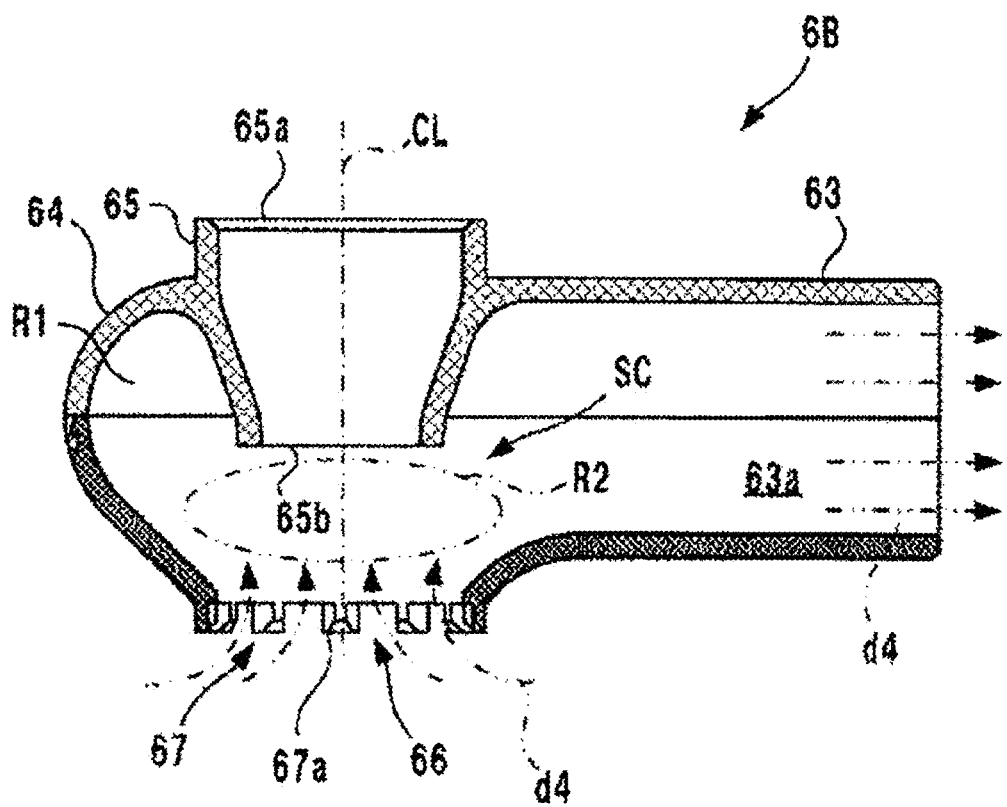
[Figure 15]

[Figure 16]
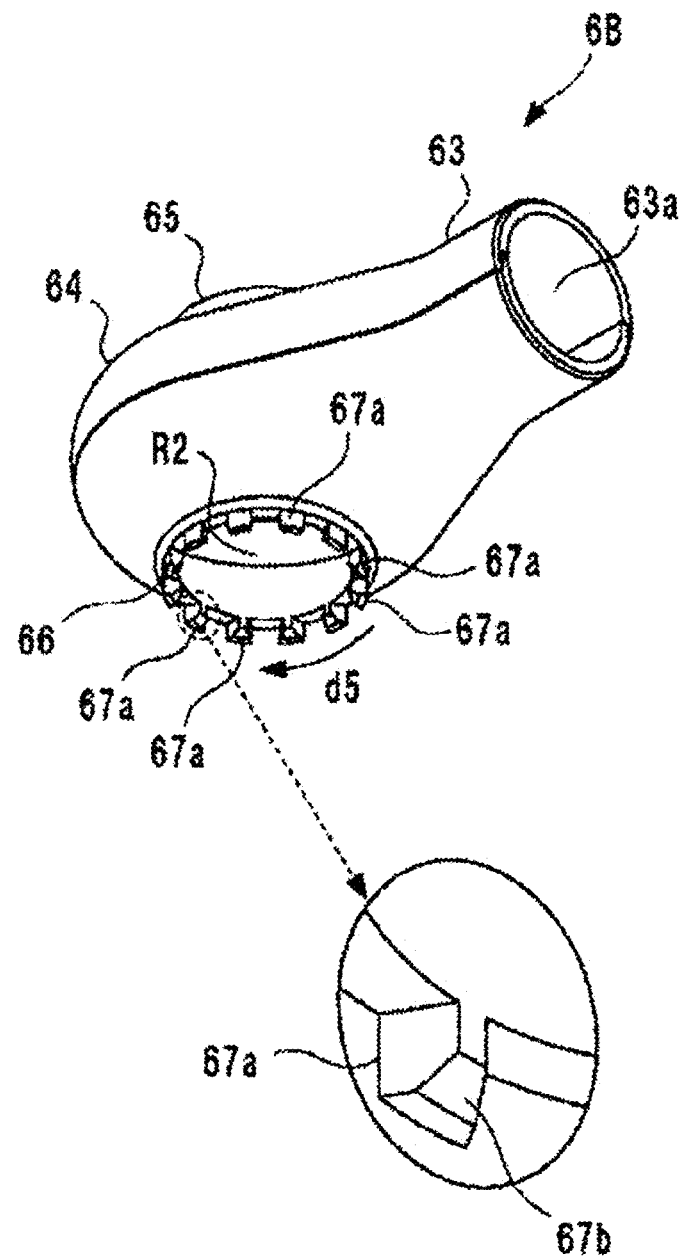

[Figure 17]
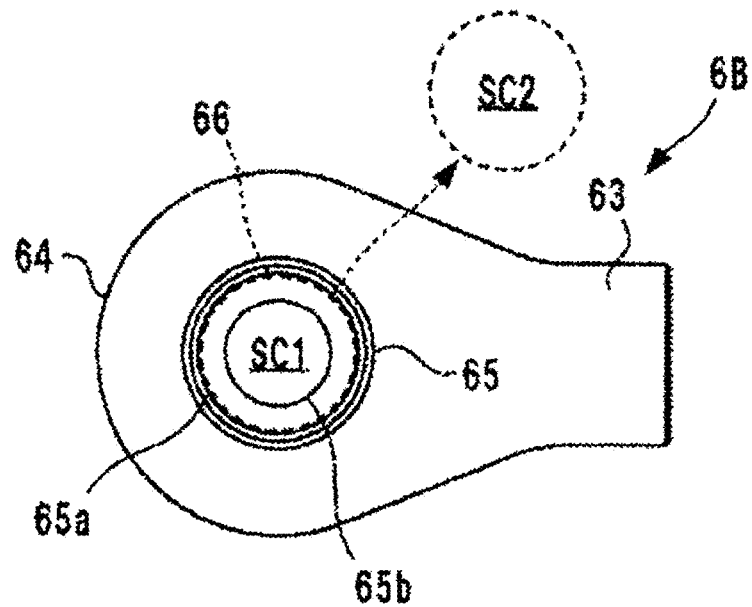

[Figure 18]
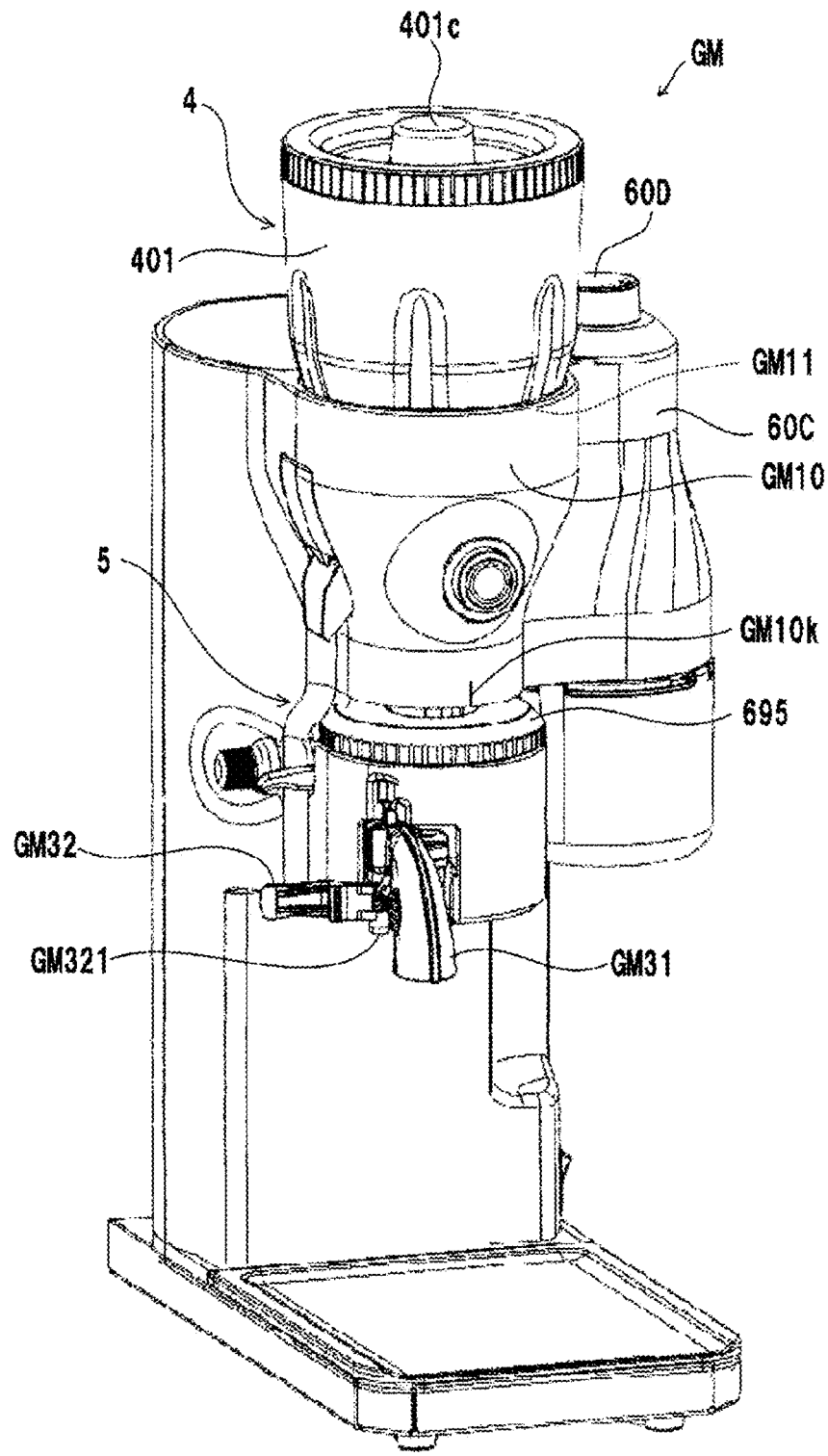

[Figure 19]
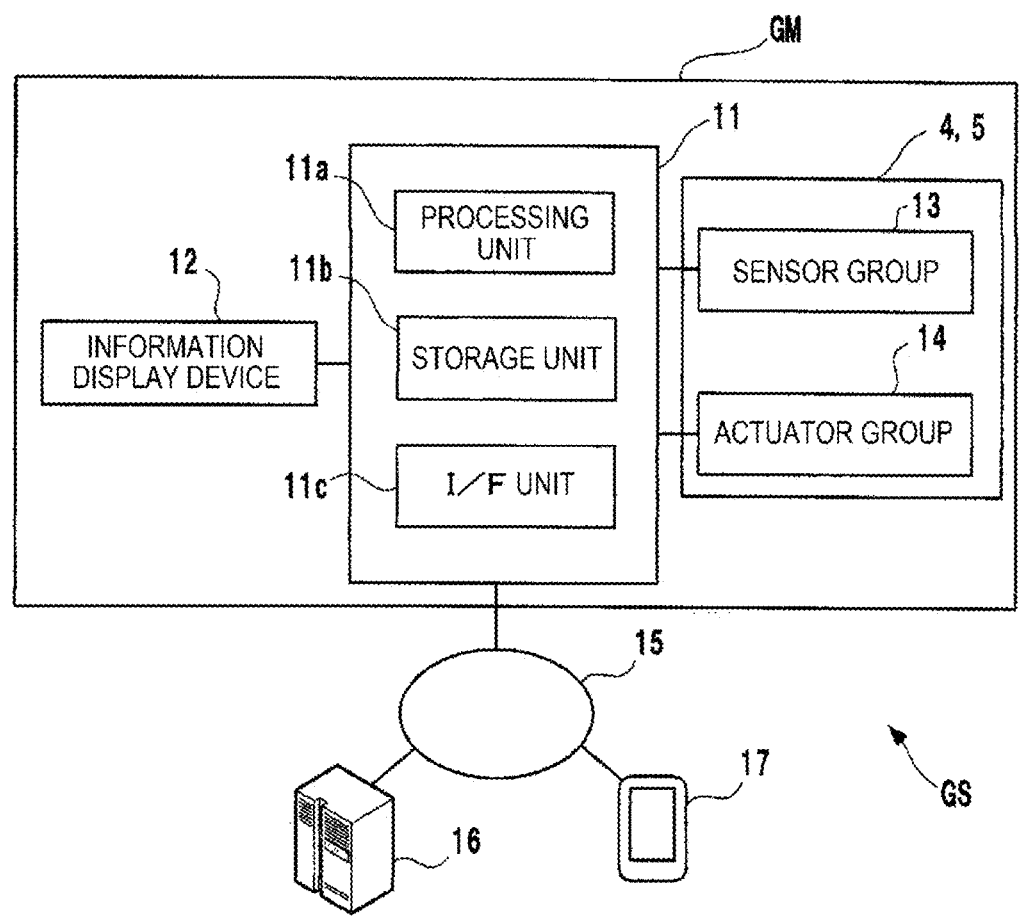

[Figure 20]
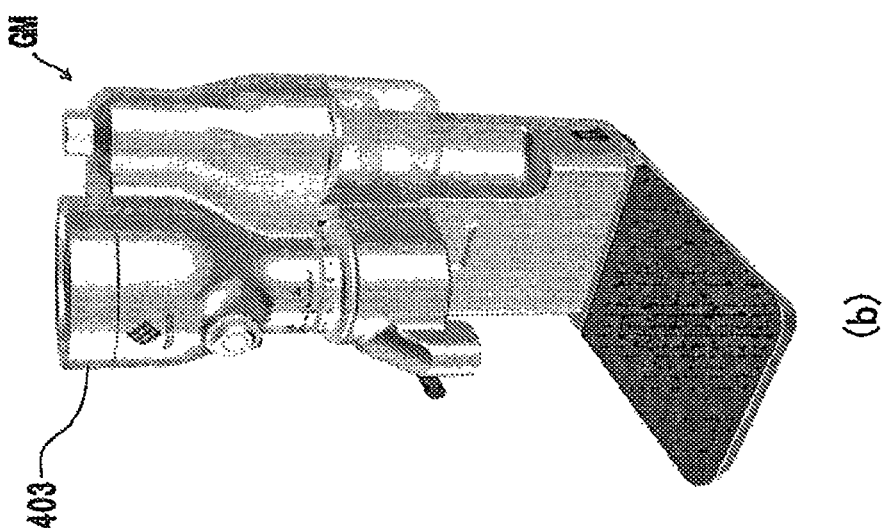
(b)
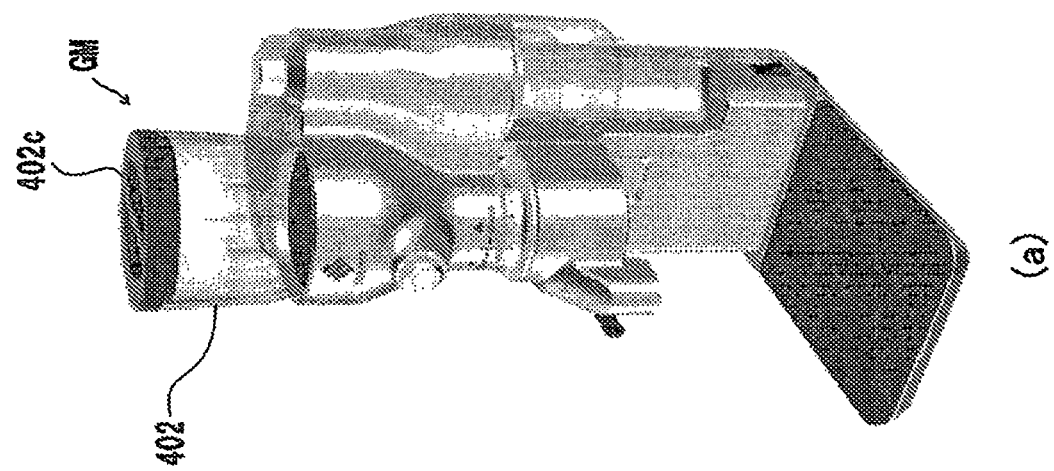
(a)

[Figure 21]
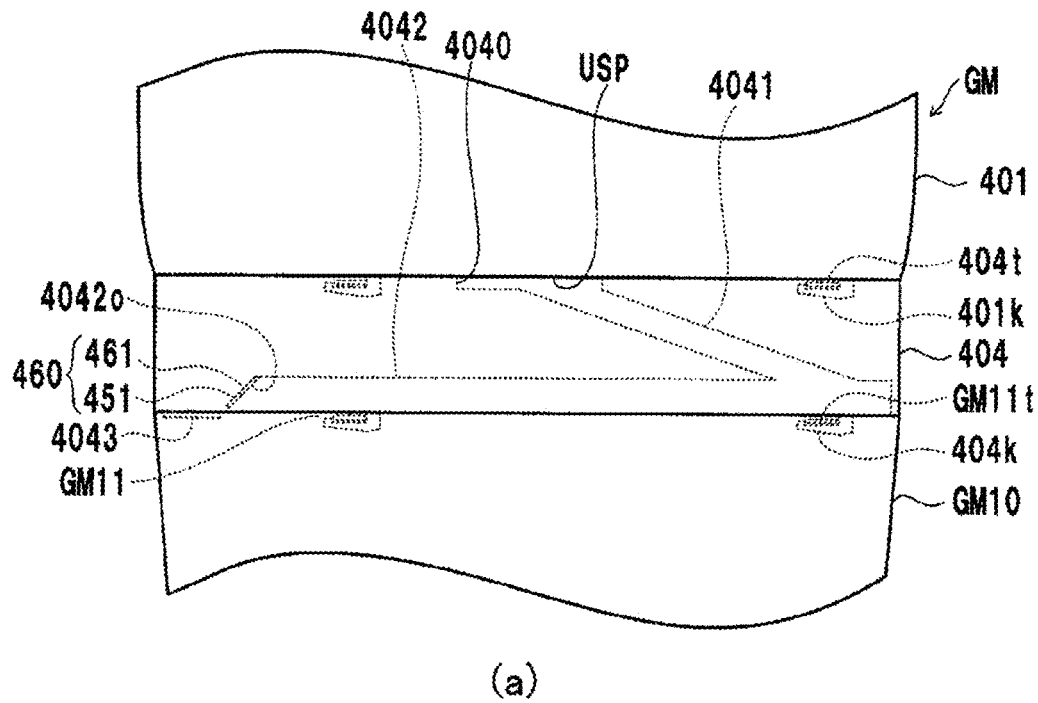
(a)
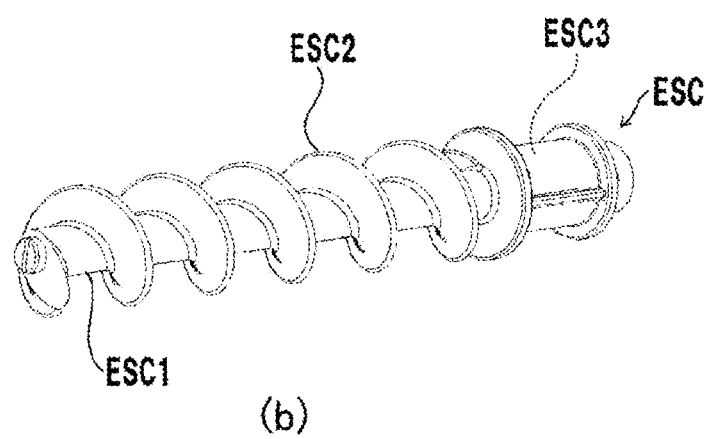
(b)

[Figure 22]
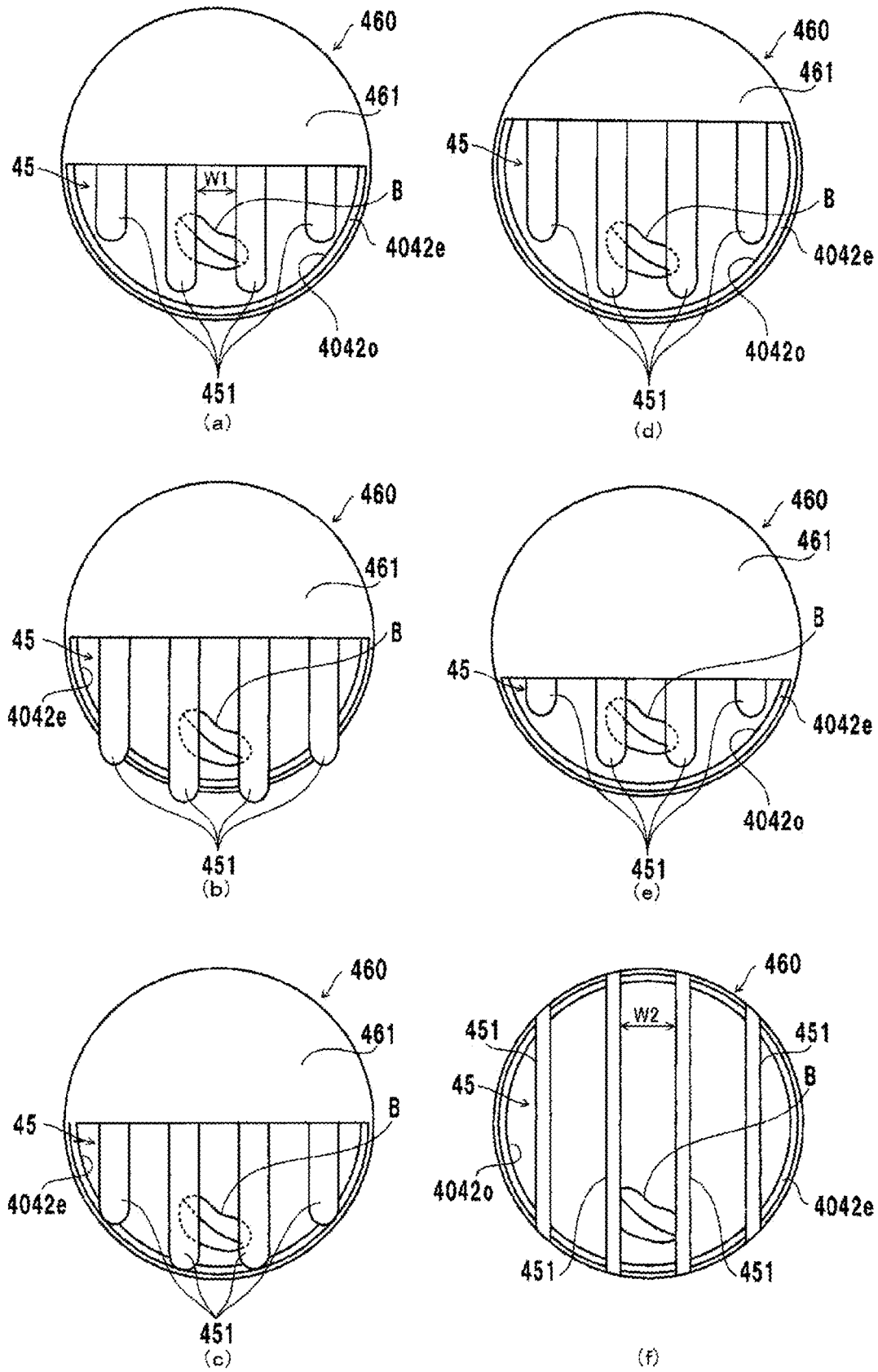

[Figure 23]
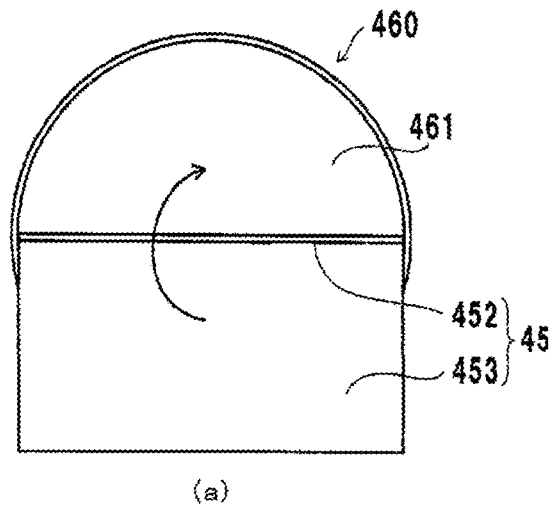
(a)
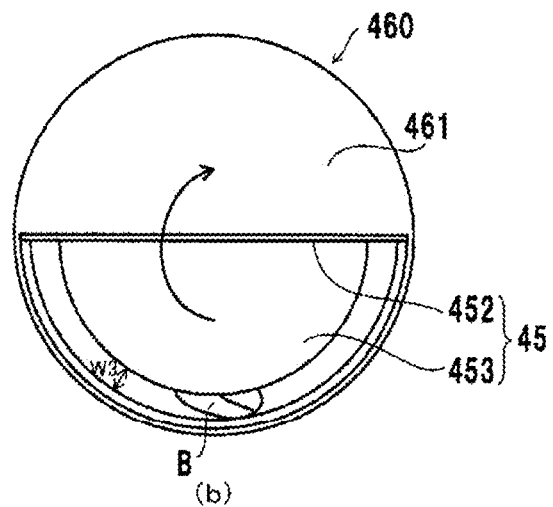
(b)
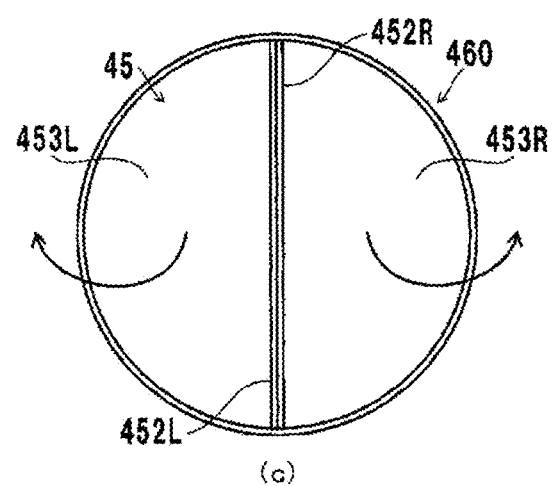
(c)

[Figure 24]
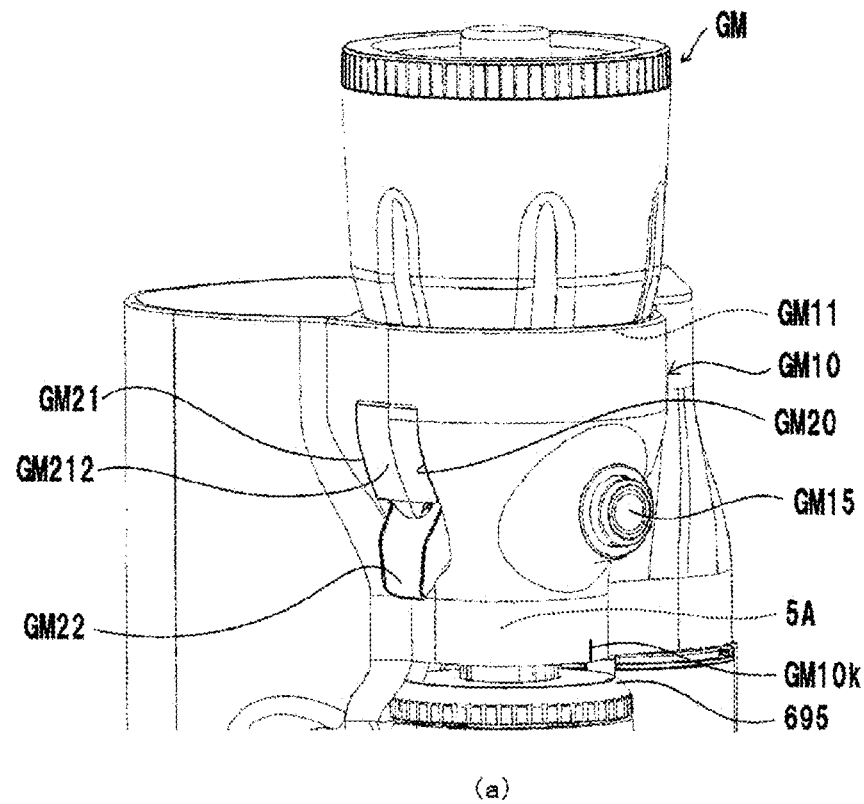
(a)
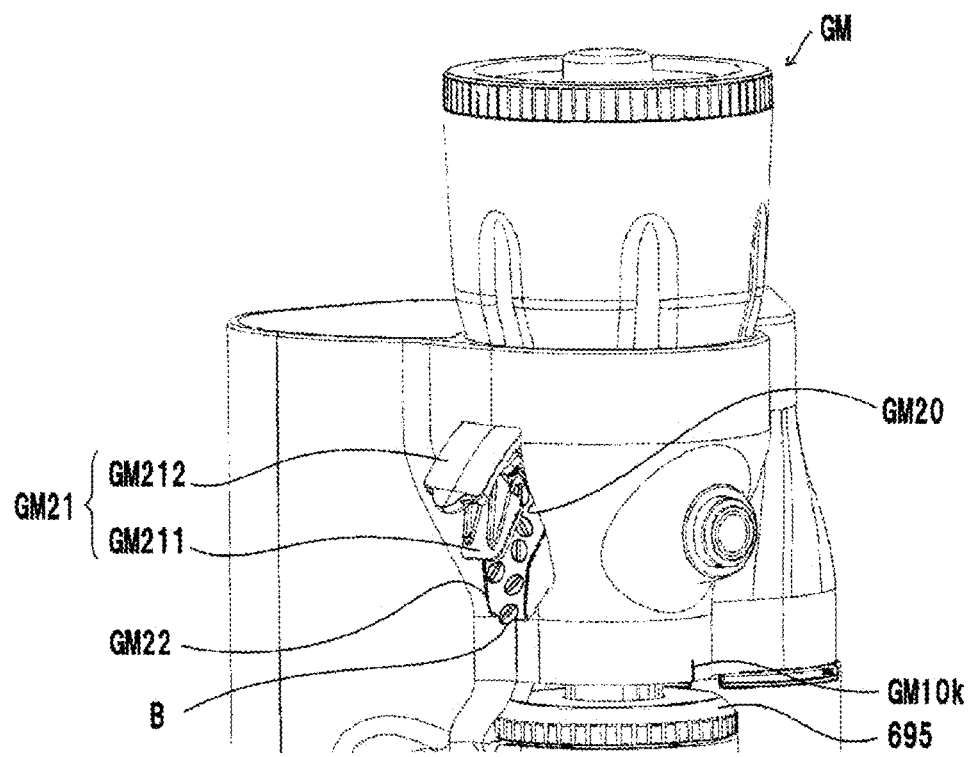
(b)

[Figure 25]
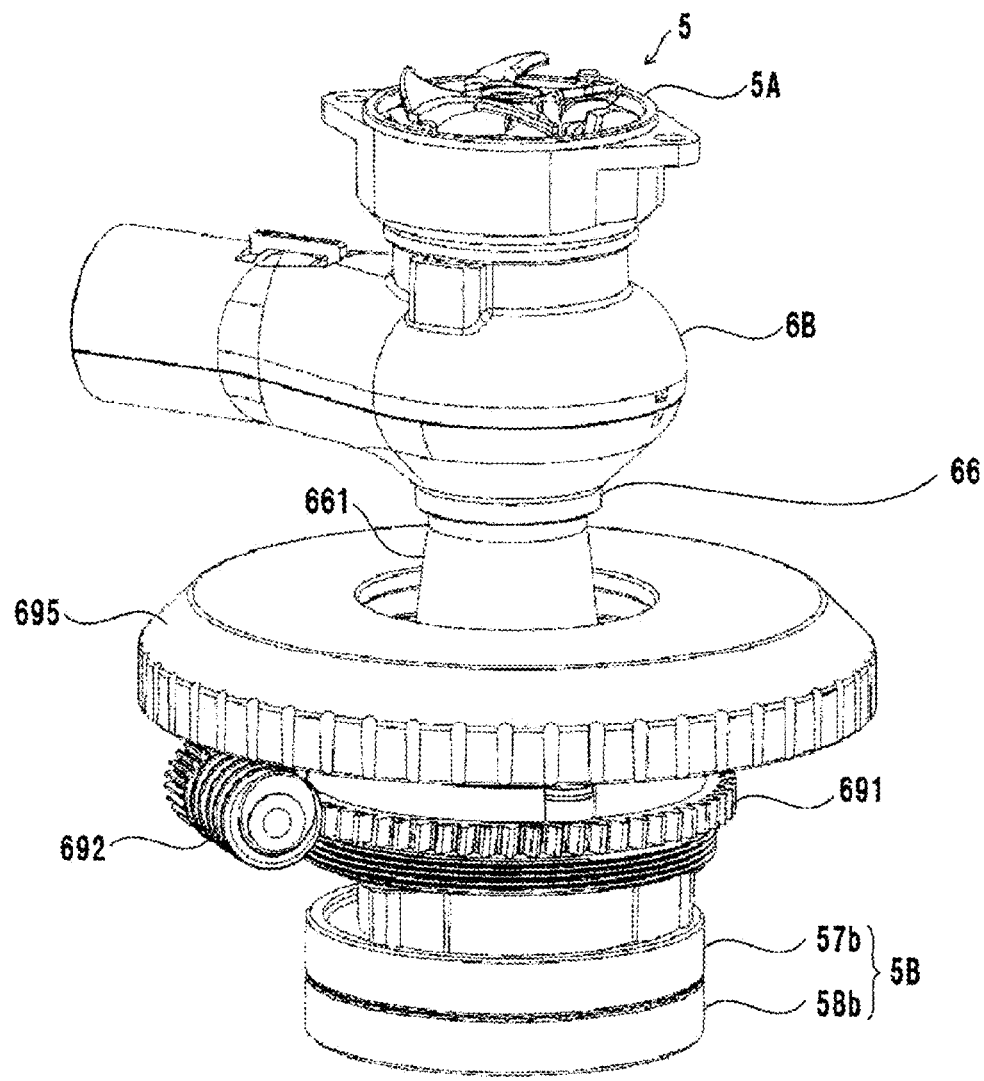

[Figure 26]
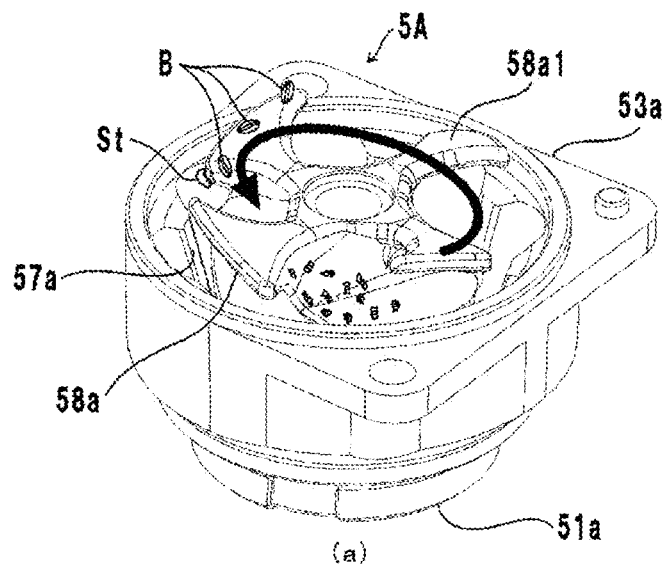
(a)
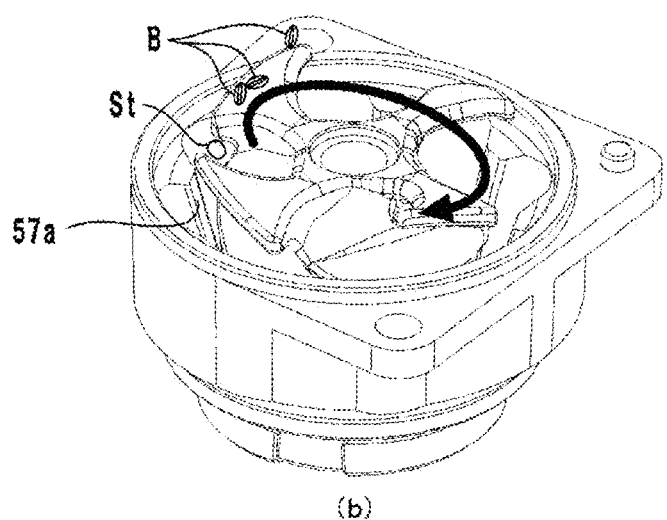
(b)
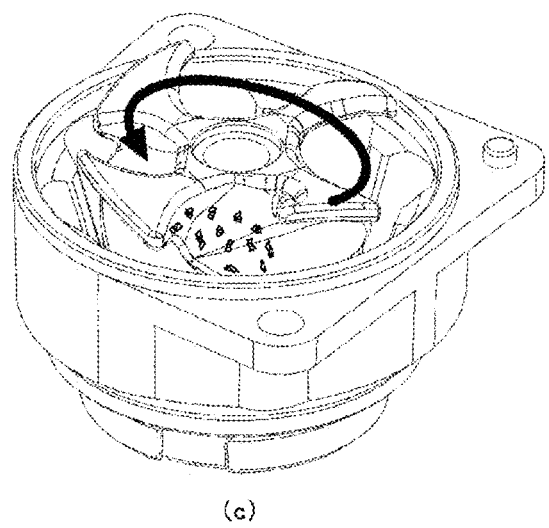
(c)

[Figure 27]
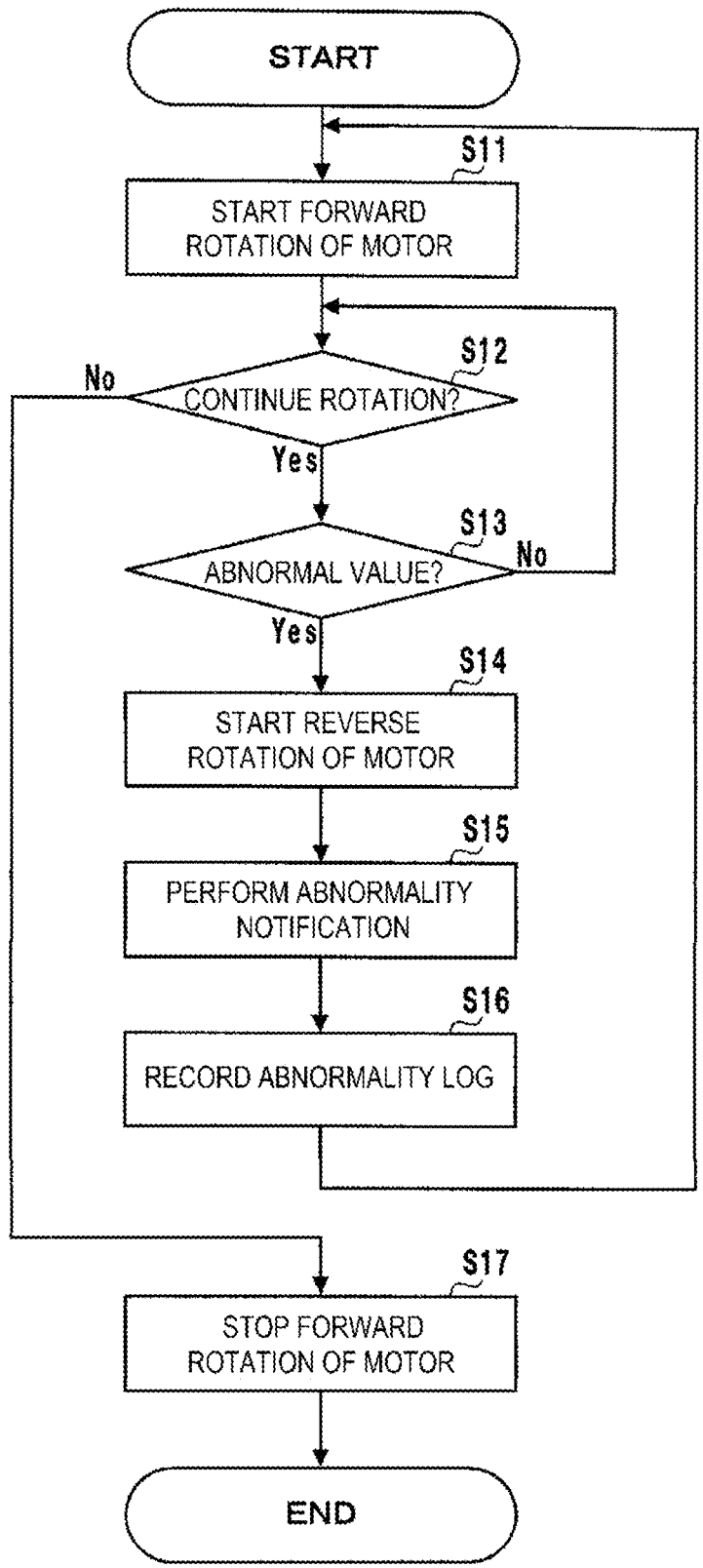

[Figure 28]
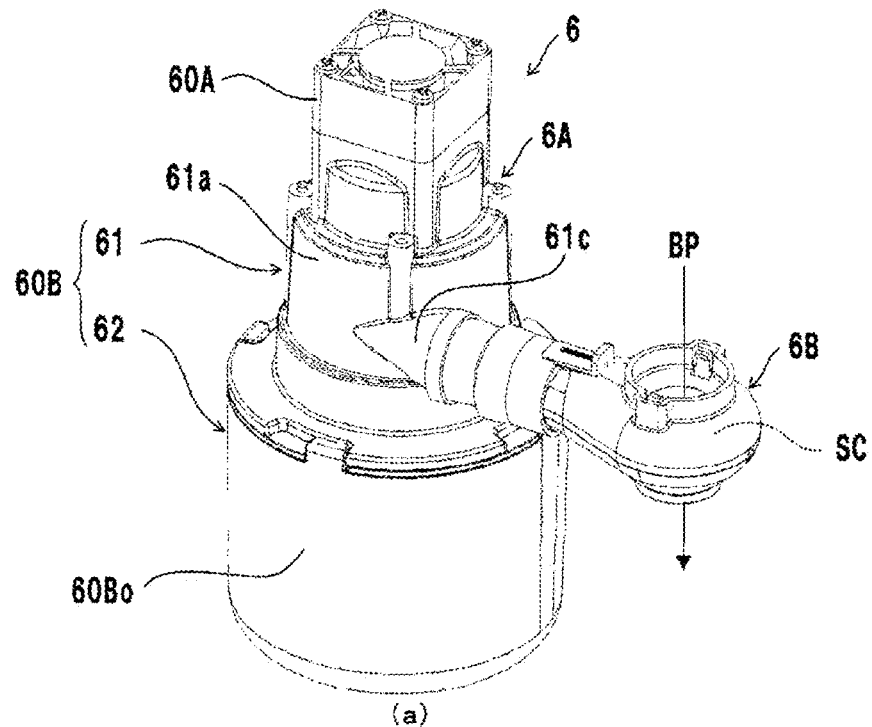
(a)
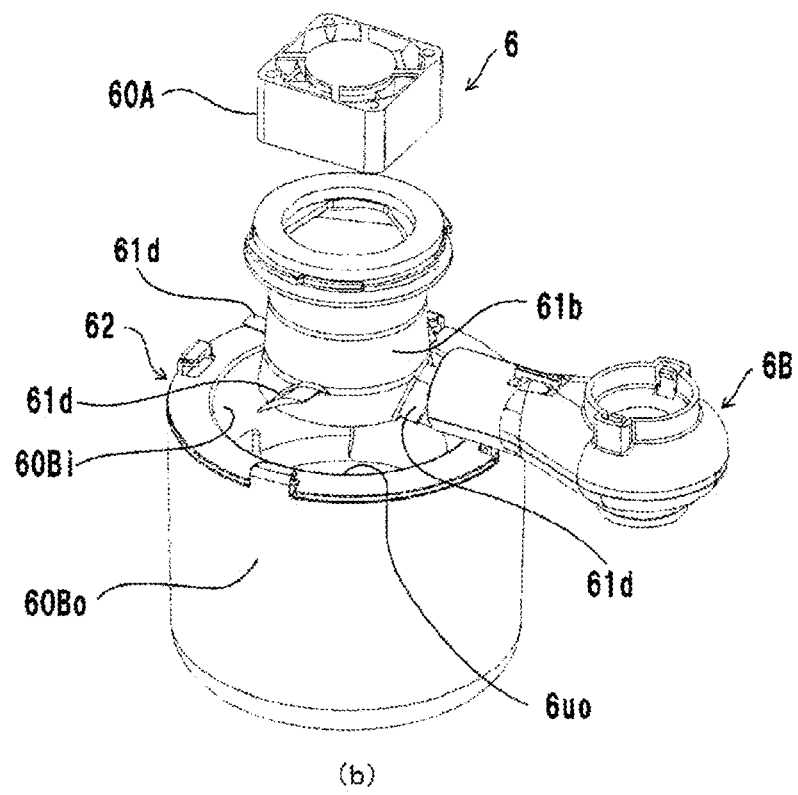
(b)

[Figure 29]
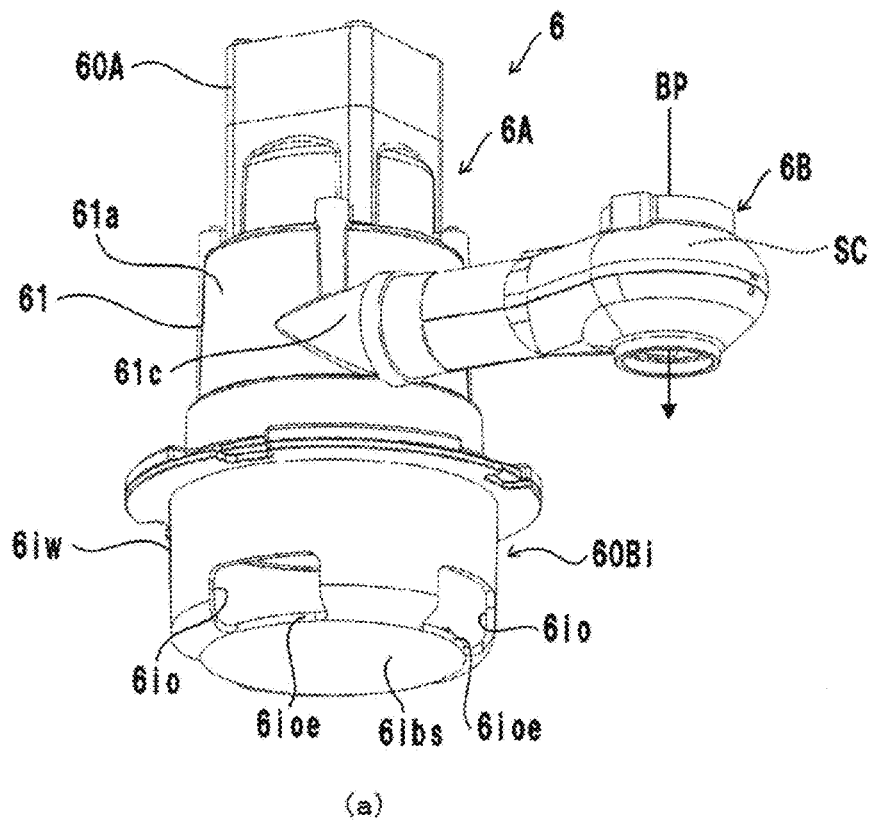
(a)
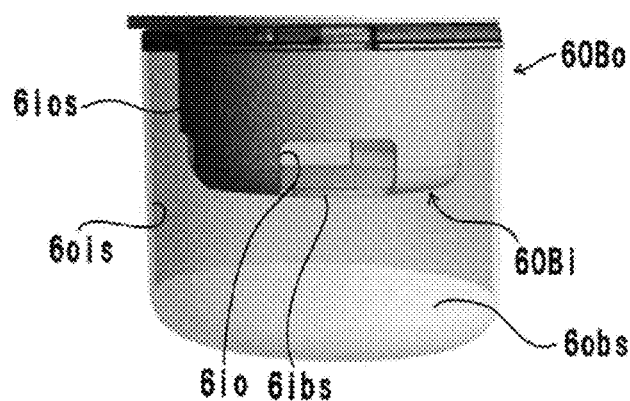
(b)

[Figure 30]
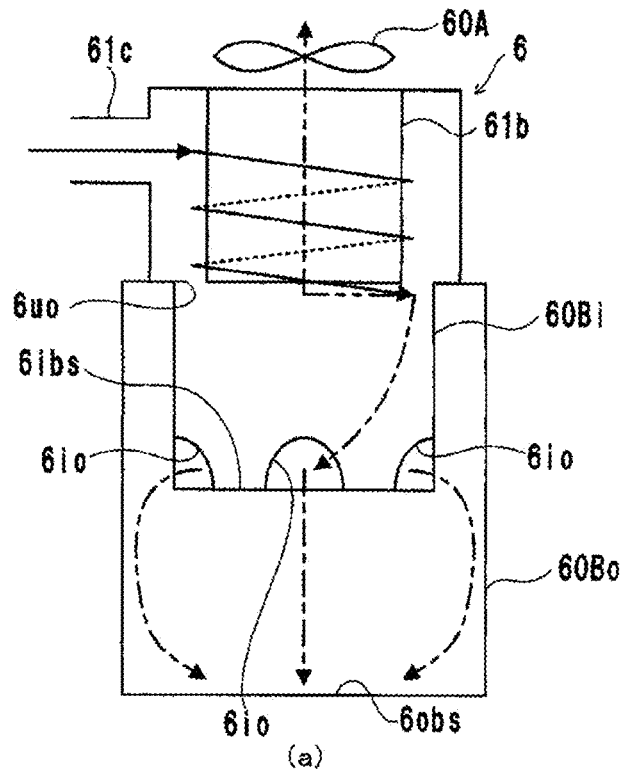
(a)
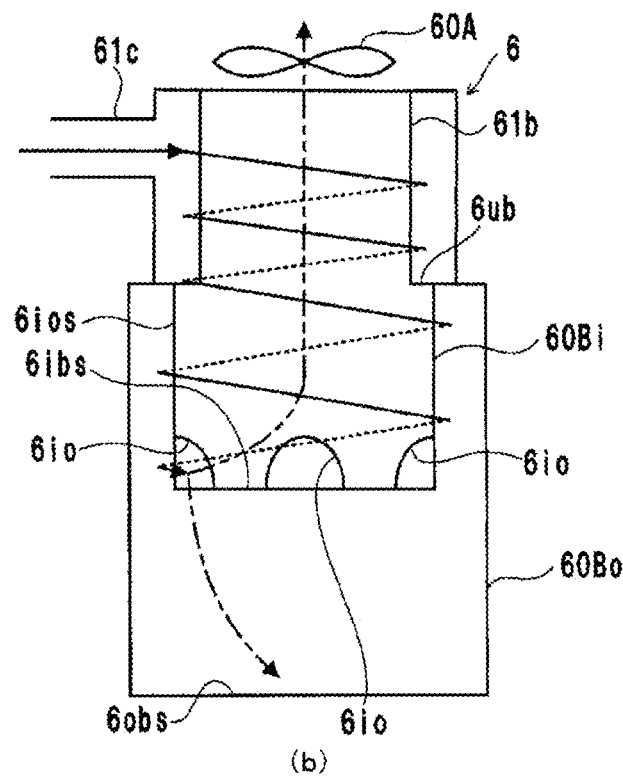
(b)

[Figure 31]
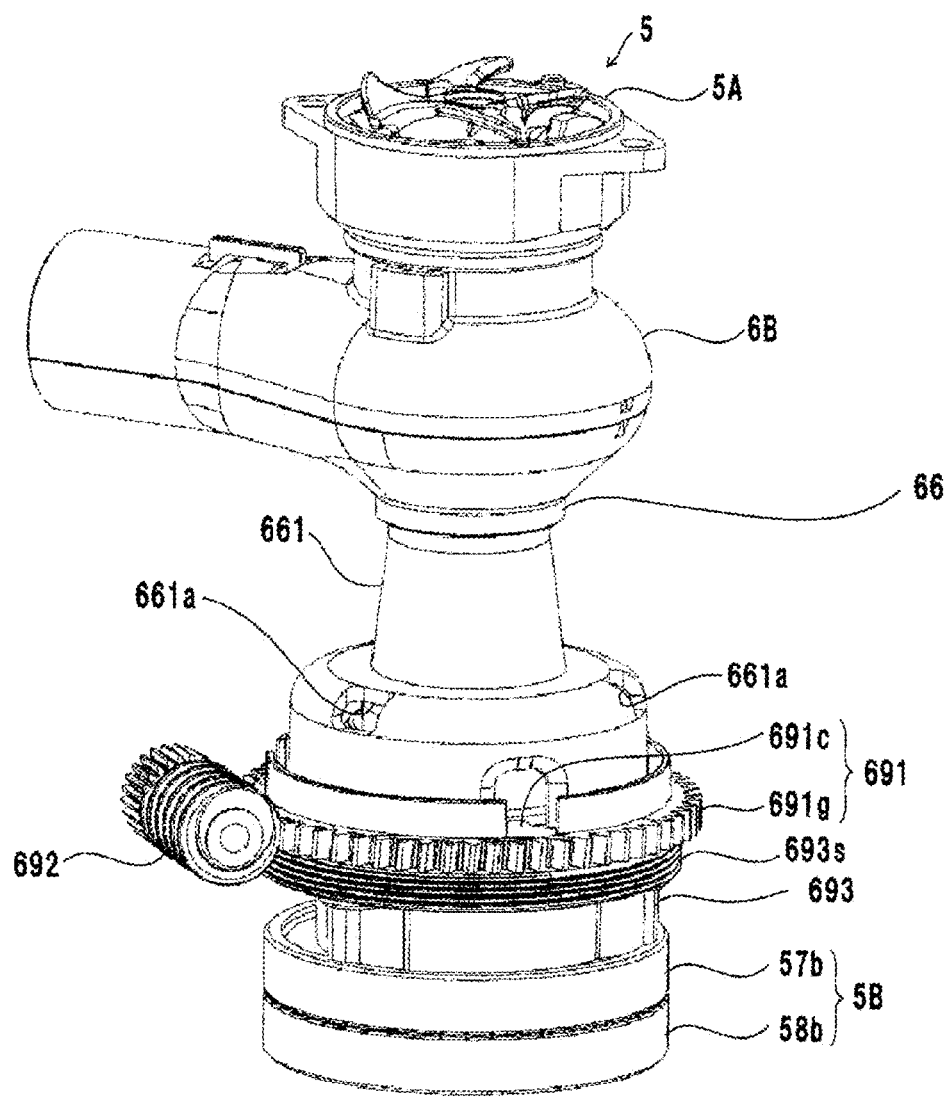

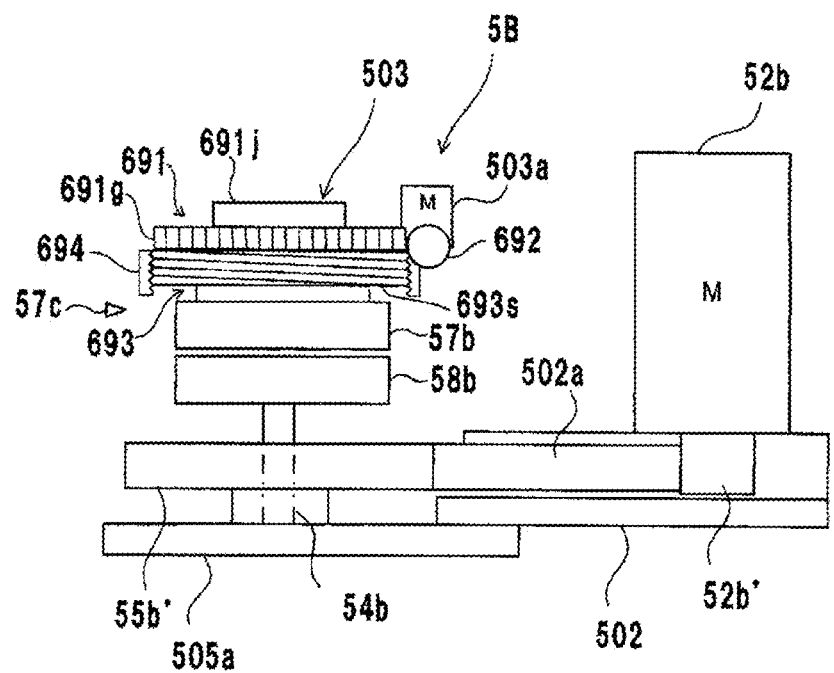
[Figure 32]

[Figure 33]
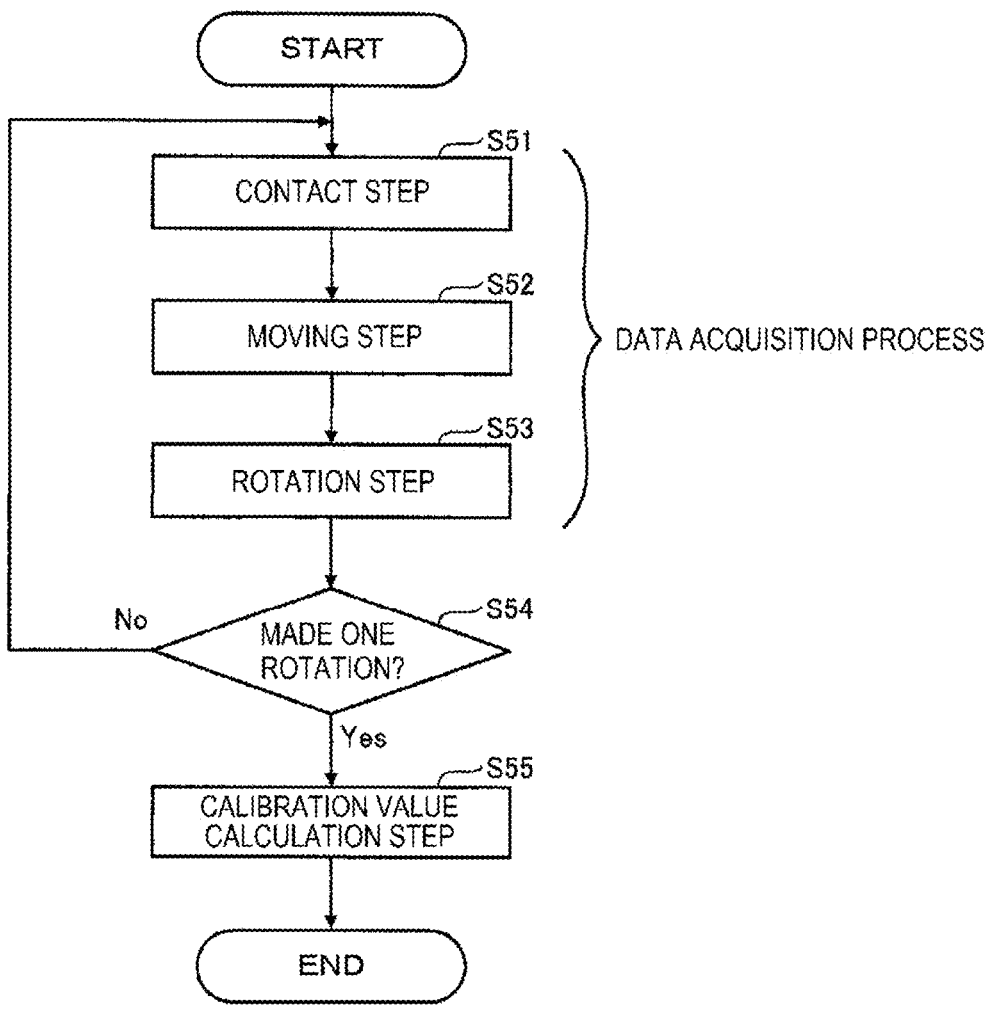

[Figure 34]
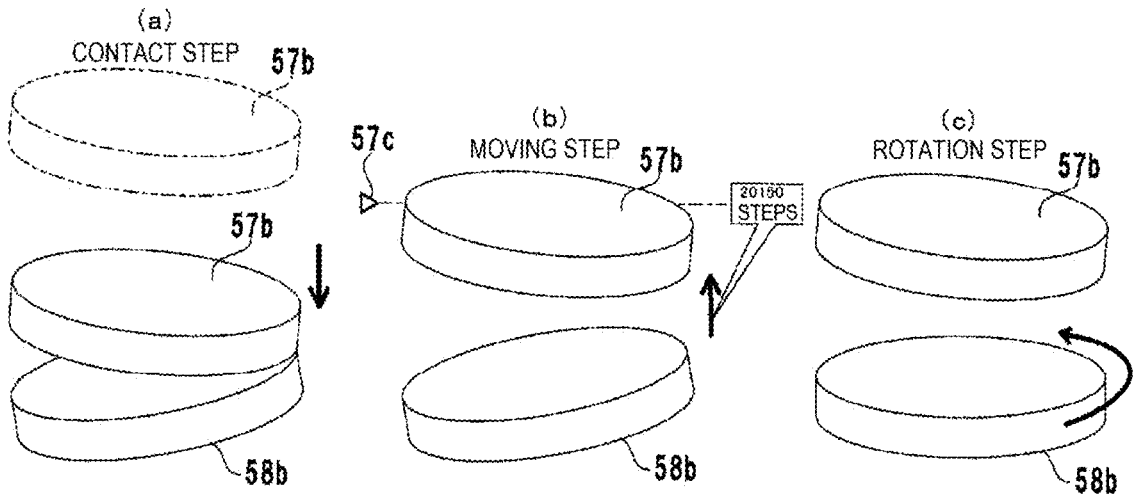

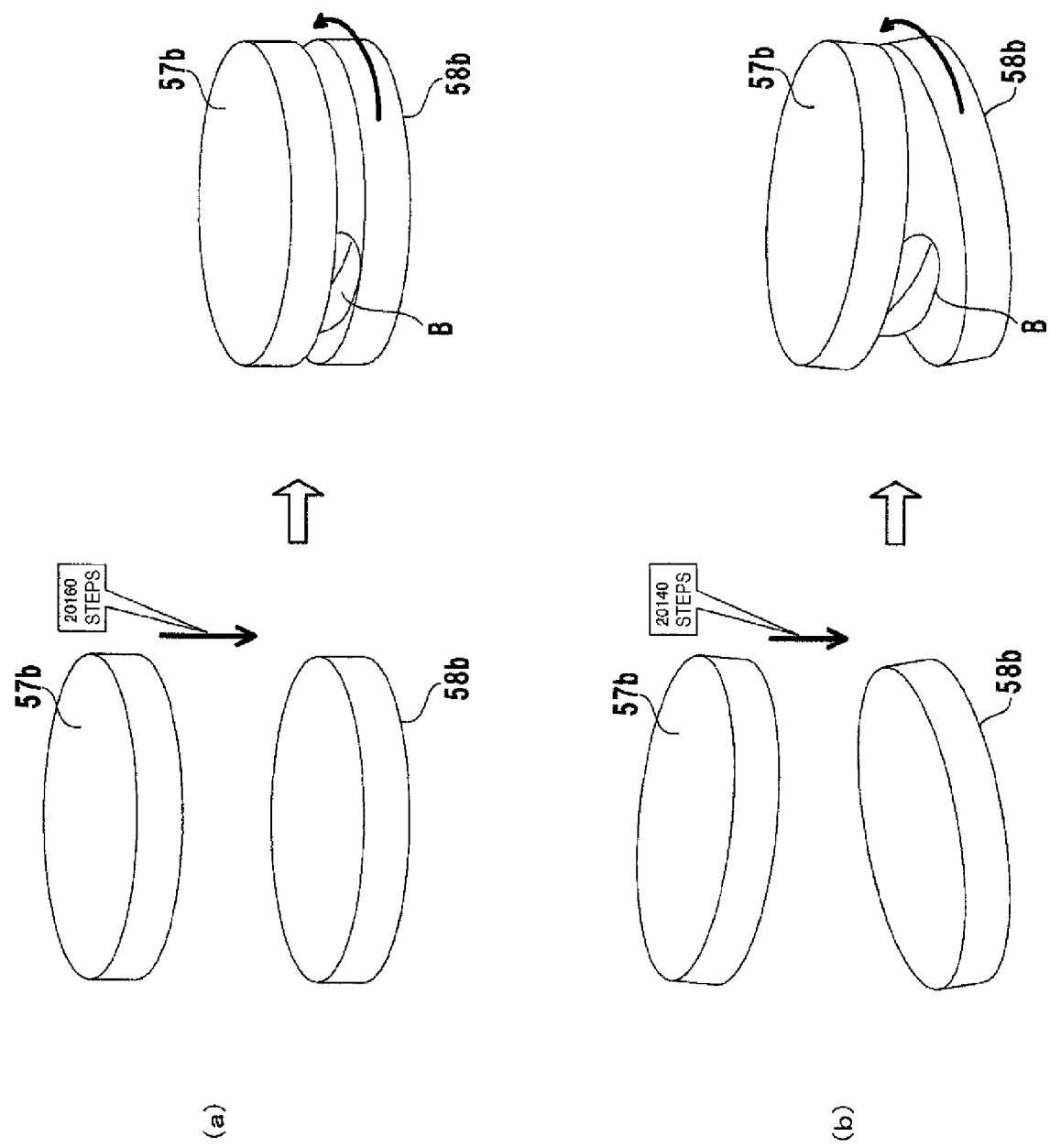
[Figure 35]

[Figure 36]
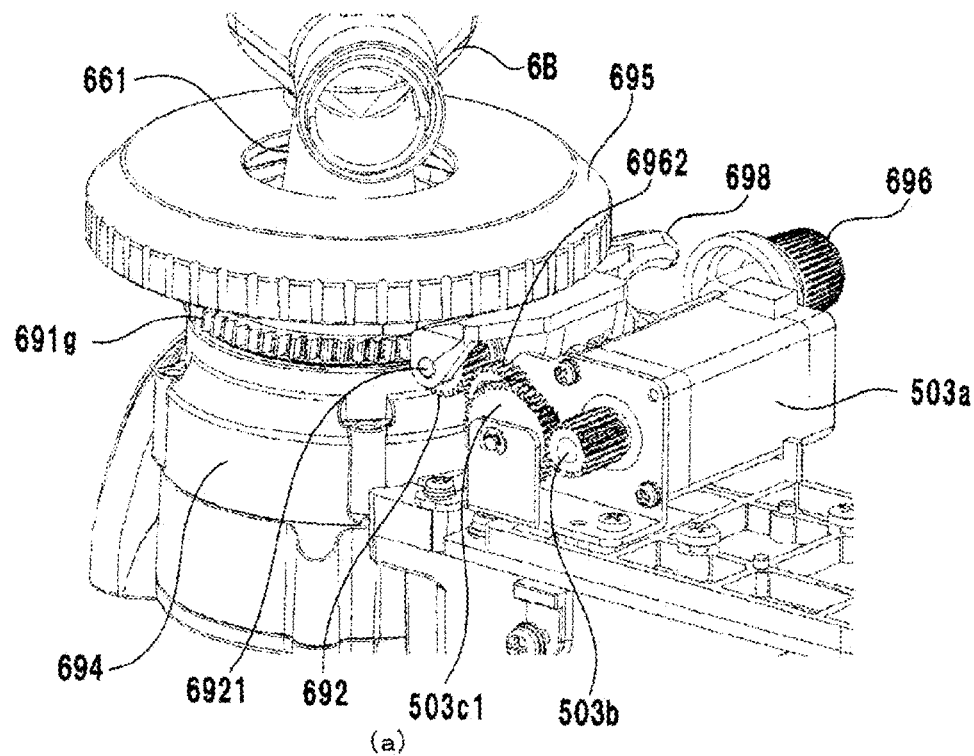
(a)
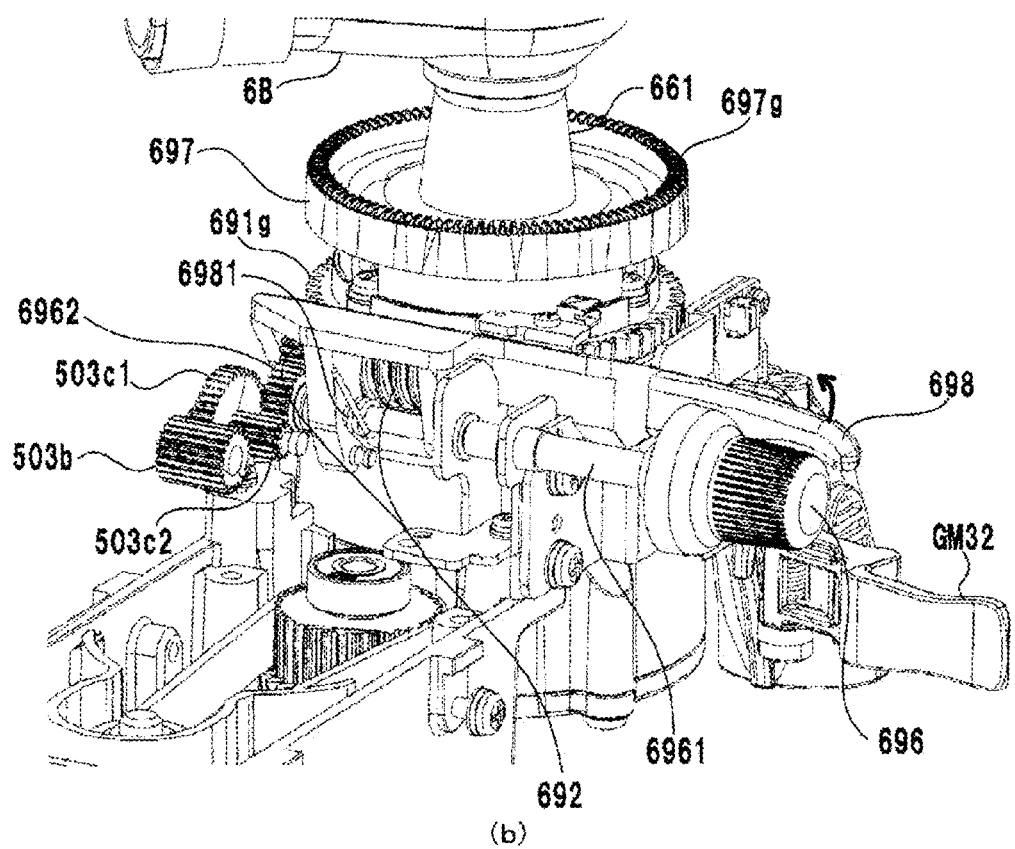
(b)

[Figure 37]
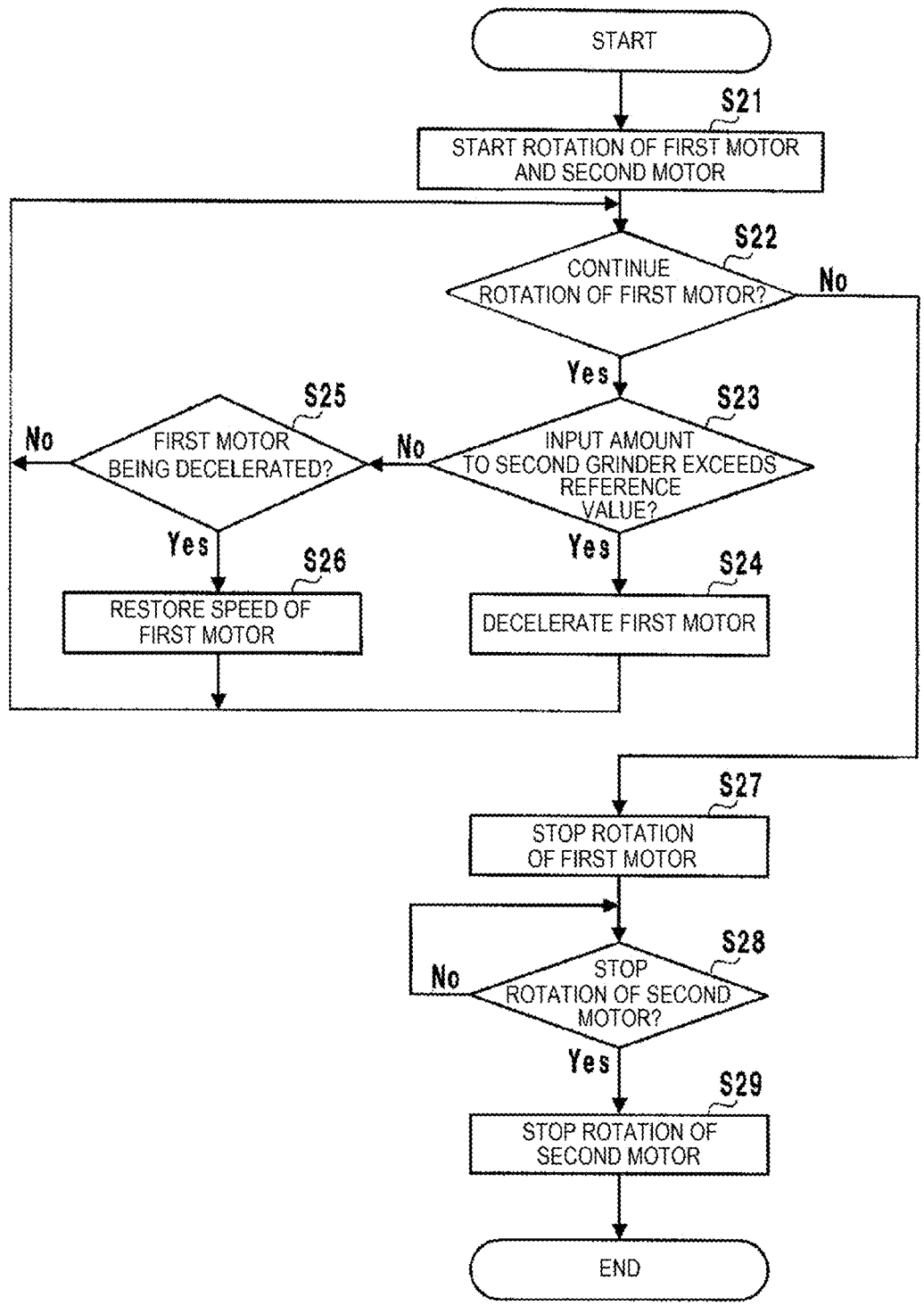

[Figure 38]
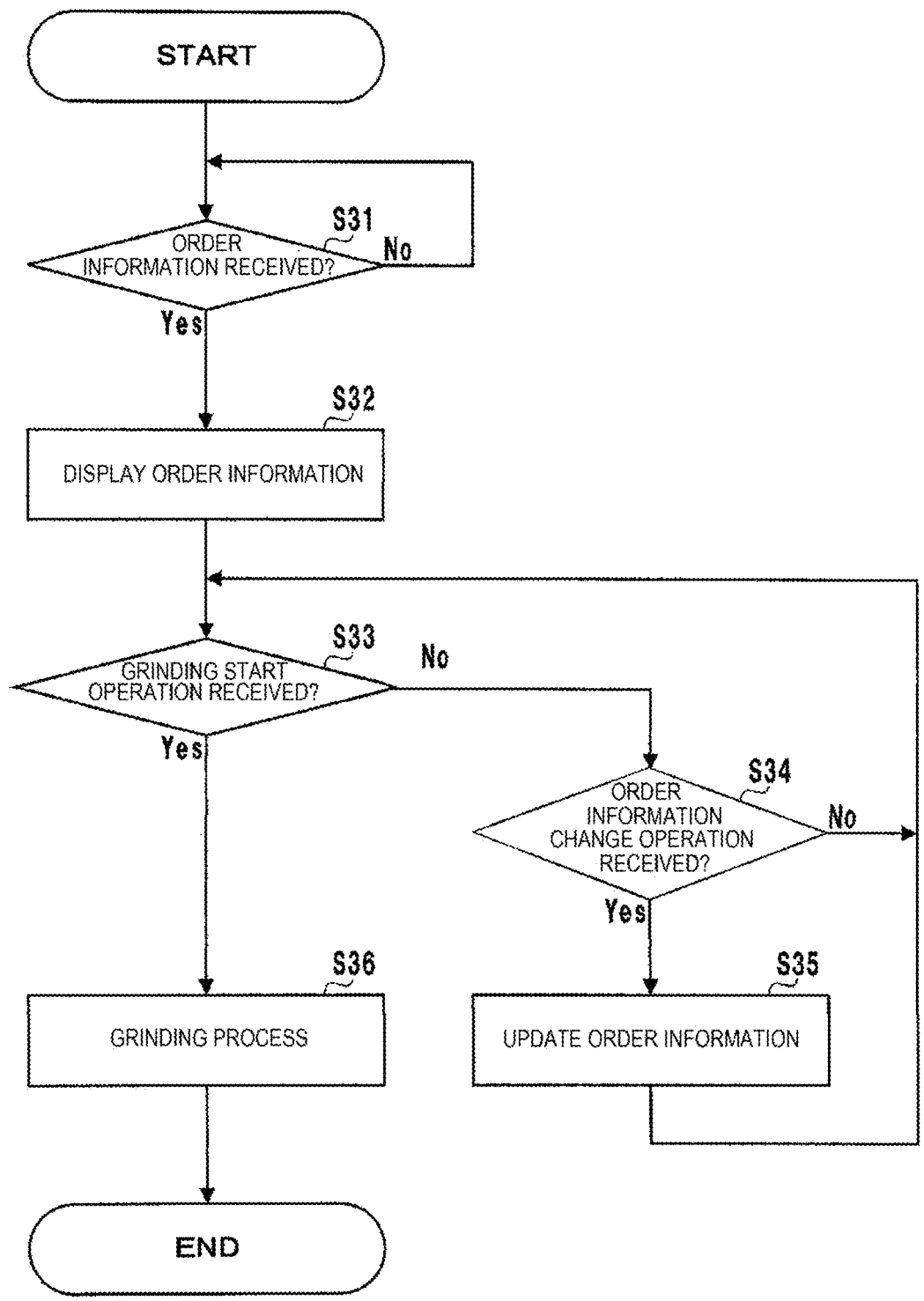

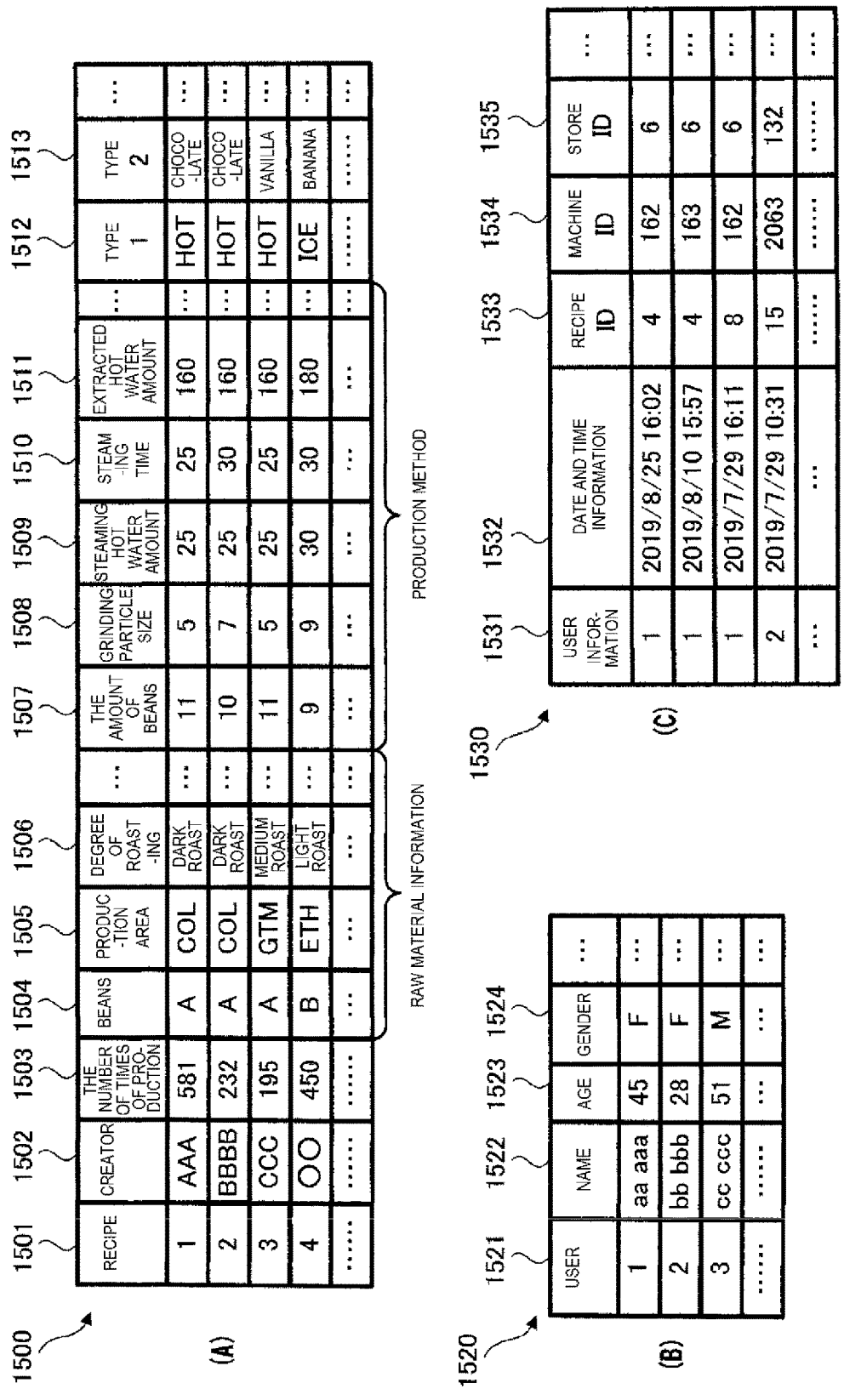
[Figure 39]

[Figure 40]
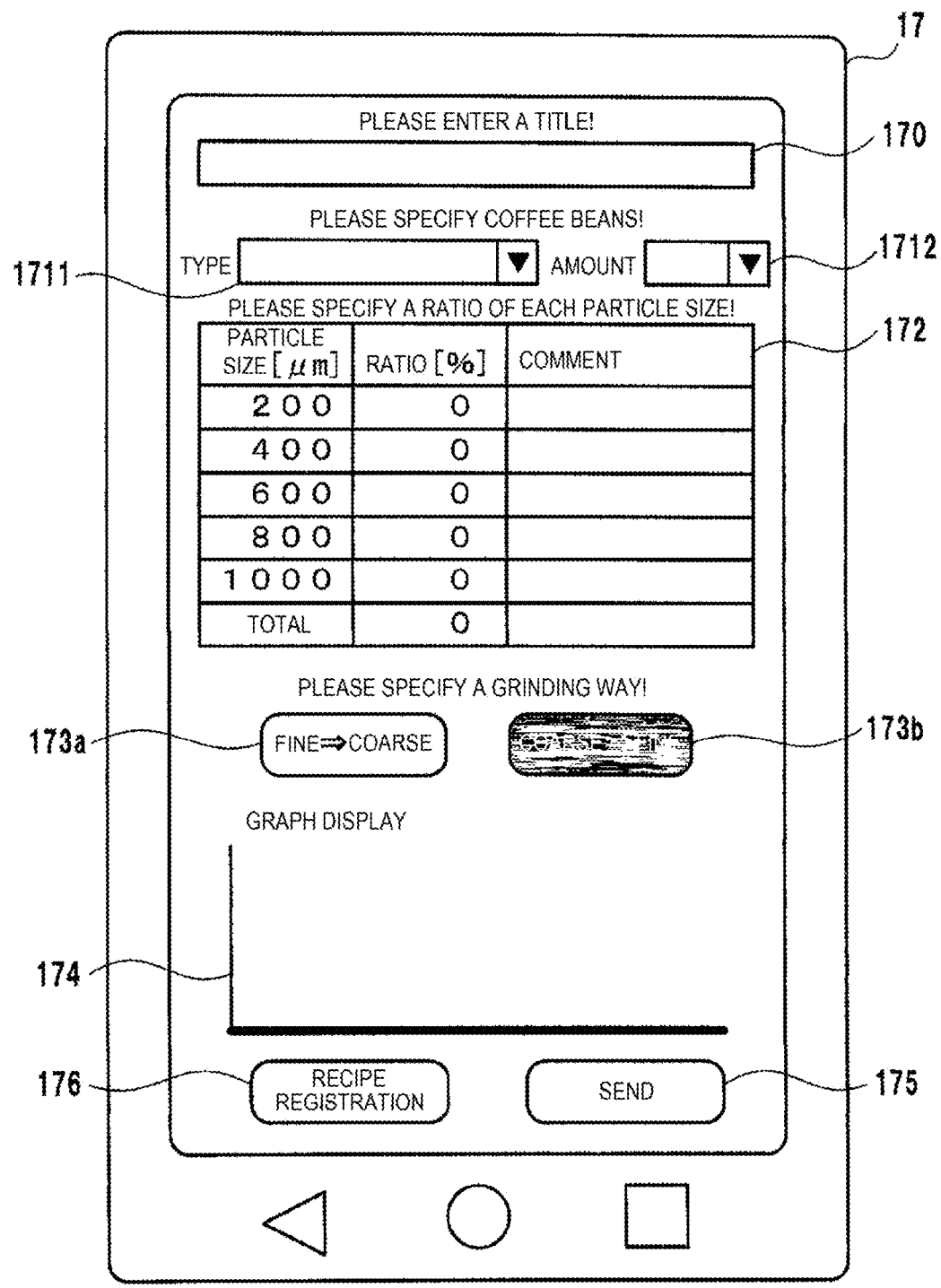

[Figure 41]
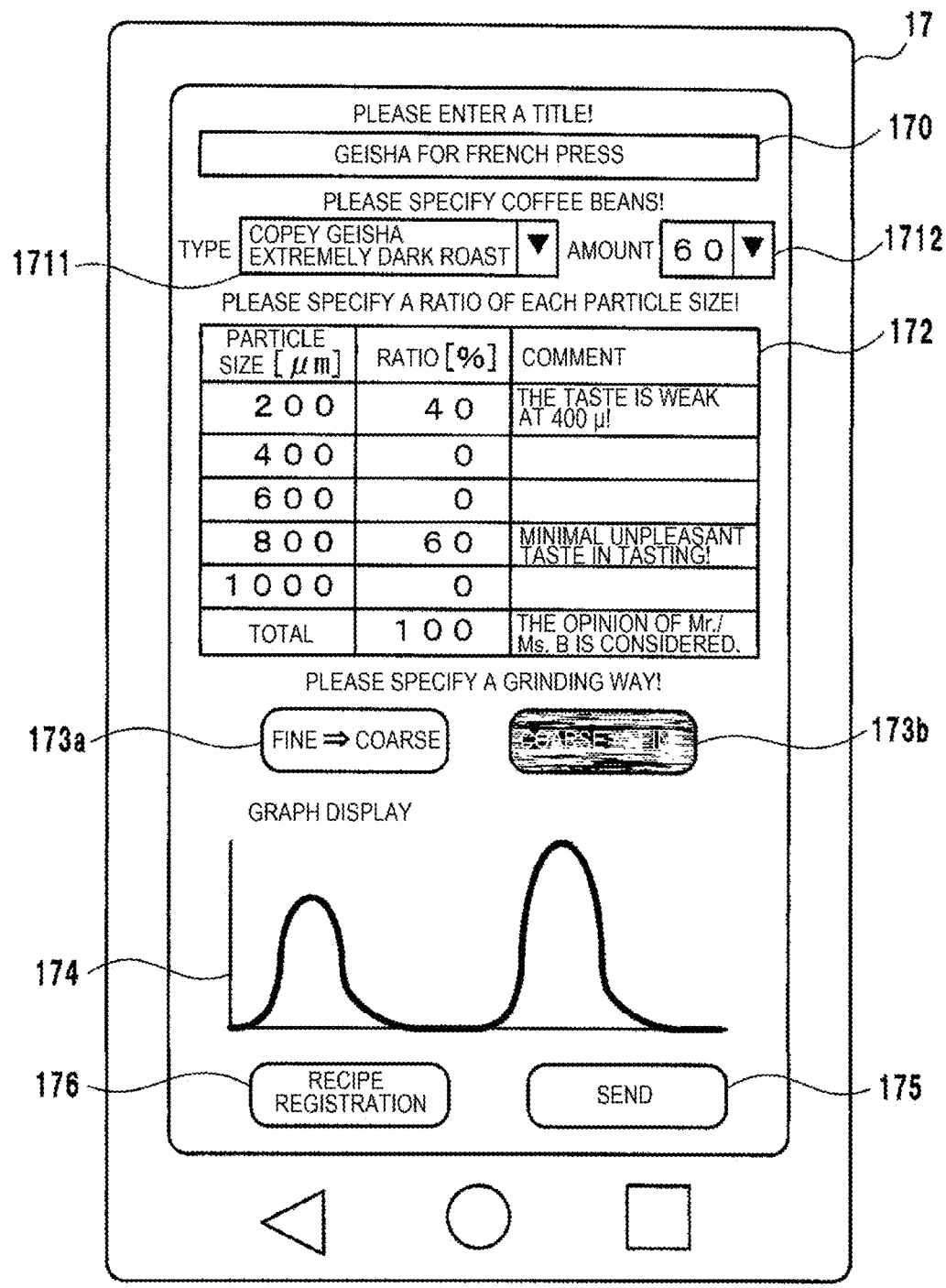

[Figure 42]

| PARTICLE SIZE [μm] | RATIO [%] | COMMENT |
|---|---|---|
| 200 | 40 | THE TASTE IS WEAK AT 400 μ! |
| 400 | 0 | |
| 600 | 60 | |
| 800 | 0 | MINIMAL UNPLEASANT TASTE IN TASTING! |
| 1000 | 0 | |
| TOTAL | 100 | THE OPINION OF Mr./Ms. B IS CONSIDERED. |

PLEASE ENTER A TITLE!
GEISHA FOR FRENCH PRESS

PLEASE SPECIFY COFFEE BEANS!
TYPE: COPEY GEISHA EXTREMELY DARK ROAST
AMOUNT: 60

PLEASE SPECIFY A RATIO OF EACH PARTICLE SIZE!

PLEASE SPECIFY A GRINDING WAY!
FINE ⇒ COARSE

GRAPH DISPLAY

RECIPE REGISTRATION    SEND

| PARTICLE SIZE [μm] | RATIO [%] | COMMENT |
|---|---|---|
| 200 | 40 | THE TASTE IS WEAK AT 400 μl |
| 600 | 60 | |
| 800 | 0 | MINIMAL UNPLEASANT TASTE IN TASTING! |
| TOTAL | 100 | THE OPINION OF Mr./Ms. B IS CONSIDERED. |

GRIND INFORMATION RECEIVED!
GEISHA FOR FRENCH PRESS
FINE ⇒ COARSE

TYPE OF BEANS: COPEY GEISHA EXTREMELY DARK ROAST
THE AMOUNT OF BEANS [g]: 60
RECIPE REGISTRATION
START GRINDING (B)

| PARTICLE SIZE [μm] | RATIO [%] | COMMENT |
|---|---|---|
| 200 | 45 | THE TASTE IS WEAK AT 400 μl |
| 600 | 55 | LOW HUMIDITY TO RATIO INCREASE |
| 800 | 0 | MINIMAL UNPLEASANT TASTE IN TASTING! |
| TOTAL | 100 | THE OPINION OF Mr./Ms. B IS CONSIDERED. |

GRIND INFORMATION RECEIVED!
GEISHA FOR FRENCH PRESS
FINE ⇒ COARSE

TYPE OF BEANS: COPEY GEISHA EXTREMELY DARK ROAST
THE AMOUNT OF BEANS [g]: 60
RECIPE REGISTRATION
START GRINDING

[Figure 44]
| PARTICLE SIZE [μm] | RATIO [%] |
|---|---|
| 200 | 45 |
| 600 | 55 |
(A)
| GAP [μm] | TIME [SECONDS] |
|---|---|
| 50 | 0.3 |
| 100 | 0.9 |
| 150 | 2.4 |
| 200 | 7.5 |
| 250 | 2.7 |
| 300 | 0.9 |
| 350 | 0.3 |
| 400 | 0.0 |
| 450 | 0.3 |
| 500 | 0.9 |
| 550 | 2.4 |
| 600 | 9.3 |
| 650 | 1.8 |
| 700 | 0.3 |
| 750 | 0.0 |
| 800 | 0.0 |
| 850 | 0.0 |
| 900 | 0.0 |
| 950 | 0.0 |
| 1000 | 0.0 |
(B)
| GAP [μm] | TIME [SECONDS] |
|---|---|
| 50 | 0.0 |
| 100 | 0.0 |
| 150 | 0.0 |
| 200 | 13.5 |
| 250 | 0.0 |
| 300 | 0.0 |
| 350 | 0.0 |
| 400 | 0.0 |
| 450 | 0.0 |
| 500 | 0.0 |
| 550 | 0.0 |
| 600 | 16.5 |
| 650 | 0.0 |
| 700 | 0.0 |
| 750 | 0.0 |
| 800 | 0.0 |
| 850 | 0.0 |
| 900 | 0.0 |
| 950 | 0.0 |
| 1000 | 0.0 |
(C)
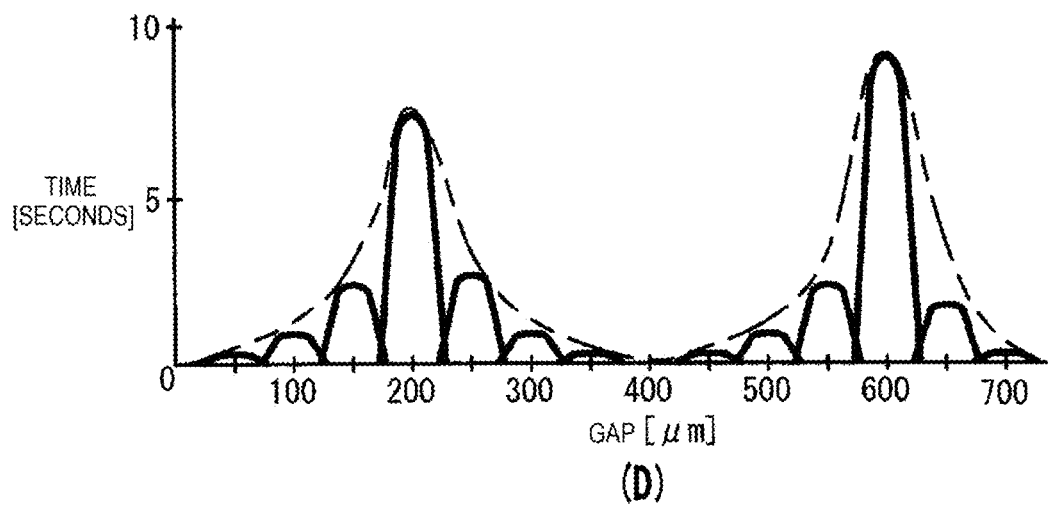
(D)

[Figure 45]
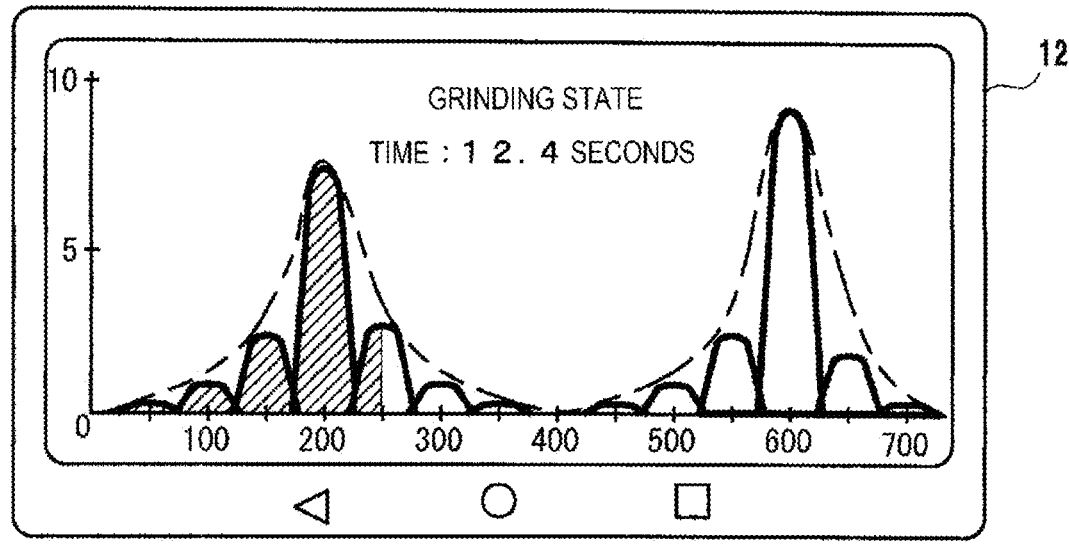
(A)
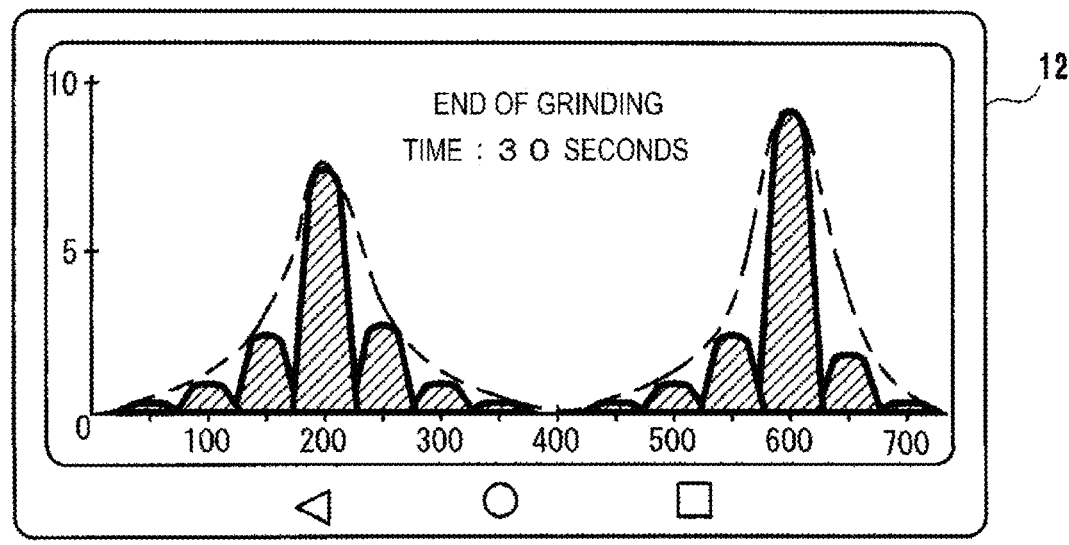
(B)

[Figure 46]
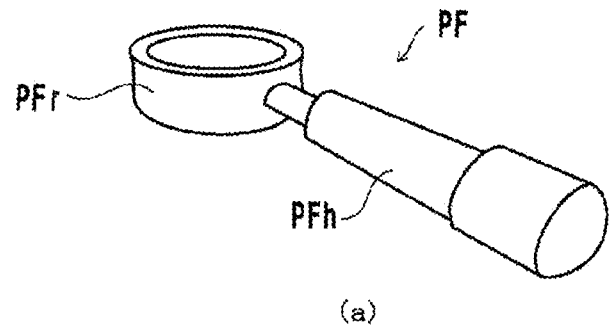
(a)
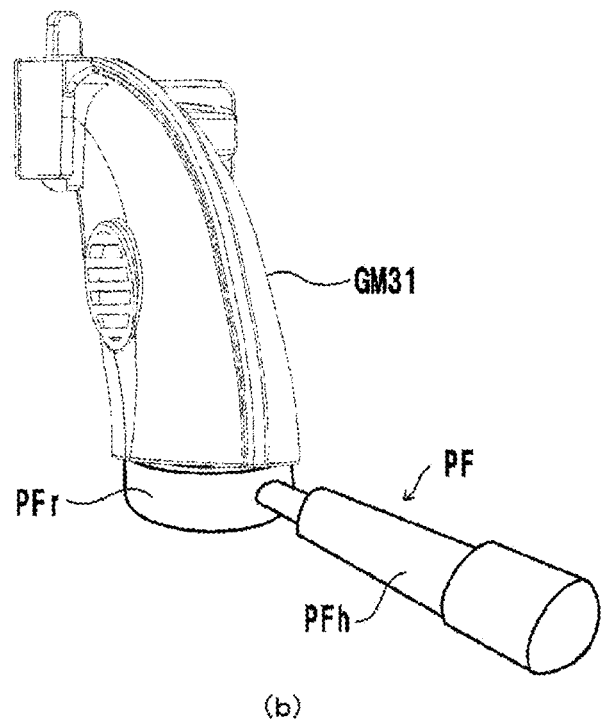
(b)
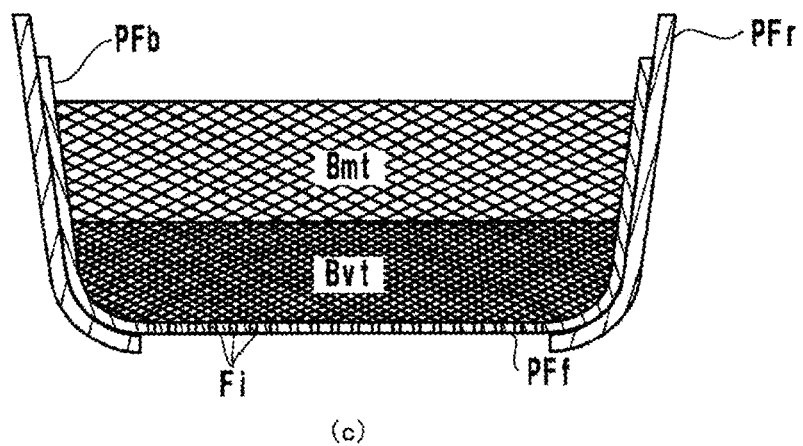
(c)

[Figure 47]
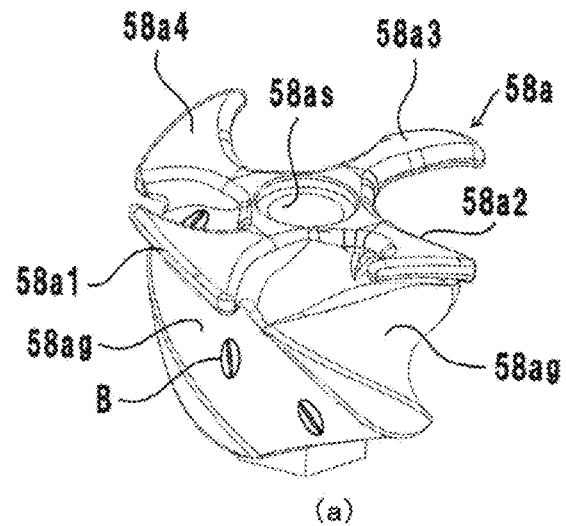
(a)
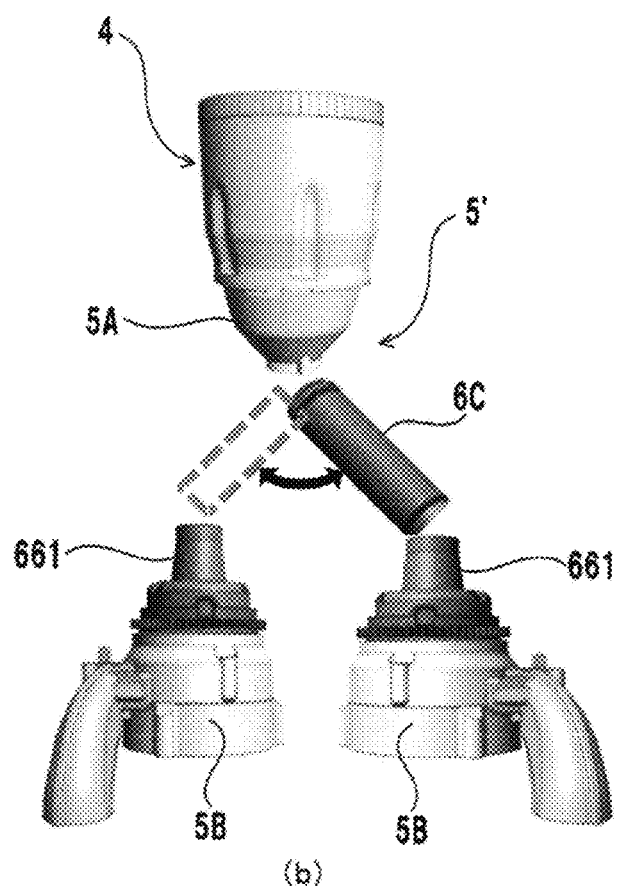
(b)

COFFEE MACHINE

TECHNICAL FIELD

The present invention relates to a coffee machine including a grinder for grinding coffee beans.

BACKGROUND ART

A coffee machine that performs preparation using coffee beans has been proposed (for example, Patent Literature 1). The coffee machine proposed in Patent Literature 1 is equipped with a coffee bean grinding device (grinder) and a coffee beverage extraction device. There are also coffee machines equipped with only a grinder.

CITATION LIST

Patent Literature

Patent Literature 1: Japanese Patent Laid-Open No. 2019-30433

SUMMARY OF INVENTION

Technical Problem

It has been found that a state for grinding coffee beans in this grinder may affect a taste of a coffee beverage extracted from ground beans.

In view of the above circumstances, an object of the present invention is to provide a coffee machine that is controlled in consideration of a state for grinding coffee beans in the grinder.

Solution to Problem

The coffee machine according to the present invention for achieving the above object is a coffee machine including a second grinder configured to grind coffee beans, in which an input amount of coffee beans to be put into the second grinder is controlled.

The coffee beans referred to herein may be cracked beans, ground beans, or beans that are not cracked or ground.

The input amount is controlled to prevent ground beans from staying in the second grinder for an unnecessarily long time. In the second grinder, when the input amount of coffee beans is larger than an output amount of ground beans, the ground beans stay in the second grinder for a longer time, and the ground beans are easily adversely affected by heat. Therefore, in the coffee machine, the input amount is controlled to prevent this from happening. Therefore, the machine is controlled in consideration of a state for grinding coffee beans in the grinder.

In the coffee machine, the input amount may be controlled in accordance with a type of coffee beans.

The type of coffee beans may be a variety of coffee beans, a degree of roasting of coffee beans, or a combination of the type and the degree of roasting.

The coffee machine may further include a first grinder provided upstream of the second grinder and configured to grind coffee beans, and the input amount of coffee beans to be put into the second grinder may be controlled by controlling a speed at which the first grinder grinds coffee beans.

The coffee machine may further include a supply device provided upstream of the second grinder and configured to supply coffee beans downstream, and the input amount of coffee beans to be put into the second grinder may be controlled by controlling a supply speed of coffee beans by the supply device.

The coffee machine may further include: a first grinder disposed upstream of the second grinder and configured to grind coffee beans; and a supply device disposed upstream of the first grinder and configured to supply coffee beans downstream, and at least one of the first grinder or the supply device may be controlled to reduce the input amount of coffee beans to be put into the second grinder.

For example, both the first grinder and the supply device may be controlled to reduce the input amount of coffee beans to be put into the second grinder.

Advantageous Effects of Invention

According to the present invention, it is possible to provide a coffee machine that is controlled in consideration of a state for grinding coffee beans in a grinder.

BRIEF DESCRIPTION OF DRAWINGS

FIG. 1 is an external view of a beverage production device 1.

FIG. 2 is a partial front view of the beverage production device 1.

FIG. 3 is a schematic diagram of functions of the beverage production device 1.

FIG. 4 is a partially cutaway perspective view of a separation device 6.

FIG. 5 is a perspective view of a drive unit 8 and an extraction container 9.

FIG. 6 is a diagram showing a closed state and an open state of the extraction container 9.

FIG. 7 is a front view showing a configuration of a part of an upper unit 8A and a lower unit 8C.

FIG. 8 is a longitudinal cross-sectional view of FIG. 7.

FIG. 9 is a schematic view of a middle unit 8B.

FIG. 10 is a block diagram of a control device 11.

FIG. 11 (A) of FIG. 11 is a flowchart of a control process related to a single coffee beverage production operation, and (B) of FIG. 11 is a flowchart of an extraction process in step S3.

FIG. 12 is a perspective view of a pulverizing device 5.

FIG. 13 is a longitudinal cross-sectional view of the pulverizing device 5 shown in FIG. 12.

FIG. 14 is a partially cutaway perspective view of the separation device 6.

FIG. 15 is a longitudinal cross-sectional view of a forming unit 6B.

FIG. 16 is a perspective view and a partially enlarged view of the forming unit 6E.

FIG. 17 is a plan view of the forming unit. 6B, and is an explanatory diagram for comparison of cross-sectional areas.

FIG. 18 is an external perspective view of a coffee bean grinding machine.

FIG. 19 is a block diagram of a control device of the coffee bean grinding machine.

FIG. 20 (a) of FIG. 20 is a diagram showing a coffee bean grinding machine GM to which a hopper unit 402 is attached instead of a canister accommodation unit 401 shown in FIG. 18, and (b) of FIG. 20 is a diagram showing the coffee bean grinding machine GM to which a funnel unit 403 is attached.

FIG. 21 (a) of FIG. 21 is a diagram schematically showing a state in which a weighing unit 404 is attached to an option attachment portion GM11, and (b) of FIG. 21 is a perspective view showing an electric screw conveyor ESC.

FIG. 22 is a diagram showing some aspects of a cover member 460 disposed in a downstream end opening 4042o of a conveying passage 4042.

FIG. 23 is a schematic diagram showing further aspects of the cover member 460.

FIG. 24 (a) of FIG. 24 is a diagram showing a state in which a lid unit GM21 for opening and closing a bean outlet GM20 provided in a center casing GM10 of the coffee bean grinding machine GM is closed, and (b) of FIG. 21 is a diagram showing a state in which the lid unit. GM21 is opened.

FIG. 25 is a diagram showing a main configuration of the pulverizing device 5 built in the coffee bean grinding machine GM in a posture in which a guide passage forming member GM22 faces the front.

FIG. 26 is a perspective view of a first grinder 5A.

FIG. 27 is a flowchart showing a grinding process of the first grinder 5A, which is executed by a processing unit 11a shown in FIG. 19.

FIG. 28 (a) of FIG. 28 is a diagram showing the separation device 6, and (b) of FIG. 28 is a diagram showing a state in which an outer circumferential wall 61a of an upper portion 61 of a collection container 60B is removed.

FIG. 29 (a) of FIG. 29 is a perspective view of the separation device 6 from which an outer case 60Bo is removed, as viewed obliquely from below, and (b) of FIG. 29 is a diagram showing a positional relation between the outer case 60Bo and an inner case 60Bi by seeing through the outer case 60Bo.

FIG. 30 (a) of FIG. 30 is a diagram schematically showing a phenomenon such as an air flow in the separation device shown in FIG. 29, and (b) of FIG. 30 is a diagram schematically showing a phenomenon such as an air flow in a separation device according to a modification.

FIG. 31 is a diagram in which a manual setting disc dial 695 shown in FIG. 25 is removed so that the entire coupling duct 661 can be seen.

FIG. 32 is a diagram schematically showing a configuration of a second grinder 5B.

FIG. 33 is a flowchart showing steps of calibration executed in an initial operation.

FIG. 34 is a diagram showing a state of calibration in stages.

FIG. 35 is a diagram showing the second grinder 5B in a grinding process.

FIG. 36 (a) of FIG. 36 is a diagram showing the manual setting disc dial 695 and a fine adjustment knob dial 696 together with a second motor 503a, and (b) of FIG. 36 is a diagram showing a coupling dial 697 and a rotation shaft 6961 of the fine adjustment knob dial 696 with the manual setting disc dial 695 and the second motor 503a removed.

FIG. 37 is a flowchart showing a control process of the processing unit 11a in a grinding process.

FIG. 38 is a flowchart showing a control process executed by the processing unit 11a when a grinding process is executed according to order information.

FIG. 39 is a diagram showing an example of data stored in a server 16.

FIG. 40 is a diagram showing an example of an order information input screen.

FIG. 41 is a diagram showing an example of an input screen in a state in which order information is input.

FIG. 42 is a diagram showing a state when order information is input.

FIG. 43 is a diagram showing a state when order information is changed.

FIG. 44 is a diagram showing an example of control parameters of the second grinder 5B for an order.

FIG. 45 is a diagram showing an example of display during execution of a grinding process.

FIG. 46 (a) of FIG. 46 is a diagram showing an example of a porter filter used when producing an espresso beverage, (b) of FIG. 46 is a diagram showing a state in which a basket PFb held by a holding portion PFr is attached to a chute GM31 of a coffee bean grinding machine with a handle PFh being held, and (c) of FIG. 46 is a diagram schematically showing a state in which ground beans ground in a grinding way from a fine grinding state to a coarse grinding state are filled into the basket PFb and subjected to leveling and tamping.

FIG. 47 (a) of FIG. 47 is a perspective view showing a single rotary blade 58a constituting the first grinder 5A, and (b) of FIG. 47 is a diagram showing a modification of the pulverizing device 5 shown in FIG. 25 and the like.

DESCRIPTION OF EMBODIMENTS

An embodiment of the present invention will be described with reference to the drawings.

<1. Overview of Beverage Production Device>

FIG. 1 is an external view of a beverage production device 1. The beverage production device 1 shown in FIG. 1 is a device for automatically producing a coffee beverage from roasted coffee beans and a liquid (here, water), and can produce a coffee beverage for one cup per one production operation. Roasted coffee beans as a raw material can be accommodated in canisters 40. A cup placing portion 110 provided in a lower portion of the beverage production device 1, and a produced coffee beverage is poured into a cup from a pouring portion 10c.

The beverage production device 1 includes a housing 100 that forms an exterior of the beverage production device 1 and encloses an internal mechanism. The housing 100 is roughly divided into a main body portion 101 and a cover portion 102 that covers a part of a front surface and a part of a side surface of the beverage production device 1. The cover portion 102 is provided with an information display device 12. The information display device 12 shown in FIG. 1 is a touch panel type display, and is capable of receiving an input from an administrator of the device or a beverage consumer in addition to splaying various types of information. The information display device 12 is attached to the cover portion 102 via a moving mechanism 12a, and can be moved in a predetermined range in an upper-lower direction by the moving mechanism 12a.

The cover portion 102 is provided with a bean inlet 103 and an opening and closing door 103a that opens and closes the bean inlet 103. Roasted coffee beans different from the roasted coffee beans accommodated in the canister 40 can be input to the bean inlet 103 by opening the opening and closing door 103a. As a result, it is possible to provide a cup of special beverage to a beverage consumer.

The cover portion 102 shown in FIG. 1 is made of translucent material such as acrylic or glass, and constitutes a transparent cover whose entire body is a transmissive portion. Therefore, an inner mechanism covered by the cover portion 102 can be visually recognized from the outside. In the beverage production device 1 shown in FIG. 1, a part of a production portion for producing a coffee beverage can be visually recognized through the cover portion 102. The main body portion 101 shown in FIG. 1 is entirely a non-transmissive portion, and it is difficult to visually recognize the inside of the main body portion 101 from the outside.

FIG. 2 is a partial front view of the beverage production device 1, and is a diagram showing a part of the production portion that can be visually recognized by a user in a front view of the beverage production device 1. The cover portion 102 and the information display device 12 are shown by imaginary lines.

The housing 100 in a front portion of the beverage production device 1 has a double structure of the main body portion 101 and the cover portion 102 on an outer side (front side) of the main body portion 101. A part of mechanisms of the production portion are disposed between the main body portion 101 and the cover portion 102 in a front-rear direction, and can be visually recognized by a user through the cover portion 102.

A part of the mechanisms of the production portion that can be visually recognized by a user through the cover portion 102 include a collective conveying portion 42, a first grinder 5A, a second grinder 5B, a separation device 6, an extraction container 9, and the like. A rectangular concave portion 101a recessed in a rear side is formed in a front portion of the main body portion 101, and the extraction container 9 and the like are positioned in a rear side of the concave portion 101a.

Since these mechanisms can be visually recognized from the outside through the cover portion 102, an administrator may easily inspect or check the operation. In addition, a beverage consumer may enjoy a process of producing a coffee beverage.

A right end portion of the cover portion 102 is supported by the main body portion 101 via a hinge 102a so as to be freely opened and closed horizontally. An engaging portion 102b is provided at a left end portion of the cover portion 102 to maintain the main body portion 101 and the cover portion 102 in a closed state. The engaging portion 102b is, for example, a combination of a magnet and iron. By opening the cover portion 102, an administrator can inspect a part of the production portion described above on an inner side of the cover portion 102.

The cover portion 102 shown in FIG. 1 is of a horizontal opening type, but may be of a vertical opening type or a slide type. In addition, the cover portion 102 may be configured such that the cover portion 102 cannot be opened or closed.

FIG. 3 is a schematic diagram of functions of the beverage production device 1. The beverage production device 1 includes a bean processing device 2 and an extraction device 3 as the production portion of a coffee beverage.

The bean processing device 2 produces ground beans from roasted coffee beans. The extraction device 3 extracts a coffee liquid from the ground beans supplied from the bean processing device 2. The extraction device 3 includes a fluid supply unit 1, a drive unit 8 (see FIG. 5) to be described later, the extraction container 9, and a switching unit 10. The around beans supplied from the bean processing device 2 are put into the extraction container 9. The fluid supply unit 7 introduces hot water into the extraction container 9. A coffee liquid is extracted from the ground beans in the extraction container 9. The hot water containing the extracted coffee liquid is dispensed into a cup C as a coffee beverage through the switching unit 10.

<2. Fluid Supply Unit and Switching Unit>

Configurations of the fluid supply unit 7 and the switching unit 10 will be described with reference to FIG. 3. First, the fluid supply unit 7 will be described. The fluid supply unit 7 supplies hot water to the extraction container 9 and controls an atmospheric pressure in the extraction container 9. In the present specification, when the atmospheric pressure is indicated by a numeral, it means an absolute pressure unless otherwise specified, and a gauge pressure means an atmospheric pressure at which the atmospheric pressure is 0 atm. The atmospheric pressure refers to an atmospheric pressure around the extraction container 9 or an atmospheric pressure of the beverage production device 1. For example, when the beverage production device 1 is disposed at a point of 0 meter above sea level, the atmospheric pressure is a standard atmosphere (1013.25 hPa) at 0 meter above sea level of the international standard atmosphere ([abbreviation] ISA) established in 1976 by the international civil aviation organization ([abbreviation] ICAO]).

The fluid supply unit 7 includes pipes L1 to L3. The pipe L1 is a pipe through which air flows, and the pipe L2 is a pipe through which water flows. The pipe L3 is a pipe through which both air and water can flow.

The fluid supply unit 7 includes a compressor 70 as a pressure source. The compressor 70 compresses and sends out the air. The compressor 70 is driven by, for example, a motor (not shown) as a drive source. The compressed air sent out from the compressor 70 is supplied to a reserve tank (accumulator) 71 via a check valve 71a. An atmospheric pressure in the reserve tank 71 is monitored by a pressure sensor 71b, and the compressor 70 is driven such that the atmospheric pressure is maintained at a predetermined atmospheric pressure (for example, 7 atm (6 atm in gauge pressure)). A drain 71c for draining water is provided in the reserve tank 71, and water generated by the compression of air can be drained.

Hot water (water) constituting a coffee beverage is stored in a water tank 72. The water tank 72 is provided with a heater 72a for heating the water in the water tank 72 and a temperature sensor 72b for measuring a temperature of the water. The heater 72a maintains a temperature of the accumulated hot water at a predetermined temperature (for example, 120° C.) based on a detection result of the temperature sensor 72b. For example, the heater 72a is turned on when the temperature of the hot water is 118° C., and is turned off when the temperature of the hot water is 120° C.

The water tank 72 is also provided with a water level sensor 72c. The water level sensor 72c detects a water level of the hot water in the water tank 72. When the water level sensor 72c detects that the water level is lower than a predetermined water level, water is supplied to the water tank 72. The water tank 72 shown in FIG. 3 is supplied with tap water via a water purifier (not shown). An electromagnetic valve 72d is provided in the middle of the pipe L2 from the water purifier, and when a decrease in the water level is detected by the water level sensor 72c, the electromagnetic valve 72d is opened to supply water, and when the water level reaches a predetermined water level, the electromagnetic valve 72d is closed to cut off the supply of water in this way, the hot water in the water tank 72 is maintained at a constant water level. The water may be supplied to the water tank 72 every time the hot water used for producing one coffee beverage is discharged.

The water tank 72 is also provided with a pressure sensor 72g. The pressure sensor 72g detects an atmospheric pressure in the water tank 72. The atmospheric pressure in the reserve tank 71 is supplied to the water tank 72 via a pressure regulating valve 72e and an electromagnetic valve 72f. The pressure regulating valve 72e reduces the atmospheric pressure supplied from the reserve tank 71 to a predetermined atmospheric pressure. For example, the atmospheric pressure is reduced to 3 atm (2 atm in gauge pressure). The electromagnetic valve 72*f* switches between supplying and cutting off the atmospheric pressure regulated by the pressure regulating valve 72*e* to the water tank 72. The electromagnetic valve 72*f* is controlled to open and close so that the atmospheric pressure in the water tank 72 is maintained at 3 atm except when tap water is supplied to the water tank 72. When tap water is supplied to the water tank 72, the atmospheric pressure in the water tank 72 is reduced to a pressure lower than a water pressure of the tap water (for example, less than 2.5 atm) by an electromagnetic valve 72*h* so that the tap water is smoothly supplied to the water tank 72 by the water pressure of the tap water. The electromagnetic valve 72*h* switches whether to open the water tank 72 to the atmosphere, and opens the water tank 72 to the atmosphere when the atmospheric pressure is reduced. In addition, the electromagnetic valve 72*h* opens the water tank 72 to the atmosphere when the atmospheric pressure the water tank 72 exceeds 3 atm and maintains the inside of the water tank 72 at 3 atm, except when tap water is supplied to the water tank 72.

The hot water in the water tank 72 is supplied to the extraction container 9 via a check valve 72*j*, an electromagnetic valve 72*i*, and the pipe L3. The hot water is supplied to the extraction container 9 by opening the electromagnetic valve 72*i*, and the supply of the hot water is cut off by closing the electromagnetic valve 72*i*. An amount of the hot water to be supplied to the extraction container 9 can be controlled by an open time of the electromagnetic valve 72*i*. However, the opening and closing of the electromagnetic valve 72*i* may be controlled by measuring the supply amount. A temperature sensor 73*e* for measuring a temperature of the hot water is provided in the pipe L3, and the temperature of the hot water supplied to the extraction container 9 is monitored.

The atmospheric pressure of the reserve tank 71 is also supplied to the extraction container 9 via a pressure regulating valve 73*a* and an electromagnetic valve 73*b*. The pressure regulating valve 73*a* reduces the atmospheric pressure supplied from the reserve tank 71 to a predetermined atmospheric pressure. For example, the atmospheric pressure is reduced to 5 atm (4 atm in gauge pressure). The electromagnetic valve 73*b* switches between supplying and cutting off the atmospheric pressure regulated by the pressure regulating valve 73*a* to the extraction container 9. The atmospheric pressure in the extraction container 9 is detected by a pressure sensor 73*d*. When the extraction container 9 is pressurized, the electromagnetic valve 73*b* is opened based on a detection result of the pressure sensor 73*d*, and the inside of the extraction container 9 is pressurized to a predetermined atmospheric pressure (for example, a maximum of 5 atm (4 atm in gauge pressure)). The atmospheric pressure in the extraction container 9 can be reduced by an electromagnetic valve 73*c*. The electromagnetic valve 73*c* switches whether to open the extraction container 9 to the atmosphere, and opens the extraction container 9 to the atmosphere when the pressure is abnormal (for example, when the inside of the extraction container 9 exceeds 5 atm).

When the production of one coffee beverage is completed, the inside of the extraction container 9 is washed with tap water. The electromagnetic valve 73*f* is opened at the time of washing, and supplies tap water to the extraction container 9.

Next, the switching unit 10 will be described. The switching unit 10 is a unit that switches a feed-out destination of a liquid fed out from the extraction container 9 to either the pouring portion 10*c* or a waste tank T. The switching unit 10 includes a switching valve 10*a* and a motor 10*b* that drives the switching valve 10*a*. When a coffee beverage in the extraction container 9 is to be feeding out, the switching valve 10*a* switches a flow path to the pouring portion 10*c*. The coffee beverage is poured into the cup C from the pouring portion 10*c*. When a waste liquid (tap water) and a residue (ground beans) at the time of washing are to be discharged, the flow path is switched to the waste tank T. The switching valve 10*a* shown in FIG. 3 is a three-port ball valve. Since the residue passes through the switching valve 10*a* at the time of washing, the switching valve 10*a* is preferably a ball valve, and the motor 10*b* switches the flow path by rotating a rotation shaft thereof.

<3. Bean Processing Device>

The bean processing device 2 will be described with reference to FIGS. 1 and 2. The bean processing device 2 includes a reservoir device 4 and a pulverizing device 5.

<3-1. Reservoir Device>

The reservoir device 4 includes the plurality of canisters 40 in which roasted coffee beans are accommodated. Three canisters 40 shown in FIG. 1 are provided. Each of the canisters 40 includes a cylindrical main body 40*a* for accommodating roasted coffee beans, and a handle 40*b* provided on the main body 40*a*, and is configured to be detachably attached to the beverage production device 1.

Each of the canisters 40 may accommodate different types of roasted coffee beans, and may be configured such that a type of roasted coffee beans used for producing a coffee beverage can be selected according to an operation input to the information display device 12. The roasted coffee beans of different types are, for example, roasted coffee beans of different coffee bean varieties. The roasted coffee beans of different types are coffee beans of the same type, but may be roasted coffee beans of different degrees of roasting. The roasted coffee beans of different types may be roasted coffee beans of different varieties and degrees of roasting. In addition, roasted coffee beans in which roasted coffee beans of a plurality of types and varieties are mixed may be accommodated in at least one of the three canisters 40. In this case, roasted coffee beans of each variety may have the same degree of roasting.

Although a plurality of canisters 40 are provided in the beverage production device 1 shown in FIG. 1, only one canister 40 may be provided. When a plurality of canisters 40 are provided, roasted coffee beans of the same type may be accommodated in all or a plurality of canisters 40.

Each of the canisters 40 is detachably attached to a conveyor 41, which is a weighing conveying device. The conveyor 41 is, for example, an electric screw conveyor, and automatically measures a predetermined amount of roasted coffee beans accommodated in the canister 40 and feeds out the roasted coffee beans to a downstream side.

Each of the conveyors 41 discharges the roasted coffee beans to the collective conveying portion 42 on the downstream side. The collective conveying portion 42 is formed of a hollow member, and forms a conveying passage for roasted coffee beans from each of the conveyors 41 to the pulverizing device 5 (in particular, the first grinder 5A). The roasted coffee beans discharged from each of the conveyors 41 move inside the collective conveying portion 42 by an own weight thereof, and flow down to the pulverizing device 5.

A guide portion 42*a* is formed in the collective conveying portion 42 at a position corresponding to the bean inlet 103. The guide portion 42*a* forms a passage for guiding roasted coffee beans put from the bean inlet 103 to the pulverizing device 5 (in particular, the first grinder 5A). As a result, in addition to the roasted coffee beans accommodated in the canister 40, a coffee beverage made from roasted coffee beans put from the bean inlet 103 can be produced.

<3-2. Pulverizing Device>

The pulverizing device 5 will be described with reference to FIGS. 2 and 4. FIG. 4 is a partially cutaway perspective view of the separation device 6. The pulverizing device 5 includes the first grinder 5A, the second grinder 5B, and the separation device 6. The first grinder 5A and the second grinder 5B are mechanisms for grinding roasted coffee beans supplied from the reservoir device 4. The roasted coffee beans supplied from the reservoir device 4 are ground by the first grinder 5A, then further ground by the second grinder 5B into powder, and are put into the extraction container 9 from a discharge pipe 5C.

The first grinder 5A and the second grinder 5B have different particle sizes for grinding beans. The first grinder 5A is a grinder for coarse grinding, and the second grinder 5B is a grinder for fine grinding. The first grinder 5A and the second grinder 5B are electric grinders, and include a motor as a drive source, a rotary blade driven by the motor, and the like. A size (particle size) of roasted coffee beans to be ground can be changed by changing the number of rotations of the rotary blade.

The separation device 6 is a mechanism for separating wastes from ground beans. The separation device 6 includes a passage portion 63a disposed between the first grinder 5A and the second grinder 5B. The passage portion 63a is a hollow body that forms a separation chamber through which ground beans falling freely from the first grinder 5A pass. A passage portion 63b extending in a direction (for example, a left-right direction) intersecting a passing direction (for example, the upper-lower direction) of the ground beans is connected to the passage portion 63a, and a suction unit 60 is connected to the passage portion 63b. By the suction unit 60 suctioning the air in the passage portion 63a, lightweight objects such as chaff and fine powder are suctioned. As a result, the wastes can be separated from the ground beans.

The suction unit 60 is a mechanism of a centrifugal separation type. The suction unit 60 includes an air blowing unit 60A and a collection container 60B. The air blowing unit 60A shown in FIG. 4 is a fan motor, and exhausts the air in the collection container 60B upward.

The collection container 60B includes an upper portion 61 and a lower portion 62 that are separably engaged with each other. The lower portion 62 has a bottomed cylindrical shape with an open upper side, and forms a space for accumulating wastes. The upper portion 61 constitutes a lid portion to be attached to the opening of the lower portion 62. The upper portion 61 includes a cylindrical outer circumferential wall 61a and an exhaust pipe 61b formed coaxially with the outer circumferential wall 61a. The air blowing unit 60A is fixed to the upper portion 61 above the exhaust pipe 61b so as to suction the air in the exhaust pipe 61b. The passage portion 63b is connected to the upper portion 61. The passage portion 63b is open to the side of the exhaust pipe 61b.

As the air blowing unit 60A is driven, air flows indicated by arrows d1 to d3 in FIG. 4 are generated. Due to the air flows, the air containing wastes is suctioned into the collection container 60B from the passage portion 63a through the passage portion 63b. Since the passage portion 63b is open to the side of the exhaust pipe 61b, the air containing wastes swirls around the exhaust pipe 61b. A waste D in the air falls by a weight thereof and is collected in a part of the collection container 605 (accumulates on a bottom surface of the lower portion 62). The air is exhausted upward through the inside of the exhaust pipe 61b.

A plurality of fins 61d are integrally formed on a circumferential surface of the exhaust pipe 61b. The plurality of fins 61d are disposed in a circumferential direction of the exhaust pipe 61b. Each of the fins 61d is inclined obliquely with respect to an axial direction of the exhaust pipe 61b. The provision of such fins 61d facilitates the swirling of the air containing the waste D around the exhaust pipe 61b.

The lower portion 62 shown in FIG. 4 is made of a translucent material such as acrylic or glass, and constitutes a transparent container whose entire body is a transmissive portion. The lower portion 62 is a portion covered by the cover portion 102 (FIG. 2). An administrator or a beverage consumer can visually recognize the waste D accumulated in the lower portion 62 through the cover portion 102 and a circumferential wall of the lower portion 62. The administrator may easily determine the cleaning timing of the lower portion 62, and since the beverage consumer can visually recognize that the waste D is removed, the expectation of the quality of a coffee beverage being produced may be increased.

As described above, roasted coffee beans supplied from the reservoir device 4 are first coarsely ground by the first grinder 5A, and wastes are separated by the separation device 6 when the coarsely ground beans pass through the passage portion 63a. The coarsely ground beans from which the wastes are separated are finely ground by the second grinder 5B. The wastes to be separated by the separation device 6 are typically chaff and fine powder. These may impair the taste of a coffee beverage, and the quality of the coffee beverage can be improved by removing chaff and the like from ground beans.

Roasted coffee beans may be pulverized by one grinder (one-stage pulverizing). However, performing two-stage pulverizing by the first grinder 5A and the second grinder 5B makes it easier for around beans to have a uniform particle size and makes it possible to have a constant degree of extraction of a coffee liquid. At the time of pulverization of beans, heat may be generated due to friction between a cutter and the beans. By performing two-stage pulverizing, heat generation due to friction during pulverizing can be prevented, and deterioration of ground beans (for example, deterioration or flavor) can be prevented.

Through steps of coarse grinding, separation of wastes, and fine grinding, it is possible to increase a mass difference between the wastes such as chaff and ground beans (necessary part) when the wastes are separated. This makes it possible to improve a separation efficiency of wastes, and to prevent ground beans (necessary part) from being separated as wastes. In addition, since a waste separation process using air suction is interposed between the coarse grinding and the fine grinding, heat generation of ground beans can be prevented by air cooling. Thereby, deterioration of ground beans (for example, deterioration of flavor) can be prevented.

<4. Drive Unit and Extraction Container>

<4-1. Overview>

The drive unit. 8 and the extraction container 9 of the extraction device 3 will be described with reference to FIG. 5. FIG. 5 is a perspective view of the drive unit 8 and the extraction container 9. Most of the drive unit 8 is enclosed by the main body portion 101.

The drive unit. 8 is supported by a frame F. The frame F includes upper and lower beam portions F1 and F2 and a column portion F3 that supports the beam portions F1 and F2. The drive unit 8 is roughly divided into three units: an upper unit 8A, a middle unit 8B, and a lower unit 80. The upper unit 8A is supported by the beam portion F1. The middle unit 8B is supported by the beam portion F1 and the column portion F3 between the beam portion F1 and the beam portion F2. The lower unit 80 is supported by the beam portion F2.

The extraction container 9 is a chamber including a container main body 90 and a lid unit 91. The extraction container 9 may be referred to as a chamber. The middle unit 8B includes an arm member 820 that detachably holds the container main body 90. The arm member 820 includes a holding member 820a and a pair of shaft members 820b spaced apart from each other in the left-right direction. The holding member 820a is an elastic member such as a resin formed in a C-shaped clip shape, and holds the container main body 90 by its elastic force. The holding member 820a holds left and right side portions of the container main body 90, and a front side of the container main body 90 is exposed. This makes it easier to visually recognize the inside of the container main body 90 in a front view.

The container main body 90 is attached to and detached from the holding member 820a by manual operation, and the container main body 90 is attached to the holding member 820a by pressing the container main body 90 rearward in the front-rear direction against the holding member 820a. The container main body 90 can be separated from the holding member 820a by pulling out the container main body 90 forward in the front-rear direction from the holding member 820a.

Each of the pair of shaft members 820b is a rod extending in the front-rear direction and is a member that supports the holding member 820a. Although the number of the shaft members 820b is two, the number of the shaft members 820b may be one or three or more. The holding member 820a is fixed to front end portions of the pair of shaft members 820b. With a mechanism to be described later, the pair of shaft members 820b are advanced and retracted in the front-rear direction, whereby the holding; member 820a is advanced and retracted in the front-rear direction, and a moving operation of moving the container main body 90 in parallel in the front-rear direction can be performed. The middle unit 8E can also perform a pivoting operation of turning the extraction container 9 upside down, as will be described later.

<4-2, Extraction Container>

The extraction container 9 will be described with reference to FIG. 6. FIG. 6 is a diagram showing a closed state and an open state of the extraction container 9. As described above, the extraction container 9 is turned upside down by the middle unit 8E. The extraction container 9 in FIG. 6 shows a basic posture in which the lid unit 91 is positioned on an upper side. In the following description, when describing an upper-lower positional relation, the upper-lower positional relation means an upper-lower positional relation in the basic posture unless otherwise specified.

The container main body 90 is a bottomed container and has a bottle shape including a neck portion 90b, a shoulder portion 90d, a body portion 90e, and a bottom portion 90f. A flange portion 90c defining an opening 90a communicating with an internal space of the container main body 90 is formed at an end portion (an upper end portion of the container main body 90) of the neck portion 90b.

Both the neck portion 90b and the body portion 90e have a cylindrical shape. The shoulder portion 90d is a portion between the neck portion 90b and the body portion 90e, and has a tapered shape such that a cross-sectional area of an internal space thereof gradually decreases from the body portion 90e side toward the neck portion 90b side.

The lid unit 91 is a unit that opens and closes the opening 90a. The opening and closing operation (raising and lowering operation) of the lid unit 91 is performed by the upper unit 8A.

The container main body 90 includes a main body member 900 and a bottom member 901. The main body member 900 is a cylindrical member that forms the neck portion 90b, the shoulder portion 90d, and the body portion 90e and open at the top and bottom. The bottom member 901 is a member that forms the bottom portion 90f, and is inserted into and fixed to a lower portion of the main body member 900. A seal member 902 is interposed between the main body member 900 and the bottom member 901 to improve the airtightness in the container main body 90.

The main body member 900 shown in FIG. 6 is made of a translucent material such as acrylic or glass, and constitutes a transparent container whose entire body is a transmissive portion. An administrator or a beverage consumer can visually recognize an extraction state of a coffee beverage in the container main body 90 through the cover portion 102 and the main body member 900 of the container main body 90. The administrator may easily check an extraction operation, and the beverage consumer may enjoy the extraction state.

A convex portion 901c is provided in a central portion of the bottom member 901, and the convex portion 901c is provided with a communication hole that allows the inside of the container main body 90 to communicate with the outside and a valve (a valve 903 in FIG. 8) that opens and closes the communication hole. The communication hole is used for discharging a waste liquid and a residue when cleaning the inside of the container main body 90. A seal member 908 is provided on the convex portion 901c, and the seal member 908 is a member for maintaining the airtightness between the upper unit 8A or the lower unit 80 and the bottom member 901.

The lid unit. 91 includes a base member 911 having a hat shape. The base member 911 includes a convex portion 911d and a flange portion 911c that overlaps the flange portion 90c when the lid unit 91 is closed. The convex portion 911d has the same structure as that of the convex portion 901c of the container main body 90, and's provided with a communication hole that allows the inside of the container main body 90 to communicate with the outside, and a valve (a valve 913 in FIG. 8) that opens and closes the communication hole. The communication hole of the convex portion 911d is mainly used for pouring hot water into the container main body 90 and feeding out a coffee beverage. A seal member 918a is provided on the convex portion 911d. The seal member 918a is a member for maintaining the airtightness between the upper unit 8A or the lower unit 8C and the base member 911. The lid unit 91 is also provided with a seal member 919. The seal member 919 improves the airtightness between the lid unit 91 and the container main body 90 when the lid unit 91 is closed. A filter for filtration is held in the lid unit 91.

<4-3. Upper Unit and Lower Unit>

The upper unit. 8A and the lower unit 80 will be described with reference to FIGS. 7 and 8. FIG. 7 is a front view showing a configuration of a part of the upper unit 8A and the lower unit 8C, and FIG. 8 is a longitudinal cross-sectional view of FIG. 7.

The upper unit 8A includes an operation unit 81A. The operation unit 81A performs the opening and closing operation (lifting and lowering) of the lid unit 91 with respect to the container main body 90 and an opening and closing operation of the valves of the convex portions 901c and 911d. The operation unit 81A includes a support member 800, a holding member 801, a lifting and lowering shaft 802, and a probe 803.

The support member 800 is fixed such that a relative position with respect to the frame F does not change, and accommodates the holding member 801. The support member 800 also includes a communication portion 800a that allows the pipe L3 to communicate with the inside of the support member 800. Hot water, tap water, and atmospheric pressure supplied from the pipe L3 are introduced into the support member 800 via the communication portion 800a.

The holding member 801 is a member capable of detachably holding the lid unit 91. The holding member 801 has a cylindrical space into which the convex portion 911d of the lid unit 91 or the convex portion 901c of the bottom member 901 is inserted, and includes a mechanism that detachably holds the convex portion 911d and the convex portion 901c. The mechanism is, for example, a snap ring mechanism, and is engaged by a constant pressing force, and is disengaged by a constant separating force. The hot water, tap water, and atmospheric pressure supplied from the pipe L3 can be supplied into the extraction container 9 via the communication portion 800a and the communication hole 801a of the holding member 801.

The holding member 801 is also a movable member provided slidably in the upper-lower direction in the support member 800. The lifting and lowering shaft 802 is provided such that its axial direction is in the upper-lower direction. The lifting and lowering shaft 802 airtightly penetrates a top portion of the support member 800 in the upper-lower direction, and is provided so as to be vertically lifted and lowered with respect to the support member 800.

A top portion of the holding member 801 is fixed to a lower end portion of the lifting and lowering shaft 802. By the lifting and lowering of the lifting and lowering shaft. 802, the holding member 801 slides in the upper-lower direction, and the holding member 801 can be attached to and separated from the convex portion 911d and the convex portion 901c. In addition, the lid unit 91 can be opened and closed with respect to the container main body 90.

A screw 802a constituting a lead screw mechanism is formed on an outer circumferential surface of the lifting and lowering shaft 802. A nut 804b is screwed to the screw 802a. The upper unit 8A includes a motor 804a, and the nut 804b is rotated on the spot by a driving force of the motor 804a (without moving up and down). The lifting and lowering shaft 802 is lifted and lowered by the rotation of the nut 804b.

The lifting and lowering shaft 802 is a tubular shaft having a through hole in its central axis, and the probe 803 is inserted into the through hole in a vertically slidable manner. The probe 803 airtightly penetrates the top portion of the holding member 801 in the upper-lower direction, and is provided so as to be vertically lifted and lowered with respect to the support member 800 and the holding member 801.

The probe 803 is an operator that opens and closes the valves 913 and 903 provided inside the convex portions 911d and 901c, and the valves 913 and 903 can be changed from a closed state to an open state by lowering the probe 803, and can be changed from the open state to the closed state (due to the action of a return spring (not shown)) by lifting the probe 803.

A screw 803a constituting a lead screw mechanism is formed on an outer circumferential surface of the probe 803. A nut 805b is screwed to the screw 803a. The upper unit 8A includes a motor 805a, and the nut 805b is rotated on the spot by a driving force of the motor 805a (without moving up and down). The probe 803 is lifted and lowered by the rotation of the nut 805b.

The lower unit 80 includes an operation unit 810. The operation unit 810 has a configuration obtained by vertically turning the operation unit 81A upside down, and performs the opening and closing operation of the valves 913 and 903 provided inside the convex portions 911d and 901c. Although the operation unit. 810 is also configured to be capable of opening and closing the lid unit 91, the operation unit 810 is not used to open and close the lid unit 91.

Hereinafter, although the description of the operation unit 810 is substantially the same as the description of the operation unit 81A, the operation unit 810 will be described below. The operation unit 810 includes a support member 810, a holding member 811, a lifting and lowering shaft 812, and a probe 813.

The support member 810 is fixed such that a relative position with respect to the frame F does not change, and accommodates the holding member 811. The support member 810 also includes a communication portion 810a that allows the switching valve 10a of the switching unit 10 to communicate with the inside of the support member 810. Residues of a coffee beverage, tap water, and ground beans in the container main body 90 are introduced into the switching valve 10a via the communication portion 810a.

The holding member 811 has a cylindrical space into which the convex portion 911d of the lid unit 91 or the convex portion 901c of the bottom member 901 is inserted, and includes a mechanism that detachably holds the convex portion 911d and the convex portion 901c. The mechanism is, for example, a snap ring mechanism, and is engaged by a constant pressing force, and is disengaged by a constant separating force. Residues of a coffee beverage, tap water, and ground beans in the container main body 90 are introduced into the switching valve 10a via the communication portion 810a and a communication hole 811a of the holding member 811.

The holding member 811 is also a movable member provided slidably in the upper-lower direction in the support member 810. The lifting and lowering shaft 812 is provided such that its axial direction is in the upper-lower direction. The lifting and lowering shaft 812 airtightly penetrates a bottom portion of the support member 800 in the upper-lower direction, and is provided so as to be vertically lifted and lowered with respect to the support member 810.

A bottom portion of the holding member 811 is fixed to a lower end portion of the lifting and lowering shaft 812. By the lifting and lowering of the lifting and lowering shaft 812, the holding member 811 slides in the upper-lower direction, and the holding member 811 can be attached to and separated from the convex portion 901c and the convex portion 911d.

A screw 812a constituting a lead screw mechanism is formed on an outer circumferential surface of the lifting and lowering shaft 812. A nut 814b is screwed to the screw 812a. The lower unit 8C includes a motor 814a, and the nut 814b is rotated on the spot by a driving force of the motor 814a (without moving up and down). The lifting and lowering shaft 812 is lifted and lowered by the rotation of the nut 814b.

The lifting and lowering shaft. 812 is a tubular shaft having a through hole central axis, and the probe 813 is inserted into the through hole in a vertically slidable manner. The probe 813 airtightly penetrates the bottom portion of the holding member 811 in the upper lower direction, and is provided so as to be vertically lifted and lowered with respect to the support member 810 and the holding member 811.

The probe 813 is an operator that opens and closes the valves 913 and 903 provided inside the convex portions 911d and 901c, and the valves 913 and 903 can be changed from the closed state to the open state by lifting the probe 813, and can be changed from the open state to the closed state (due to the action of a return spring (not shown)) by lowering the probe 813.

A screw 813a constituting a lead screw mechanism is formed on an outer circumferential surface of the probe 313. A nut 815b is screwed to the screw 813a. The lower unit 80 includes a motor 815a, and the nut 815b is provided so as to rotate on the spot by a driving force of the motor 815a (without moving up and down). The probe 813 is lifted and lowered by the rotation of the nut 815b.

<4-4. Middle Unit>

The middle unit 8B will be described with reference to FIGS. 5 and 9. FIG. 9 is a schematic view of the middle unit 8B. The middle unit 8B includes a support unit 81B that supports the extraction container 9. The support unit 81B includes a unit main body 81B' that supports a lock mechanism 821 in addition to the arm member 820 described above.

The lock mechanism 821 is a mechanism for maintaining the lid unit 91 in a closed state with respect to the container main body 90. The lock mechanism 821 includes a pair of gripping members 821a that vertically sandwich the flange portion 911c of the lid unit 91 and the flange portion 90c of the container main body 90. The pair of gripping members 821a have a C-shaped cross section in which the flange portion 911c and the flange portion 90c are sandwiched therebetween and fitted to each other, and are opened and closed in the left-right direction by a driving force of a motor 822. When the pair of gripping members 821a are in a closed state, the gripping members 821a are fitted into the flange portion 911c and the flange portion 90c so as to vertically sandwich the flange portion 911c and the flange portion 90c, and the lid unit 91 is airtightly locked with respect to the container main body 90, as indicated by a solid line in an enclosing diagram of FIG. 9. In this locked state, even if the holding member 801 is lifted by the lifting and lowering shaft 802 to open the lid unit 91, the lid unit 91 does not move (the lock is not released). That is, a locking force by the lock mechanism 821 is set stronger than a force to open the lid unit 91 using the holding member 801. As a result, it is possible to prevent the lid unit 91 from being opened with respect to the container main body 90 on abnormal occasions.

When the pair of gripping members 821a are in an open state, the gripping members 821a are separated from the flange portion 911c and the flange portion 90c, and the lid unit 91 and the container main body 90 are unlocked, as indicated by a broken line in the enclosing diagram of FIG. 9.

In a case where the holding member 801 holds the lid unit 91 and the holding member 801 is lifted from a lowered position to a lifted position, the lid unit 91 is separated from the container main body 90 when the pair of gripping members 821a are in the open state. Conversely, when the pair of gripping members 821a are in the closed state, the engagement of the holding member 801 with respect to the lid unit 91 is released, and only the holding member 801 is lifted.

The middle unit 8B also includes a mechanism that horizontally moves the arm member 820 in the front-rear direction using a motor 823 as a drive source. As a result, the container main body 90 supported by the arm member 820 can be moved between a rear-side extraction position (state ST1) and a front-side bean input position (state ST2). The bean input position is a position at which ground beans are put into the container main body 90, and around beans ground by the second grinder 5B are put into the opening 90a of the container main body 90 from which the lid unit 91 is separated, from the discharge pipe 50 shown in FIG. 2. In other words, a position of the discharge pipe 50 is above the container main body 90 positioned at the bean input position.

The extraction position is a position at which the container main body 90 can be operated by the operation unit 81A and the operation unit 810, is a position coaxial with the probes 803 and 813, and is a position at which a coffee liquid is extracted. The extraction position is a position on the rear side of the bean input position. FIGS. 5, 7, and 8 show the case where the container main body 90 is positioned at the extraction position. In this way, by changing a position of container main body 90 according to the input of ground beans, the extraction of a coffee liquid, and the supply of water, it is possible to prevent the steam generated when extracting a coffee liquid from adhering to the discharge pipe 5C which is a supply portion of ground beans.

The middle unit 8B also includes a mechanism that rotates the support unit 81B about a shaft 825 in the front-rear direction using a motor 824 as a drive source. Accordingly, it is possible to change a posture of the container main body 90 (the extraction container 9) from an upright posture (state ST1) in which the neck portion 90b is on an upper side to an inverted posture (state ST3) in which the neck portion 90b is on a lower side. During the rotation of the extraction container 9, the lock mechanism 821 maintains a state in which the lid unit 91 is locked to the container main body 90. The extraction container 9 is turned upside down between the upright posture and the inverted posture. In the inverted posture, the convex portion 911d is positioned at the position of the convex portion 901c in the upright posture. In the inverted posture, the convex portion 901c is positioned at the position of the convex portion 911d in the upright posture. Therefore, in the inverted posture, the opening and closing operation with respect to the valve 903 can be performed by the operation unit 81A, and the opening and closing operation with respect to the valve 913 can be performed by the operation unit 810.

<5. Control Device>

A control device 11 of the beverage production device 1 will be described with reference to FIG. 10. FIG. 10 is a block diagram of the control device 11.

The control device 11 controls the entire beverage production device 1. The control device 11 includes a processing unit 11a, a storage unit 11b, and an interface (I/F) unit 11c. The processing unit 11a is, for example, a processor such as a CPU. The storage unit 11b is, for example, a RAM or a ROM. The I/F unit 11c includes an input and output interface that inputs and outputs a signal between an external device and the processing unit 11a. The I/F unit 11c also includes a communication interface capable of performing data communication with a server 16 via a communication network 15 such as the Internet. The server 16 can communicate with a mobile terminal 17 such as a smartphone via the communication network 15, and can receive, for example, information such as a reservation for beverage production or an impression from the mobile terminal 17 of a beverage consumer.

The processing unit 11a executes a program stored in the storage unit 11b, and controls an actuator group 14 based on an instruction from the information display device 12, a detection result of a sensor group 13, or an instruction from the server 16. The sensor group 13 includes various sensors (for example, a hot water temperature sensor, an operation position detection sensor of a mechanism, a pressure sensor) provided in the beverage production device 1. The actuator group 14 includes various actuators (for example, a motor, an electromagnetic valve, a heater, and the like) provided in the beverage production device 1.

<6. Operation Control Example>

A control process example of the beverage production device 1 executed by the processing unit 11a will be described with reference to (A) and (B) of FIG. 11A. (A) of FIG. 11 shows a control example related to a single coffee beverage production operation. A state of the beverage production device 1 before a production instruction is referred to as a standby state. A state of each mechanism in the standby state is as follows.

The extraction device 3 is in the state of FIG. 5. The extraction container 9 is in the upright posture and is positioned at the extraction position. The lock mechanism 821 is in the closed state, and the lid unit 91 closes the opening 90a of the container main body 90. The holding member 801 is at the lowered position and is attached to the convex portion 911d. The holding member 811 is at the lifted position and is attached to the convex portion 901c. The valves 903 and 913 are in the closed state. The switching valve 10a allows the communication portion 810a of the operation unit 81C to communicate with the waste tank T.

When there is a coffee beverage production instruction in the standby state, a process of (A) of FIG. 11 is executed. In S1, a preheating process is executed. The process is a process of pouring hot water into the container main body 90 and heating the container main body 90 in advance. First, the valves 903 and 913 are opened. Thereby, the pipe L3, the extraction container 9, and the waste tank T communicate with one another.

The electromagnetic valve 72i is opened for a predetermined time (for example, 1500 milliseconds) and then closed. Thereby, hot water is poured into the extraction container 9 from the water tank 72. Next, the electromagnetic valve 73b is opened for a predetermined time (for example, 500 milliseconds) and then closed. Thereby, the air in the extraction container 9 is pressurized, and the discharge of hot water to the waste tank T is facilitated. Through the above process, the inside of the extraction container 9 and the pipe L2 are preheated, and hot water can be less cooled in the subsequent production of a coffee beverage.

In S2, a grinding process is performed. Here, roasted coffee beans are pulverized, and the ground beans are put into the container main body 90. First, the lock mechanism 821 is opened to lift the holding member 801 to the lifted position. The lid unit 91 is held by the holding member 801 and is lifted together with the holding member 801. As a result, the lid unit 91 is separated from the container main body 90. The holding member 811 is lowered to the lowered position. The container main body 90 is moved to the bean input position. Next, the reservoir device 4 and the pulverizing device 5 are operated. Thus, one cup of roasted coffee beans is supplied from the reservoir device 4 to the first grinder 5A. The roasted coffee beans are ground in two stages t r the first grinder 5A and the second grinder 5H, and wastes are separated by the separation device 6. The ground beans are put into the container main body 90.

The container main body 90 is returned to the extraction position. The holding member 801 is lowered to the lowered position, and the lid unit 91 is attached to the container main body 90. The lock mechanism 821 is closed, and the lid unit 91 is airtightly locked to the container main body 90. The holding member 811 is lifted to the lifted position. Of the valves 903 and 913, the valve 903 is in the closed state, and the valve 913 is in the open state.

In S3, an extraction process is performed. Here, a coffee liquid is extracted from the ground beans in the container main body 90. (B) of FIG. 11 is a flowchart of the extraction process of 33.

In 341, in order to steam the ground beans in the extraction container 9, hot water in an amount less than one cup is poured into the extraction container 9. Here, the electromagnetic valve 72i is opened for a predetermined time (for example, 500 milliseconds) and then closed. Thereby, hot water is poured into the extraction container 9 from the water tank 72. Thereafter, the process of S41 ends after waiting for a predetermined time (for example, 5000 milliseconds). By this process, the ground beans can be steamed. By steaming the ground beans, carbon dioxide gas contained in the ground beans can be released, and a subsequent extraction effect can be enhanced.

In 342, hot water is poured into the extraction container 9 in an amount to add up to one cup of hot water so that the extraction container 9 accommodates one cup of hot water. Here, the electromagnetic valve 72i is opened for a predetermined time (for example, 7000 milliseconds) and then closed. Thereby, hot water is poured into the extraction container 9 from the water tank 72.

By the process of S42, the inside of the extraction container 9 can be brought into a state of a temperature exceeding 100° C. at 1 atm (for example, about 110° C.). Next, the inside of the extraction container 9 is pressurized in S43. Here, the electromagnetic valve 73b is opened for a predetermined time (for example, 1000 milliseconds) and then closed, and the inside of the extraction container is pressurized to an atmospheric pressure at which hot water does not boil (for example, about 4 atm (about 3 atm in gauge pressure)). Thereafter, the valve 913 is brought into the closed state.

Next, this state is maintained for a predetermined time (for example, 7000 milliseconds) to perform immersion-type coffee liquid extraction (S44). As a result, immersion-type coffee liquid extraction is performed under a high temperature and high pressure. In the immersion-type extraction under a high temperature and high pressure, the following effects can be expected. First, by setting a high pressure, hot water can be easily permeated into the ground beans, and extraction of a coffee liquid can be facilitated. Second, by setting a high temperature, the extraction of the coffee liquid is facilitated. Third, by setting a high temperature, the viscosity of an oil contained in the ground beans decreases, and the extraction of the oil is facilitated. As a result, a coffee beverage with high aroma can be produced.

A temperature of hot water (high temperature water) may be higher than 100° C., but a higher temperature is more advantageous in terms of the extraction of the coffee liquid. On the other hand, increasing the temperature of the hot water generally results in an increase in cost. Therefore, the temperature of the hot water may be, for example, 105° C. or more, or 110° C. or more, or 115° C. or more, and may be, for example, 130° C. or less, or 120° C. or less. The atmospheric pressure may be any atmospheric pressure at which the hot water does not boil.

In S45, the inside of the extraction container 9 is depressurized. Here, the atmospheric pressure in the extraction container 9 is switched to an atmospheric pressure at which the hot water boils. Specifically, the valve 913 is brought into the open state, and the electromagnetic valve 73c is opened for a predetermined time (for example, 1000 milliseconds) and then closed. The inside of the extraction container 9 is open to the atmosphere. Thereafter, the valve 913 is brought into the closed state again.

The inside of the extraction container 9 is rapidly depressurized to an atmospheric pressure lower than the boiling point pressure, and the hot water in the extraction container 9 boils at once. The hot water and ground beans in the extraction container 9 are explosively scattered in the extraction container 9. As a result, the hot water can evenly boil. The destruction of cell walls of the ground beans can be facilitated, and the subsequent extraction of the coffee liquid can be further facilitated. In addition, since the ground beans and the hot water can be stirred by this boiling, the extraction of the coffee liquid can be facilitated. In this way, the extraction efficiency of the coffee liquid can be improved.

In S46, the extraction container 9 is inverted from the upright posture to the inverted posture. Here, the holding member 801 is moved to the lifted position and the holding member 811 is moved to the lowered position. Then, the support unit 81B is rotated. Thereafter, the holding member 801 is returned to the lowered position, and the holding member 811 is returned to the lifted position. In the extraction container 9 in the inverted posture, the neck portion 90b and the lid unit 91 are positioned on the lower side.

In S47, permeation-type coffee liquid extraction is performed, and a coffee beverage is dispensed into the cup C. Here, the switching valve 10a is switched to allow the pouring portion 10c and the passage portion 810a of the operation unit 810 to communicate with each other. Both the valves 903 and 913 are brought into the open state. Further, the electromagnetic valve 73b is opened for a predetermined time (for example, 10000 milliseconds), and the inside of the extraction container 9 is set to a predetermined atmospheric pressure (for example, 1.7 atm (0.7 atm in gauge pressure)). In the extraction container 9, a coffee beverage in which the coffee liquid is dissolved in the hot water passes through a filter provided in the lid unit 91 and is dispensed into the cup C. The filter regulates the leakage of a residue of the ground beans. Thus, the extraction process ends.

The extraction efficiency of the coffee liquid can be improved by using the immersion-type extraction in S44 and the permeation-type extraction in S47 in combination. When the extraction container 9 is in the upright posture, the around beans accumulate from the body portion 90e to the bottom portion 90f. On the other hand, when the extraction container 9 is in the inverted posture, the ground beans accumulate from the shoulder portion 90d to the neck portion 90b. A cross-sectional area f the body portion 90e is larger than a cross-sectional area of the neck portion 90b, and a deposition thickness of the around beans in the inverted posture is larger than a deposition thickness in the upright posture. That is, the ground beans accumulate relatively thinly and widely when the extraction container 9 is in the upright posture, and accumulate relatively thickly and narrowly when the extraction container 9 is in the inverted posture.

Since the immersion-type extraction in S44 is performed when the extraction container 9 is in the upright posture, the hat water and the ground beans can be brought into contact over a wide range, and the extraction efficiency of the coffee liquid can be improved. However, in this case, the hot water and the ground beans tend to partially come into contact with each other. On the other hand, since the permeation-type extraction in S47 is performed when the extraction container 9 is in the inverted posture, the hot water passes through the accumulated around beans while being in contact with more of the ground beans. The hot water comes into contact with the ground beans more evenly, and the extraction efficiency of the coffee liquid can be further improved.

Returning to (A) of FIG. 11, after the extraction process of S3, a discharge process of S4 is performed. Here, a process related to cleaning in the extraction container 9 is performed. The extraction container 9 is cleaned by returning the extraction container 9 from the inverted posture to the upright posture and supplying tap water (purified water) to the extraction container 9. Then, the inside of the extraction container 9 is pressurized, and the water in the extraction container 9 is discharged to the waste tank T together with a residue of the around beans.

Thus, one coffee beverage production process is completed. Thereafter, the same process is repeated for each production instruction. The time required for producing one coffee beverage is, for example, about 60 seconds to 90 seconds.

<7. Summary of Device Configuration>

As described above, the beverage production device 1 includes the bean processing device 2 and the extraction device 3 as a production portion, and more specifically, the bean processing device 2 includes the reservoir device 4 and the pulverizing device 5, and the extraction device 3 includes the fluid supply unit 7, the drive unit 8, the extraction container 9, and the switching unit 10 (see FIGS. 2, 3, etc.). The pulverizing device 5 receives one cup of roasted coffee beans from the reservoir device 4, and performs two-stage grinding by the first grinder 5A and the second grinder 5B. At this time, waste such as chaff is separated from the ground beans by the separation device 6. After the ground beans are put into the extraction container 9, the pouring of hot water into the extraction container 9 by the fluid supply unit 7, the posture inversion of the extraction container 9 by the drive unit 8, the liquid feeding from the extraction container 9 to the cup C by the switching unit 10, and the like are performed to provide a cup of beverage.

A part of the production portion is covered by the cover portion 102 configured as a transparent cover whose entire body is a transmissive portion, and can be visually recognized by a user (for example, an administrator of the beverage production device 1, a beverage consumer, or the like) from the outside of the beverage production device 1. Of the production portion, although the plurality of canisters 40, which are a part of the reservoir device 4, are exposed, and the other elements are substantially accommodated in the housing 100, the entire production portion may be accommodated in the housing 100. In other words, the cover portion 102 may be provided so as to cover at least a part of the production portion.

Since at least a part of the production portion is covered with the cover portion 102 so as to be visually recognized from the outside of the beverage production device 1, for example, when the user is an administrator of the beverage production device 1, the administrator may perform the operation inspection of the device together with the production preparation of a beverage. When the user is a beverage purchaser, the purchaser may wait for the completion of the production of a beverage while enhancing the expectation for the beverage. For example, the extraction container 9 of the extraction device 3 can be visually recognized from the outside of the beverage production device 1 via the cover portion 102, and among several processes for producing a beverage, an extraction step having a relatively high degree of interest for a user can be observed. The drive unit 8 functions as a posture changing unit that changes a posture of the extraction container 9, and as described above, the extraction container 9 is a movable portion that can be vertically inverted in the production portion. Therefore, an inverting operation of the extraction container 9 is relatively likely to attract the user, and by allowing the user to observe the inverting operation, the user may be able to enjoy the inverting operation.

Next, a modification of the pulverizing device 5 will be described. In the following description, components having the same names as those described above are denoted by the same reference numerals as those used above. The pulverizing device 5 described here has a different appearance from that of the pulverizing device shown in FIG. 2, but has the same function.

FIG. 12 is a perspective view of the pulverizing device 5, and FIG. 13 is a longitudinal cross-sectional view of the pulverizing device 5 shown in FIG. 12.

Similarly to the pulverizing device shown in FIG. 2, the pulverizing device 5 shown in FIG. 12 also includes the first grinder 5A, the second grinder 5B, and the separation device 6. The first grinder 5A and the second grinder 5B are mechanisms for grinding roasted coffee beans supplied from the reservoir device 4 shown in FIG. 2. The first grinder 5A is a grinder for crushing coffee beans into a predetermined size (for example, about ¼) to facilitate separation of wastes adhering to the coffee beans. The second grinder 5B is a grinder for grinding the coffee beans crushed by the first grinder 5A into ground coffee beans having a desired particle size. Therefore, the first grinder 5A and the second grinder 5B have different particle sizes for grinding beans, and the second grinder 5B is a grinder having a finer particle size than the first grinder 5A. The particle size of the ground beans in the second grinder 5B may have an error (about ±5 μm), but can be adjusted by adjusting an interval between a rotary blade 58b and a fixed blade 57b.

The first grinder 5A includes a motor 52a (see FIG. 12) and a main body portion 53a. The motor 52a is a drive source of the first grinder 5A. The main body portion 53a is a unit for accommodating a cutter, and includes a built-in rotation shaft 54a as shown in FIG. 13. A gear 55a is provided on the rotation shaft 54a, and a driving force of the motor 52a is transmitted to the rotation shaft 54a via the gear 55a.

As shown in FIG. 13, a rotary blade 58a, which is a cutter, is provided on the rotation shaft 54a. A fixed blade 57a, which is a cutter, is provided around the rotary blade 58a. The inside of the main body portion 53a communicates with an inlet 50a (see FIG. 12) and a discharge port 51a (see FIG. 13). Roasted coffee beans supplied from the reservoir device 4 shown in FIG. 2 enter the main body portion 53a from the inlet 50a formed in an upper portion of the main body portion 53a, and are pulverized while being sandwiched between the rotary blade 58a and the fixed blade 57a shown in FIG. 13. As shown in FIG. 13, a preventing plate 56a is provided on an upper side of the rotary blade 58a of the rotation shaft 54a, and the preventing plate 56a prevents the roasted coffee beans from escaping to the upper side. In the first grinder 5A, the roasted coffee beans are ground to, for example, about ¼. The pulverized ground beans are discharged from the discharge port 51a to the separation device 6.

Roasted coffee beans supplied to the inlet. 50a may be supplied not from above the rotary blade 58a but at a height at which the roasted coffee beans come into contact with a side surface of the rotary blade 58a. In this case, since the roasted coffee beans are prevented from escaping to the upper side by the rotary blade 58a, the preventing plate 56a may not be provided.

The first grinder 5A may change a size of roasted coffee beans to be discharged after being pulverized by changing the number of rotations of the rotary blade 58a. The distance between the rotary blade 58a and the fixed blade 57a may be manually adjusted.

The separation device 6 shown in FIG. 12 has the same configuration as that of the separation device 6 described with reference to FIG. 4, and is a mechanism that is disposed between the first grinder 5A and the second grinder 5B and separates wastes such as chaff and fine powder from ground beans by an air suction force. Roasted coffee beans supplied from the reservoir device 4 are first coarsely ground by the first grinder 5A, and wastes are separated from the coarsely ground beans by the separation device 6. The coarsely ground beans from which the wastes are separated are finely ground by the second grinder 5B.

The second grinder 5B includes a motor 52b (see FIG. 12) and a main body portion 53b. The motor 52b is a drive source of the second grinder 5B. The main body portion 53b is a unit for accommodating a cutter, and includes a built-in rotation shaft 54b as shown in FIG. 13. A pulley 55b is provided on the rotation shaft 54b, and a driving force of the motor 52b is transmitted to the rotation shaft 54b via a belt. 59b and the pulley 55b.

As shown in FIG. 13, the rotary blade 58b is provided on the rotation shaft 54b, and the fixed blade 57b is provided on an upper side of the rotary blade 58b. The inside of the main body portion 53b communicates with the inlet 50b shown in FIG. 12 and the discharge port 51b shown in FIG. 12. Ground beans falling from the separation device 6 enter the main body portion 53b from the inlet 50b, and are further pulverized while being sandwiched between the rotary blade 58b and the fixed blade 57b. The ground beans pulverized into powder are discharged from the discharge port. Sib. A particle size of the ground beans in the second grinder 5B can be adjusted by adjusting the interval between the rotary blade 58b and the fixed blade 57b.

Next, the separation device 6 will be described again, although there are parts overlapping with the above description. FIG. 14 is a partially cutaway perspective view of the separation device 6. The separation device 6 includes a suction unit 6A and a forming unit 6B. The forming unit 6B is a hollow body that forms a separation chamber SC (see FIG. 13) through which around beans falling freely from the first grinder 5A pass. The suction unit 6A is a unit that communicates with the separation chamber SC in a direction (in this example, the left-right direction) intersecting with a passing direction (in this example, the upper-lower direction) of the ground beans, and suctions the air in the separation chamber SC. By suctioning the air in the separation chamber SC, lightweight objects such as chaff and fine powder are suctioned. As a result, wastes can be separated from the around beans.

The suction unit. 6A is a mechanism of a centrifugal separation type. The suction unit 6A includes the air blowing unit 60A and the collection container 60B. The air blowing unit 60A is a fan motor, and exhausts the air in the collection container 60B upward.

The collection container 60B includes the upper portion 61 and the lower portion 62 that are engaged with each other in a separable manner. The lower portion 62 has a bottomed cylindrical shape with an open upper side, and forms a space for accumulating wastes. The upper portion 61 constitutes a lid portion to be attached to an opening of the lower portion 62. As shown in FIG. 14, the upper portion 61 includes the cylindrical outer circumferential wall 61a and the exhaust pipe 61b formed coaxially with the outer circumferential wall 61a. The air blowing unit 60A is fixed to the upper portion 61 above the exhaust pipe 61b so as to suction the air in the exhaust pipe 61b. The upper portion 61 includes a tubular connecting portion 61c extending in a radial direction. The connecting portion 61c is connected to the forming unit. 6B, and allows the separation chamber SC to communicate with the collection container 60B. The connecting portion 61c is open to the side of the exhaust pipe 61b.

As the air blowing unit 60A is driven, air flows indicated by arrows d1 to d3 in FIG. 14 are generated. Due to the air flows, the air containing wastes is suctioned into the collection container 60B from the separation chamber SC through the connecting portion 61c. Since the connecting portion 61c is open to the side of the exhaust pipe 61b, the air containing wastes swirls around the exhaust pipe 61b. The waste D in the air falls by a weight thereof and is collected in a part of the collection container 60B (accumulate on a bottom surface of the lower portion 62). The air is exhausted upward through the inside of the exhaust pipe 61b.

The plurality of fins 61d are integrally formed on a circumferential surface of the exhaust pipe 61b. The plurality of fins 61d are disposed in a circumferential direction of the exhaust pipe 61b. Each of the fins 61d is inclined obliquely with respect to an axial direction of the exhaust pipe 61b. The provision of such fins 61 facilitates the swirling of the air containing the waste D around the exhaust pipe 61b. In addition, the fins 61 facilitate the separation of the waste D. As a result, a length of the suction unit 6A in the upper-lower direction can be reduced, which contributes to downsizing of the device.

The forming unit 6B is disposed on a falling path of ground beans by the first grinder 5A and the second grinder 5B, and the centrifugal separation type suction unit 6A is disposed on the side of the falling path. Although a mechanism of a centrifugal separation type tends to be long in the upper-lower direction, the suction unit 6A can be disposed side by side in a lateral direction with respect to the first grinder 5A and the second grinder 5B by disposing the suction unit 6A at the side shifted from the falling path. This contributes to reducing a length of the device in the upper-lower direction. In particular, when two-stage pulverizing is performed by the first grinder 5A and the second grinder 5B, since the length of the device in the upper-lower direction tends to be long, such disposition of the suction unit 6A is effective for downsizing of the device.

The forming unit 6B will be described with reference to FIGS. 12 to 17. FIG. 15 is a longitudinal cross-sectional view of the forming unit 6B. FIG. 16 is a perspective view and a partially enlarged view of the forming unit 6B. FIG. 17 is a plan view of the forming unit 6B, and is an explanatory diagram for comparison of cross-sectional areas.

The forming unit 6B shown in FIG. 15 is formed by combining two members divided into upper and lower halves. The forming unit 6B includes a pipe portion 63 and a separation chamber forming portion 64, and has a spoon shape in a plan view. The pipe portion 63 is a cylindrical body that forms a communication passage 63a with the suction unit 6A, and extends in the lateral direction (a direction intersecting a center line CL to be described later). The separation chamber forming portion 64 is an annular hollow body that is connected to the pipe portion 63, forms the separation chamber SC, and has an opening at the center in the upper-lower direction.

In the separation device 6 shown in FIG. 14, when separating wastes from around beans, a method is adopted in which wastes are suctioned by applying a lateral wind pressure to ground beans falling from the first grinder 5A. This is advantageous in that a length in a vertical direction can be shorter than in a centrifugal separation method.

The separation chamber forming portion 64 shown in FIG. 15 includes a cylindrical portion 65 extending in the upper-lower direction. The cylindrical portion 65 protrudes into the separation chamber SC from a central portion in the upper-lower direction to a lower portion thereof. The cylindrical portion 65 includes an opening portion 65a at one end on an upper side, and the opening portion 65a forms an inlet of ground beans communicating with the separation chamber SC. The opening portion 65a is positioned outside the separation chamber SC and is connected to the discharge port 51a (see FIG. 13) of the first grinder 5A. As a result, ground beans falling from the discharge port 51a are introduced into the separation chamber forming portion 64 without leaking. The cylindrical portion 65 includes an opening portion 65b at the other end on a lower side. The opening portion 65b is positioned in the separation chamber SC. Since the opening portion 65b faces the separation chamber SC, ground beans falling from the discharge port 51a are introduced into the separation chamber SC without leaking.

The cylindrical portion 65 has a cylindrical shape, and the opening portion 65a and the opening portion 65b have a concentric circular shape positioned on the center line CL. As a result, the ground beans falling from the discharge port 51a easily pass through the cylindrical portion 65. The cylindrical portion 65 has a tapered shape in which a cross-sectional area of an internal space gradually decreases from the opening portion 65a side toward the opening portion 65b side. Since an inner wall of the cylindrical portion 65 has a mortar shape, the falling ground beans easily collide with the inner wall. In some cases, the ground beans falling from the first grinder 5A adhere to each other and fall as a lump. When the ground beans are in the form of a lump, the separation efficiency of wastes may decrease. In the cylindrical portion 65 shown in FIG. 15, the lump of ground beans collides with the inner wall of the cylindrical portion 65, thereby breaking the lump and making it easier to separate wastes.

The inner wall of the cylindrical portion 65 is not limited to a mortar shape in terms of breaking the lump of ground beans. When there is a portion in which a cross-sectional area of an internal space is smaller than that of the opening portion 65a in a middle portion of the cylindrical portion 65 and thus the inner wall is inclined (not horizontal) with respect to the center line CL, it is possible to make the ground beans fall smoothly while facilitating collision with the lump. The cylindrical portion 65 does not have to protrude into the separation chamber SC, and may include only a portion protruding upward from an outer surface of the separation chamber forming portion 64. However, since the cylindrical portion 65 protrudes into the separation chamber SC, a wind speed around the cylindrical portion 65 can be improved. Therefore, in a region R1 relatively far from the pipe portion 63, an effect of separating wastes due to the wind pressure can be enhanced.

The separation chamber forming portion 64 includes a discharge port 66 communicating with the separation chamber SC, from which the ground beans are discharged after wastes are separated. The discharge port 66 shown in FIG. 15 is positioned below the opening portion 65*b*, and the ground beans having passed through the cylindrical portion 65 pass through the separation chamber SC and fall freely from the discharge port 66. The discharge port 66 is a circular opening positioned on the center line CL, and is an opening concentric with the opening portion 65*a* and the opening portion 65*b*. Therefore, the ground beans easily pass through the separation chamber forming portion 64 by free fall, and it is possible to prevent the ground beans from accumulating in the separation chamber forming portion 64.

As shown in FIG. 17, a cross-sectional area SC2 of the discharge port 66 is larger than a cross-sectional area SC1 of the opening portion 65*b*. The opening portion 65*b* and the discharge port 66 overlap each other when viewed in the upper-lower direction. Therefore, when the opening portion 65*b* is projected in the upper-lower direction with respect to the discharge port 66, the opening portion 65*b* is accommodated inside the discharge port 66. In other words, the opening portion 65*b* is accommodated in a region in which the discharge port 66 is extended in the upper-lower direction. It is also possible to adopt a configuration in which the opening portion 65*b* and the discharge port 66 are not on the same center line but overlap each other, or a configuration in which at least one of the opening portion 65*b* or the discharge port. 66 is not circular but is overlapped.

A ratio of the cross-sectional area SC1 to the cross-sectional area SC2 is, for example, 95% or less, or 85% or less, and is, for example, 60% or more or 70% or more. Since the opening portion 65*b* and the discharge port 66 are concentric, the opening portion 65*b* and the discharge port 66 overlap each other when viewed in the direction of the center line CL. Therefore, ground beans falling freely from the opening portion 65*b* are easily discharged from the discharge port 66. In addition, it is possible t prevent the falling ground beans from colliding with an edge of the discharge port 66 and jumping to the pipe portion 63 side, and it is also possible to prevent the required ground beans from being tinned to the suction unit 6A. Although it has been exemplified that an opening area of the opening portion on one end (for example, 65*a*) is smaller than an opening area of the discharge port (for example, 66), the opening area of the discharge port (for example, 66) and the opening area of the opening portion on one end (for example, 65*a*) may be the same, or the opening area of the opening portion on one end (for example, 65*a*) may be larger than the opening area of the discharge port (for example, 66). Although it has been exemplified that an opening area of the opening portion on the other end (for example, 65*b*) is smaller than the opening area of the discharge port (for example, 66), the opening area of the discharge port (for example, 66) and the opening area of the opening portion on the other end (for example, 65*b*) may be the same, or the opening area of the opening portion on the other end (for example, 65*b*) may be larger than the opening area of the discharge port (for example, 66). Although it has been exemplified that the air is suctioned from the discharge port 66 and the inlets (for example, 65*a* and 65*a*') by the suction unit (for example, 6A), an amount of air suctioned from the discharge port 66 may be larger than an amount of air suctioned from the inlets (for example, 65*a* and 65*a*'). This may be implemented by the opening portion on the other end (for example, 65*b*) protruding into the separation chamber, a size of the cross-sectional area of the discharge port 66 being larger than a size of the opening area of the opening portion on one end (for example, 65*a*), the size of the cross-sectional area of the discharge port 66 being larger than a size of the opening area of the opening portion on the other end (for example, 65*b*), a distance from the discharge port 66 to the separation chamber being shorter than a distance from the opening portion on one end (for example, 65*a*) to the separation chamber, a distance from the discharge port 66 to the exhaust pipe 61*b* being shorter than a distance from the opening portion on one end (for example, 65*a*) to the exhaust pipe 61*b*, or a distance from the discharge port 66 to the air blowing unit 60A being shorter than a distance from the opening portion on one end (for example, 65*a*) to the air blowing unit 60A. Any one of inner wall portions of members (63 to 65) constituting the forming unit 65 and the separation chamber SC, the cylindrical portion 65, or the opening portion on the other end (for example, 65*b*) may vibrate by being in contact with the grinder (at least one of 5A or 5B) directly or indirectly via another member to receive the vibration due to rotation of the grinder. For example, in the case of the coffee bean grinding machine 1 in the embodiment, since they are in direct or indirect contact, during the operation of the grinder, any one of the inner wall portions of the members (63 to 65) constituting the forming unit 65 and the separation chamber SC, the cylindrical portion 65, or the opening portion on the other end (for example, 65*b*) vibrates, and by the turbulent air generated in the separation chamber SC due to the vibration, a brake is applied to light wastes entering the separation chamber SC from the opening portion on the other end (for example, 65*b*) to facilitate the suction of the wastes by the suction unit (for example, 6A). In particular, the forming unit 6B, like the coffee bean grinding machine 1 in the embodiment, is in direct contact with the first grinder 5A out of the first grinder 5A and the second grinder 5B, and by bringing the forming unit 6B into direct contact with one grinder in this way, appropriate vibration may be applied to the forming unit 6B to facilitate the suction of light wastes.

The air suctioned by the suction unit 6A is mainly suctioned through the discharge port 66. Therefore, as shown in FIG. 13, a gap is provided between the discharge port 66 and the inlet 50*b* of the second grinder 5B, and air suction is facilitated. An arrow d4 shown in FIG. 15 schematically indicates a direction of an air flow of the air suctioned by the suction unit 6A. Suction of air from the discharge port 66 makes it difficult for wastes to be discharged from the discharge port 66, and separation performance between ground beans and wastes can be improved. The air suctioned by the suction unit 6A is also suctioned through the opening portion 65*a*.

A turbulent flow generating portion 67 is formed in a surrounding wall defining the discharge port 66. The turbulent flow generating portion 67 generates a turbulent flow in the air suctioned from the discharge port 66 into the separation chamber SC. By forming the turbulent flow generating portion 67, a turbulent flow is particularly likely to occur in a region R2 between the opening portion 65*b* and the discharge port 66. In the forming unit 6B shown in FIG. 15, since the wind speed is improved around the cylindrical portion 65, the generation of the turbulent flow in the region R2 can be synergistically facilitated.

Ground beans put into the inlet 65*a* are stirred by being affected by the turbulent flow when passing through the region R2. In particular, as described above, since the cross-sectional area SC2 of the discharge port 66 is larger than the cross-sectional area SC1 of the opening portion 65*b*, the ground beans always pass through the region R2. Due to the turbulent flow, wastes such as chaff and fine powder are easily separated from the around beans. Therefore, even if the separation chamber SC is a small space, it is possible to improve the separation efficiency of the wastes, and in particular, it contributes to reducing a length of the separation chamber SC in the upper-lower direction, which is advantageous in reducing the size of the device when two-stage pulverizing is performed by the first grinder 5A and the second grinder 5B.

As shown in FIGS. 15 and 16, the turbulent flow generating portion 67 includes a plurality of turbulent flow generating elements 67a. The turbulent flow generating element 67a is a protrusion protruding downward in the upper-lower direction. A direction in which the turbulent flow generating element. 67a protrudes may be any direction, but a direction within a range from a lower direction to a radially inward direction is preferable in terms of facilitating the generation of a turbulent flow in the separation chamber SC. When the protruding direction is the lower direction, the falling ground beans are not caught, which is more preferable.

A cross-sectional shape of the turbulent flow generating element 67a is such that an upper base of a cross section of a quadrangular prism having a trapezoidal shape is oriented in the direction of the center line CL, and, as shown in FIG. 16, an inner side of a tip end portion is provided with a chamfer 67b. The shape of the turbulent flow generating element 67a is not limited thereto, but a shape that makes a shape of the discharge port 66 three-dimensionally complicated is preferable.

As shown in FIG. 16, the turbulent flow generating element 67a is repeatedly formed in a circumferential direction d5 of the discharge port 66. As a result, air is blown into the region R2 from multiple directions, which facilitates the generation of a turbulent flow. Adjacent turbulent flow generating elements 67a have the same pitch, but may have different pitches. Although twelve turbulent flow generating elements 67a are formed, the number of the turbulent flow generating elements 67a is any number.

Although the pulverizing device 5 described with reference to FIGS. 12 to 17 is to be incorporated in the beverage production device 1 shown in FIG. 1, the pulverizing device 5 alone can also be used as a coffee bean grinding machine. In this case, a reservoir device that accommodates roasted coffee beans and supplies the coffee beans to the inlet 50a, a control device that controls the pulverizing device 5, and an information display device are added.

FIG. 18 is an external perspective view of a coffee bean grinding machine, and FIG. 19 is a block diagram of a control device of the coffee bean grinding machine. A basic configuration of the coffee bean grinding machine shown in FIG. 18 is substantially the same as a basic configuration of the pulverizing device 5 described with reference to FIGS. 12 to 17. Hereinafter, components having the same names as those described above are denoted by the same reference numerals as those used above, and differences from the pulverizing device 5 described with reference to FIGS. 12 to 17 will be mainly described.

A coffee bean grinding machine GM shown in FIG. 18 includes the reservoir device 4, the pulverizing device 5, and the control device 11 shown in FIG. 19 that controls the reservoir device 4 and the pulverizing device 5. The coffee bean grinding machine GM also includes the information display device 12 (see FIG. 19) wirelessly connected to the control device 11. The information display device 12 is a touch panel type display for inputting various control instructions, set values, and the like of the coffee bean grinding machine GM, and can receive inputs from an administrator or a user in addition to displaying various types of information. The information display device 12 is provided with a speaker and a camera.

The control device 11 controls the entire coffee bean grinding machine GM. The control device 11 includes the processing unit 11a, the storage unit 11b, and the interface (I/F) unit 11c. The processing unit 11a is, for example, a processor such as a CPU. The storage unit 11b is, for example, a RAM or a ROM. A recipe is stored in the storage unit 11b. The recipe includes information on various conditions for grinding coffee beans, beans information, recipe creator information, comments of a recipe creator, and the like. The I/F unit 11c includes an input and output interface that inputs and outputs a signal between an external device and the processing unit 11a. The I/F unit 11c also includes a communication interface capable of performing data communication with an external terminal such as the server 16 or the mobile terminal 17 via the communication network 15 such as the Internet. The server 16 can communicate with the mobile terminal 17 such as a smartphone via the communication network 15, and can receive, for example, information such as a reservation for production of ground beans of coffee and an impression from the mobile terminal. 17 of a consumer. A coffee bean grinding system GS for grinding coffee beans includes the coffee bean grinding machine 1, the server 16, and the mobile terminal 17.

The processing unit 11a executes a program stored in the storage unit 11b, and controls the reservoir device 4 and the pulverizing device 5 according to the recipe. More specifically, the processing unit 11a controls the actuator group 14 according to the recipe, and controls the actuator group 14 based on an instruction from the information display device 12, a detection result of the sensor group 13, or an instruction from the server 16. The sensor group 13 includes various sensors (for example, an operation position detection sensor of a mechanism) provided in the reservoir device 4 and the pulverizing device 5. The actuator group 14 includes various actuators (for example, a motor) provided in the reservoir device 4 and the pulverizing device 5.

The reservoir device 4 shown in FIG. 18 includes a cylindrical canister accommodation unit 401 and a detachable cap 401c that is screwed to an upper end portion of the canister accommodation unit 401 and covers an upper surface of the canister accommodation unit 401. A plurality of canister accommodation chambers (not shown) are provided inside the canister accommodation unit 401. The plurality, of canister accommodation chambers are provided in a circumferential direction, and a plurality of canisters can be accommodated inside the canister accommodation unit 401. Here, the canister (not shown) has the same structure as the canister shown in FIGS. 1 and 2 except that the handle 40b is not provided. The plurality of canisters accommodated in the reservoir device 4 can be selectively used. Therefore, it is possible to perform a grinding process by selecting roasted coffee beans of different varieties or roasted coffee beans having different degrees of roasting, and it is also possible to perform a grinding process by mixing a plurality of types of roasted coffee beans of different varieties or degrees of roasting.

The canister accommodation unit 401 is detachably attached to an option attachment portion GM11 provided in an upper portion of a center casing GM10 of the coffee bean grinding machine GM. In addition to the canister accommodation unit 401, a plurality of types of units can be attached to the option attachment portion GM11. The upper portion of the center casing GM10 covers a lower portion of a unit attached to the option attachment portion GM11. A type of the unit attached to the option attachment portion GM11 may be displayed on an external terminal such as the mobile terminal 17 capable of communicating with the coffee bean grinding machine GM.

(a) of FIG. 20 is a diagram showing the coffee bean grinding machine GM to which a hopper unit 402 is attached instead of the canister accommodation unit 401 shown in FIG. 18, and (b) of FIG. 20 is a diagram showing the coffee bean grinding machine GM to which a funnel unit 403 is attached.

FIG. 18 is a perspective view of the coffee bean grinding machine GM as viewed obliquely from a front left side, and FIG. 20 is a perspective view of the coffee bean grinding machine GM as viewed obliquely from a front right side.

The option attachment portion. GM11 shown in FIG. 18 is provided on an inner circumferential surface of the center casing GM10. A method of attaching each of the units to the option attachment portion GM11 may be a screwing method, a method in which a locking claw provided in each of the units is locked to the option attachment portion GM11, or a method in which a locking claw provided in the option attachment portion. GM11 is locked to each of the units.

The hopper unit 402 shown in (a) of FIG. 20 is a transparent container in which roasted coffee beans are accommodated, and an upper surface of the hopper unit 402 is covered with a detachable cap 402c. The hopper unit 402 corresponds to a large single canister.

On the other hand, the funnel unit 403 shown in (b) of FIG. 20 is in a shape of a funnel whose inner side is tapered toward the option attachment portion GM11, and an upper end thereof is open. The funnel unit 403 also accommodates roasted coffee beans. In the funnel unit 403, the supply of roasted coffee beans to a downstream side is smooth as compared with the canister and the hopper unit 402. The canister accommodation unit 401, the hopper unit 402, and the funnel unit 403 are reservoir units capable of storing roasted coffee beans. These reservoir units (401 to 403) are provided with supply ports for supplying roasted coffee beans to the downstream side.

A weighing unit can also be attached to the option attachment portion GM11.

(a) of FIG. 21 is a diagram schematically showing a state in which a weighing unit 404 is attached to the option attachment portion GM11.

In the coffee bean grinding machine GM shown in (a) of FIG. 21, the canister accommodation unit 401 shown in FIG. 20 is further attached to the weighing unit 404 attached to the option attachment portion GM11. The reservoir units (401 to 403) capable of storing roasted coffee beans can be detachably attached to the weighing unit 404. Similarly to the method of attaching each of the units to the option attachment portion GM11, a method of attaching the reservoir unit to the weighing unit 404 may be a screwing method, a method in which a locking claw provided in each of the units is locked to the weighing unit 404, or a method in which a locking claw provided in the weighing unit 404 is locked to the reservoir unit. In the example shown in (a) of FIG. 21, locking claws 404k provided in the weighing unit 404 are locked to protruding portions GM11t of the option attachment portion GM11. Locking claws 401k provided in the canister accommodation unit 401 are locked to protruding portions 404t provided on an upper portion of an inner circumferential wall of the weighing unit 404.

The weighing unit 404 includes a receiving port 4040, a guiding passage 4041, a conveying passage 4042, and a feed-out port 4043. When the reservoir units (401 to 403) are attached to the weighing unit 404, a supply port USP of the reservoir unit is connected to the receiving port 4040 of the weighing unit 404, and roasted coffee beans stored in the reservoir unit are supplied to the receiving port 4040. The receiving port 4040 and an upstream side of the conveying passage 4042 are connected by the guiding passage 4041. In the conveying passage 4042 shown in (a) of FIG. 21, a right side is the upstream side and a left side is a downstream side. An electric screw conveyor ESC is disposed in the conveying passage 4042, and roasted coffee beans are conveyed through the conveying passage 4042 and fed out from the feed-out port 4043 toward the pulverizing device 5. That is, the roasted coffee beans supplied to the receiving port 4040 are guided to the conveying passage 4042 through the guiding passage 4041, and are conveyed from the right side to the left side of the conveying passage 4042 shown in (a) of FIG. 21. The conveying path 4042 shown in (a) of FIG. 21 is horizontally provided, but a downstream end opening 4042o of the conveying path 4042 is formed to open obliquely upward. The conveying path 4042 may be inclined such that the downstream side is higher than the upstream side.

(b) of FIG. 21 is a perspective view showing the electric screw conveyor ESC.

In the electric screw conveyor ESC shown in (b) of FIG. 21, a right near side is an upstream side, and a left front side is a downstream side. The electric screw conveyor ESC includes a screw shaft ESC1 and a screw blade ESC2 spirally provided on an outer circumferential surface of the screw shaft ESC1. A motor ESC3 that rotationally drives the screw shaft ESC1 is built in an upstream end portion of the electric screw conveyor ESC. Roasted coffee beans guided to the conveying passage 4042 are conveyed through the conveying passage 4042 by the rotating screw blade ESC2. The control device 11 controls the rotation of the motor ESC3, and roasted coffee beans is automatically weighed by a rotation amount of the screw shaft ESC1. The electric screw conveyor ESC automatically weighs roasted coffee beans accommodated in the reservoir units (401 to 403) and conveys the roasted coffee beans toward the downstream side.

As shown in (a) of FIG. 21, a cover member 460 is provided on the downstream end opening 4042o of the conveying passage 4042. As described above, the downstream end opening 4042o is formed obliquely upward, and the cover member 460 is also obliquely disposed. The cover member 460 includes a cover plate 461 and belt-shaped members 451.

FIG. 22 is a diagram showing some aspects of the cover member 460 disposed in the downstream end opening 4042o of the conveying passage 4042.

An upper half of the downstream end opening 4042o shown in (a) of FIG. 22 is covered by the cover plate 461. The cover plate 461 is a rigid body made of resin.

An outlet portion 45 is provided at a downstream end of the conveying passage 4042. In the outlet portion 45, the belt-shaped members 451 having flexibility are disposed in a lateral direction at an interval W1. The belt-shaped members 451 are more flexible than the cover plate 461. The interval W1 between the belt-shaped members 451 is smaller than a size of general roasted coffee beans B. An upper end of each of the belt-shaped members 451 is fixed to a lower edge portion of the cover plate 461, but a lower end of each of the belt-shaped members 451 is a free end. In addition, the lower end of each of the belt-shaped member 451 is positioned inside an edge 4042e defining the downstream end opening 4042o by a length shorter than the size of the roasted coffee beans B. The belt-shaped members 451 make the downstream end opening 4042o have a small area but allow the roasted coffee beans B conveyed by the rotating screw blade ESC2 to pass through by flexibility. That is, in the first place, the area of the downstream end opening 4042o is reduced to about half by the cover plate 461, and it is difficult for the roasted coffee beans B to fall from the downstream end opening 4042o when the screw blade ESC2 stops rotating. Moreover, the area of the downstream end opening 4042o is further reduced by the belt-shaped members 451, and it is difficult for the roasted coffee beans B to fall from the downstream end opening 4042o. Therefore, the roasted coffee beans B are prevented from inadvertently entering the downstream side. On the other hand, since the belt-shaped members 451 have flexibility and the lower ends are free ends, the belt-shaped members 451 are turned outward by an extrusion force (corresponding to a conveying force) of the roasted coffee beans B conveyed by the rotating screw blade ESC2. As a result, the interval W1 between the belt shaped members 451 and gaps between the lower ends of the belt-shaped members 451 and the edge 4042e defining the downstream end opening 4042o are widened, and the roasted coffee beans B are fed out from the widened interval and gap.

In the cover member 460 disposed obliquely upward, the belt-shaped members 451 are also inclined, and the outlet portion 45 also faces obliquely upward. Outlet portions 45 shown in (a) to (f) of FIG. 22 face obliquely upward. As described above, the outlet portion 45 faces obliquely upward, and it is difficult for the roasted coffee beans B to fall from the outlet portion 45. However, the outlet portions 45 shown in (a) to (f) of FIG. 22 may be oriented just beside.

The upper half of the downstream end opening 4042o shown in (a) of FIG. 22 is covered by the cover plate 461. The cover plate 461 is a rigid body made of resin.

The cover members 460 shown in (b) and (c) of FIG. 22 are the same as the cover member 460 shown in (a) of FIG. 22 except that the belt-shaped members 451 are long. The belt-shaped members 451 shown in (b) of FIG. 22 extend downward beyond the edge 4042e defining the downstream end opening 4042o, and a lower end of each of the belt-shaped members 451 is positioned outside the edge 4042e. The belt-shaped members 451 shown in (c) of FIG. 22 extend downward just to the edge 4042e defining the downstream end opening 4042o, and a lower end of each of the belt-shaped members 451 overlaps the edge 4042e. Therefore, in the cover members 460 shown in (b) and (c) of FIG. 22, the area of the downstream end opening 4042o can be further reduced as compared with the cover member 460 shown in (a) of FIG. 22, and the allowance for passage of the roasted coffee beans B is reduced. However, since the belt-shaped members 451 shown in (b) of FIG. 22 and the belt-shaped members 451 shown in (c) of FIG. 22 have flexibility and the lower ends thereof are free ends, the belt-shaped members 451 are turned outward by the extrusion force of the roasted coffee beans B conveyed by the rotating screw blade ESC2. As a result, the roasted coffee beans B are fed out by the extrusion force from both the outlet portion 45 shown in (b) of FIG. 22 and the outlet portion 45 shown in (c) of FIG. 22.

The cover members 460 shown in (d) and (e) of FIG. 22 are the same as the cover member 460 shown in (a) of FIG. 22 except that sizes of the cover plates 461 are different. In the cover member 460 shown in (d) of FIG. 22, an upper portion corresponding to 1/3 a size of the downstream end opening 4042o is covered with the cover plate 461. In the cover member 460 shown in (e) of FIG. 22, a portion from an upper side to the middle corresponding to 2/3 the size of the downstream end opening 4042o is covered with the cover plate 461. Therefore, in the cover member 460 shown in (d) of FIG. 22, the area of the downstream end opening 4042o is not reduced as compared with the cover member 460 shown in (a) of FIG. 22, and the allowance for passage of the roasted coffee beans B is increased. However, when the belt-shaped members 451 are included, an area of a downstream side opening 41h is reduced to half or more, and it is difficult for the roasted coffee beans B to fall from the outlet portion 45 when the screw blade ESC2 stops rotating. In addition, in the cover member 460 shown in (e) of FIG. 22, the area of the downstream end opening 4042o is further reduced as compared with the cover member 460 shown in (a) of FIG. 22, and the allowance for passage of the roasted coffee beans B is rather low. Therefore, it is preferable to use belt-shaped members that are more flexible than the belt-shaped members 451 shown in (a) of FIG. 22.

The cover member 460 shown in (f) of FIG. 22 does not include the cover plate 461, and includes only the outlet portion 45 formed of the belt-shaped members 451. Both ends of each of the belt-shaped members 451 are fixed to the edge 4042e defining the downstream end opening 4042o. In the cover member 460 shown in (f) of FIG. 22, the area of the downstream end opening 4042o is reduced by the belt-shaped members 451. Since both ends of each of the belt-shaped members 451 are fixed, the end on one side is not turned to the outside. However, an interval W2 between the belt-shaped members 451 increases by the extrusion force of the roasted coffee beans B conveyed by the rotating screw blade ESC2. The belt-shaped members 451 shown in (f) of FIG. 22 are thinner than the belt-shaped members 451 shown in (a) of FIG. 22. In addition, although the interval W2 between the belt-shaped members 451 shown in (f) of FIG. 22 is smaller than the size of one of the general roasted coffee beans B, the interval W2 is wider than the interval W1 between the belt-shaped members 451 shown in (a) of FIG. 22. Therefore, in the belt-shaped members 451 shown in (f) of FIG. 22, as compared with the belt-shaped members 451 shown in (a) of FIG. 22, the interval W2 is easily widened by the extrusion force of the conveyed roasted coffee beans B, and the interval after the widening is also large. Thus, the roasted coffee beans B are also fed out from the outlet portion 45 shown in (f) of FIG. 22 by the extrusion force.

FIG. 23 is a schematic diagram showing further aspects of the cover member 460.

The cover member 460 shown in FIG. 23 is the same as the cover member 460 shown in (a) of FIG. 22 except that the configuration of the outlet portion 45 is different. That is, the upper half of the downstream end opening 4042o is covered with the cover plate 461, and the outlet portion 45 is provided in a lower half. The outlet portion 45 shown in (a) of FIG. 23 includes a pivot shaft 452 extending in the horizontal direction and a lid member 453 pivoting vertically about the pivot shaft 452. The lid member 453 covers the entire lower half of the downstream end opening 4042o, and has a rectangular outer shape. The lid member 453 shown in (a) of FIG. 23 is in a state of covering the entire lower half of the downstream end opening 4042o, and it is difficult for the roasted coffee beans B to fall from the outlet portion 45 when the screw blade ESC2 stops rotating. In addition, the outlet portions 45 shown in FIG. 23 also face obliquely upward. Therefore, the lid member 453 also faces obliquely upward and is difficult to pivot upward. However, by the extrusion force of the roasted coffee beans B conveyed by the rotating screw blade ESC2, the lid member 453 pivots upward as shown by an arrow in the drawing, and the roasted coffee beans B are also fed out from the outlet portion 45 shown in (a) of FIG. 23.

The cover member 460 shown in (b) of FIG. 23 is the same as the cover member 460 shown in (a) of FIG. 23 except that a size and a shape of the lid member 453 are different. The lid member 453 shown in (b) of FIG. 23 covers a part of the lower half of the downstream end opening 4042*o*, and has a semicircular outer shape. Therefore, although a gap W3 is generated between the lid member 453 and the edge 4042*e* defining the downstream end opening 4042*o*, the gap W3 is narrower than the size of one of the general roasted coffee beans B. In the cover member 460 shown in (b) of FIG. 23, it is also difficult for the roasted coffee beans B to fall when the screw blade ESC2 stops rotating. On the other hand, by the extrusion force of the conveyed roasted coffee beans B, the lid member 453 pivots upward as shown by an arrow in the drawing, and the roasted coffee beans B are also fed out from the outlet portion 45 shown in (b) of FIG. 23. In particular, since the outlet portion 45 shown in (b) of FIG. 23 has the gap W3, the allowance for passage of the roasted coffee beans B is higher than that of the outlet portion 45 shown in (a) of FIG. 23.

The cover member 460 shown in (c) of FIG. 23 does not include only the cover plate 461, and includes only the outlet portion 45 including two pivot shafts 452L and 452R and a pair of left and right lid members 453L and 453R. The two pivot shafts 452L and 452R are inclined from a vertical direction in a relation in which the downstream end opening 4042*o* faces obliquely upward. The left lid member 453L covers the entire left half of the downstream end opening 4042*o* and has a semicircular outer shape. The right lid member 453L covers the entire left half of the downstream end opening 4042*o* and has a semicircular outer shape. In the outlet portion 45 shown in (c) of FIG. 23, it is also difficult for the roasted coffee beans B to fall when the screw blade ESC2 stops rotating. On the other hand, by the extrusion force of the conveyed roasted coffee beans B, as shown by arrows in the drawing, the left lid member 453L pivots to the left side, the right lid member 453R pivots to the right side, and the roasted coffee beans B are also fed out from the outlet portion 45 shown in (c) of FIG. 23.

Although the outlet portions 45 shown in FIG. 23 also face obliquely upward, the outlet portions may face just beside.

In the above description, "a coffee machine [for example, the beverage production device 1, the coffee bean grinding machine GM] for performing preparation using coffee beans, including: a conveying mechanism [for example, the electric screw conveyor ESC] configured to convey coffee beans toward an opening [for example, the downstream end opening 4042*o*]; and an outlet portion [for example, the outlet portion 45] configured to allow the coffee beans conveyed by the conveying mechanism to pass therethrough while reducing an area of the opening" has been described.

The conveying mechanism may be disposed in a cylindrical body, and the cylindrical body may have an upstream side serving as a reservoir side in which the coffee beans are stored and the opening on a downstream side.

Here, the coffee machine may be a coffee machine including: a reservoir unit configured to store coffee beans; a conveying mechanism configured to convey the coffee beans from the storage portion toward an opening; and an outlet portion configured to allow the coffee beans conveyed by the conveying mechanism to pass therethrough while reducing an area of the opening.

"The coffee machine in which, in the outlet portion, flexible belt-shaped members [for example, the belt-shaped members 451] are disposed in one direction [for example, a lateral direction] at intervals [for example, the intervals W1 and W2]" has also been described.

The one direction may be the lateral direction, a vertical direction, or an oblique direction.

The outlet portion may have a comb shape.

Both ends of each of the belt-shaped members may be fixed [for example, the belt-shaped members 451 shown in (f) of FIG. 22].

"The coffee machine in which each of the belt-shaped members has one end as a fixed end and the other end as a free end [for example, the belt-shaped members 451 shown in (a) to (e) of FIG. 22]" has also been described.

"The coffee machine in which the other end is positioned inside an edge defining the opening [for example, the belt-shaped members 451 shown in (a), (d), and (e) of FIG. 22]" has also been described.

The other end may be separated from the edge [for example, the edge 4042*e*] defining the opening by a first length, and the first length may be shorter than a size of coffee beans.

"A beverage production device in which a part of the belt-shaped member [for example, the belt-shaped members 451 shown in (b) and (c) of FIG. 22] on a side to be the other end [for example, a free end side] overlaps the edge [for example, the edge 4042*e*] defining the opening" has also been described.

That is, the other end may be positioned on an outer side of the edge [for example, a tip end of each of the belt-shaped members 451 shown in (b) of FIG. 22] or may be positioned at the edge [for example, a tip end of each of the belt-shaped members 451 shown in (c) of FIG. 22].

"The coffee machine in which the interval [for example, the intervals W1 and W2] is smaller than a size of the coffee beans" has also been described.

"The coffee machine further including a cover portion [for example, the cover plate 461] configured to cover a part of the opening separately from the outlet portion" has also been described.

The cover portion may be fixedly disposed along an outer periphery of the opening. The cover portion may have a plate shape.

"The coffee machine in which the outlet portion is a lid member [for example, the lid members 453 shown in FIG. 23, the left lid member 4531, and the right lid member 453R] that opens by a conveying force [for example, an extrusion force of the roasted coffee beans B conveyed by the rotating screw blade ESC2] of coffee beans by the conveying mechanism" has also been described.

"The coffee machine in which the outlet portion faces obliquely upward [for example, see the downstream end opening 4042*o* shown in (a) of FIG. 21]" has also been described.

Next, a bean outlet will be described.

(a) of FIG. 24 is a diagram showing a state in which a lid unit GM21 for opening and closing a bean outlet GM20 provided in the center casing GM10 of the coffee bean grinding machine GM is closed, and (b) of FIG. 24 is a diagram showing a state in which the lid unit GM21 is opened.

As described above, the option attachment portion GM11 is provided in the upper portion of the center casing GM10 of the coffee bean grinding machine GM. A start button GM15 for instructing the start of a grinding process by being pressed is provided in a middle portion in a height direction of the center casing GM10. Further, a lower portion of the center casing GM10 covers the first grinder 5A. The bean outlet GM20 shown in (b) of FIG. 24 is provided downstream of the option attachment portion GM11 and upstream of the first grinder 5A. That is, when the weighing unit 404 is attached to the option attachment portion GM11, a position of the bean outlet. GM20 is a position on a downstream side of the feel) out port 4043 (see (a) of FIG. 21) of the weighing unit 404, and when the reservoir units (401 to 403) are attached to the option attachment portion GM11, the position is a position on a downstream side of the supply port USP (see (a) of FIG. 21) of the reservoir units. Roasted coffee beans stored in the reservoir units (401 to 403) are fed out from the bean outlet GM20. In addition, when the weighing unit 404 is attached to the option attachment portion GM11, a surplus of the beans may be discharged from the bean outlet GM20 as a result of the weighing. A guide passage forming member GM22 is attached to the center casing GM10 so as to prevent the roasted coffee beans discharged from the bean outlet GM20 from being scattered. As shown in (b) of FIG. 24, the roasted coffee beans B discharged from the bean outlet GM20 are guided by the guide passage forming member GM22 and slide obliquely downward. When a collection container is attached to the vicinity of a tip end of the guide passage forming member GM22, the discharged roasted coffee beans can be easily collected in the collection container.

As shown in (b) of FIG. 24, the lid unit GM21 includes an inner lid GM211 and an outer lid 212. In a closed state shown in (a) of FIG. 24, the inner lid GM211 is a part of a circumferential wall of a bean conveying passage (not shown) provided inside the center casing GM10. On the other hand, the outer lid GM212 is a member constituting a part of the center casing GM10 in the closed state shown in (a) of FIG. 24. The bean outlet GM20 provided in the center casing GM10 is closed by the outer lid GM212.

For example, after the weighing by the weighing unit 404 is completed and the weighed roasted coffee beans are put into the first grinder 5A, the lid unit GM21 is automatically switched from a closed state to an open state under the control of the control device 11. When the lid unit GM21 is in the open state, the screw blade ESC2 resumes rotation, and remaining coffee beans are conveyed, and are discharged from the bean outlet GM20 before arriving the first grinder 5A. When roasted coffee beans remain in the electric screw conveyor ESC, roasted coffee beans of a different type are mixed when the roasted coffee beans of a different type are subjected to a grinding process in the next. Therefore, it is necessary to take out the remaining roasted coffee beans from the inside of the electric screw conveyor ESC to the outside. Even when the weighing unit 404 is not mounted and roasted coffee beans of the same type are used, the bean outlet GM20 effectively functions. Normally, until a rotation speed of a first motor of the first grinder 5A reaches a constant speed, roasted coffee beans are not supplied to the first grinder 5A, but beans remaining in front of the first grinder 5A are only discarded because they are ground by the first grinder 5A. However, if the bean outlet GM20 is provided, the remaining beans in front of the first grinder 5A can be collected from the bean outlet GM20, and the beans are not wasted. When the driving of first grinder 5A is stopped, the lid unit GM21 automatically changes from the closed state to the open state under the control of the control device 11. When the lid unit GM21 is automatically changed to the open state, it is notified in advance that the lid unit GM21 will be opened. Not only in the case of remaining roasted coffee beans, but also in the case of stopping the grinding process in the middle, the lid unit GM21 is opened, and the roasted coffee beans can be taken out to the outside from the inside of the coffee bean grinding machine GM.

Further, the lid unit GM21 may be manually opened. For example, when the first grinder 5A is being driven, the lid unit GM21 is automatically locked and cannot be opened, but when the first grinder 5A is stopped, the automatic lock may be released and the lid unit GM21 may be manually opened at any time. Alternatively, the lid unit GM21 may be opened according to an instruction from an external terminal such as the mobile terminal 17.

In a grinding method in the coffee bean grinding machine GM described above, first, the reservoir units (401 to 403) capable of storing coffee beans are attached to the option attachment portion GM11 provided upstream of the first grinder 5A (attachment step). Next, the coffee beans stored in the reservoir units attached to the option attachment portion GM11 are supplied to the first grinder 5A (supply step). Then, the supplied coffee beans are ground by the first grinder 5A (grinding step). Finally, the coffee beans remaining between the reservoir units (401 to 403) and the first grinder 5A are taken out to the outside from the bean outlet GM20 (take-out step).

The bean outlet GM20 and the outer lid 212 that opens and closes the bean outlet GM20 is also applicable to the beverage production device 1 shown in FIG. 1. The bean outlet GM20 may be provided at a position below the bean inlet 103, which is upstream of the pulverizing device 5, by changing a mounting position of the information display device 12.

According to the above description, "A coffee bean grinding machine [for example, the coffee bean grinding machine GM shown in FIG. 18] including a grinder [for example, the pulverizing device 5] configured to grind coffee beans, in which an option attachment portion [for example, the option attachment portion GM11] is provided upstream of the grinder, and a reservoir unit [for example, the canister accommodation unit 401 shown in FIG. 18, the hopper unit 402 shown in (a) of FIG. 20] capable of storing coffee beans can be attached to the option attachment portion" has been described.

According to this coffee bean grinding machine, various option units can be attached to the option attachment portion, which is excellent in development. An example of the option unit is a reservoir unit capable of storing roasted coffee beans to be supplied to the grinder.

"The coffee bean grinding machine in which a funnel unit [for example, the funnel unit 403 shown in (h) of FIG. 20] for introducing coffee beans can be attached to the option attachment portion" has also been described.

"The coffee bean grinding machine in which a weighing unit [for example, the weighing unit 404 shown in FIG. 21] for weighing coffee beans and conveying the coffee beans toward a downstream side can be attached to the option attachment portion" has also been described.

"The coffee bean grinding machine in which an outlet [for example, the bean outlet GM20] capable of taking out coffee beans to the outside is provided upstream of the grinder and downstream of the option attachment portion" has also been described.

"The coffee bean grinding machine provided with a lid [for example, the outer lid 212] for opening and closing the outlet" has also been described.

Further, "a coffee bean grinding system (for example, FIG. 10 or FIG. 19) including an external device (for example, the server 16 or the mobile terminal 17) capable of communicating with the coffee bean grinding machine" has also been described.

"A grinding method of coffee beans in a grinder for grinding coffee beans, including: an attachment step of attaching a reservoir unit [for example, the canister accommodation unit 401 shown in FIG. 18, the hopper unit 402 shown in (a) of FIG. 20, and the funnel unit. 403 shown in (b) of FIG. 20] capable of storing coffee beans to an option attachment portion [for example, the option attachment portion GM11] provided upstream of the grinder; and a grinding step of grinding coffee beans stored in the reservoir unit attached to the option attachment portion with the grinder" has also been described.

According to the above description, "a coffee bean grinding machine [for example, the beverage production device 1 shown in FIG. 1 or the coffee bean grinding machine GM shown in FIG. 18] provided with a grinder [for example, the pulverizing device 5] for grinding coffee beans, in which an outlet [for example, the bean outlet GM20] from which coffee beans can be taken out is provided upstream of the grinder]" has been described.

According to this coffee bean grinding machine, coffee beans that do not need to be supplied to the grinder can be taken out from the outlet to the outside. As a result, coffee beans that do not need to be ground can be collected.

"The coffee bean grinding machine provided with a lid [for example, the outer lid 212] for opening and closing the outlet port" has also been described.

"The coffee bean grinding machine further including a reservoir unit [for example, the reservoir device 4] capable of storing coffee beans on an upstream side of the grinder, in which the coffee beans stored in the reservoir unit can be taken out from the outlet" has also been described.

"The coffee bean grinding machine further including a cover body [for example, the center casing GM10] configured to cover at least a part of the grinder, in which when the lid is in an open state, a part of the cover body is also in an open state, and coffee beans can be taken out" has also been described.

"The coffee bean grinding machine further including a cover body [for example, the center casing GM10] configured to cover at least a part of the reservoir unit, in which when the lid is in an open state, a part of the cover body is also in an open state, and coffee beans can be taken out" has also been described.

"The coffee bean grinding machine further including a guide passage [for example, a guide passage formed by the guide passage forming member GM22] configured to guide coffee beans taken out from the outlet" has also been described.

Further, "a coffee bean grinding system. (for example, FIG. 10 or FIG. 19) including an external device (for example, the server 16 or the mobile terminal 17) capable of communicating with the coffee bean grinding machine" has also been described.

"A grinding method for coffee beans in a grinder for grinding coffee beans, including: a supply step of supplying coffee beans to the grinder; a grinding step of grinding the coffee beans supplied in the supply step with the grinder; and a take-out step of taking out coffee beans to the outside from an outlet provided upstream of the grinder" has also been described.

Next, the pulverizing device 5 of the coffee bean grinding machine GM will be described. The pulverizing device 5 has a basic configuration same as the basic configuration of the pulverizing device 5 described with reference to FIGS. 12 to 17, and includes the first grinder 5A, the second grinder 5B, and the separation device 6. Hereinafter, differences from the pulverizing device 5 described with reference to FIGS. 12 to 17 will be mainly described, and redundant description may be omitted.

FIG. 25 is a diagram showing a main configuration of the pulverizing device 5 built in the coffee bean grinding machine GM in a posture in which the guide passage forming member GM22 shown in FIG. 24 faces the front.

In FIG. 25, the first grinder 5A, the forming unit 6B, and the second grinder 5B are disposed from an upstream side. That is, the forming unit 6B is provided downstream of the first grinder 5A and upstream of the second grinder 5B. The first grinder 5A and the second grinder 5B are mechanisms that grind roasted coffee beans supplied from a reservoir unit such as the canister accommodation unit 401, the hopper unit 402, or the funnel unit 403. When the weighing unit 404 shown in (a) of FIG. 21 is attached, the first grinder 5A and the second grinder 5B serve as mechanisms that grind roasted coffee beans conveyed by the electric screw conveyor ESC. A connecting structure of the first grinder 5A and the forming unit 6B is the same as the connecting structure described with reference to FIG. 13, that is, the forming unit 6B is provided with the cylindrical portion 65 (see FIG. 13), which is not shown in this example, and the discharge port 51*a* (see FIG. 13 or FIG. 26) of the first grinder 5A is connected to the opening portion 65*a* (see FIG. 13) at an upper end of the cylindrical portion 65.

An upper end of a coupling duct 661 is connected to the discharge port 66 of the forming unit 6B. In FIG. 25, a lower side portion of the coupling duct 661 is obscured by the manual setting disc dial 695. The coupling duct 68 and the manual setting disc dial 695 are provided only in the coffee bean grinding machine GM, and details thereof will be described later.

FIG. 25 shows the fixed blade 57*b* disposed on an upper side and the rotary blade 58*b* disposed on a lower side, which constitute the second grinder 5B.

The fixed blade 57*b* can be moved up and down with respect to the rotary blade 58*b*, and a particle size of ground beans can be adjusted by adjusting an interval between the rotary blade 58*b* and the fixed blade 57*b*. FIG. 25 also shows a worm wheel 691 and a worm gear 692 that meshes with the worm wheel (91 as a part of a lifting mechanism of the fixed blade 57*b*. Details of the lifting mechanism of the fixed blade 57*b* will be described later.

First, the first grinder 5A will be described.

FIG. 26 is a perspective view of the first grinder 5A.

The first grinder 5A shown in FIG. 26 is a grinder for crushing coffee beans into a predetermined size (for example, about ¼) to facilitate separation of wastes adhering to the coffee beans. A rotation shaft. (not shown in FIG. 26) extends from above, and the rotary blade 58*a* serving as a cutter is provided on the rotation shaft. The fixed blade 57*a*, which is a cutter, is provided around the rotary blade 58*a*. The fixed blade 57*a* shown in FIG. 26 is provided on an inner circumferential surface of the main body portion 53*a*. The rotation shaft is rotated by a first motor (not shown) (see the motor 52*a* shown in FIG. 12), and the rotary blade 58*a* is rotated.

Roasted coffee beans introduced into a bean conveying passage provided inside the center casing GM10 pass through a portion blocked by the inner lid GM211 shown in (b) of FIG. 24, and arrive the first grinder 5A.

FIG. 27 is a flowchart showing a grinding process of the first grinder 5A, which is executed by the processing unit 11*a* shown in FIG. 19.

The grinding process of the first grinder 5A shown in FIG. 27 is started in response to pressing of the start button GM15 shown in FIG. 24. When the weighing unit 404 shown in FIG. 21 is attached to the option attachment portion GM11, the grinding process may be started in response to the start of the rotation of the screw blade ESC2. On the other hand, when a predetermined time elapses after the electric screw conveyor ESC finishes conveying a set amount of roasted coffee beans, an end condition is satisfied, and the grinding process of the first grinder 5A ends. A sensor for detecting roasted coffee beans passing through an inlet of the first grinder 5A may be provided, and the grinding process of the first grinder 5A may be started or ended according to a detection result of the sensor.

First, the processing unit 11a starts forward rotation of the first motor (step S11), and the rotary blade 58a starts forward rotation. Next, it is determined whether to continue the forward rotation of the first motor based on whether the end condition is satisfied (step S12). If the end condition is satisfied, the determination result is No, the forward rotation of the first motor is stopped (step S17), and the grinding process of the first grinder 5A ends. On the other hand, f the end condition is not satisfied, the determination result is Yes, the process proceeds to step S13, and the forward rotation of the first motor is continued.

An upper surface 58a1 of the rotary blade 58a is inclined downward toward a downstream side in a forward rotation direction. At least the highest position of the upper surface 58a1 of the rotary blade 58a is a position above the fixed blade 57a. Roasted coffee beans that arrive the first grinder 5A are guided by the upper surface 58a1 of the rotating rotary blade 58a and are directed toward the fixed bade 57a by a centrifugal force, or are directed toward the fixed blade 57a without being guided by the upper surface 58a1 of the rotary blade 58a, and are pulverized while being sandwiched between the fixed blade 57a 58a and the rotary blade 58a. The pulverized ground beans are discharged from the discharge port 51a (see (a) of FIG. 26) to the forming unit 6B.

Although rare, in roasted coffee beans B that arrive the first grinder 5A, foreign substances harder than the roasted coffee beans B, such as stones and nails, may be mixed. Such foreign substances cannot be ground between the fixed blade 57a and the rotary blade 58a, and the rotary blade 58a cannot rotate normally with the foreign substances caught between the fixed blade 57a and the rotary blade 58a.

In (a) of FIG. 26, a stone St is caught between the fixed blade 57a and the rotary blade 58a, and the rotary blade 58a cannot normally rotate forward. That is, the rotation is stopped or a rotation speed is significantly reduced. The processing unit 11a shown in FIG. 19 monitors a value of a current flowing through the first motor. When the rotary blade 58a cannot normally rotate forward, the current value becomes an abnormal value (a value exceeding a reference value). In step S13 shown in FIG. 27, the processing unit 11a determines whether the current value is an abnormal value, and if the current value is a normal value, the processing unit 11a returns to step S12. On the other hand, when it is determined that the current value is an abnormal value, the first motor is rotated in reversely (step S14), and the rotary blade 58a starts to rotate reversely.

In (b) of FIG. 26, the first motor starts to rotate reversely, and the stone St caught between the fixed blade 57a and the rotary blade 58a falls. In addition to the current value, the processing unit 11a may monitor a rotational torque and determine whether a value of the rotational torque is an abnormal value. Alternatively, instead of monitoring the first motor, the processing unit 11a may monitor the number of rotations and a rotation speed of the rotary blade 58a and determine whether these values are abnormal values.

In step S15 subsequent to step S14 shown in FIG. 27, an instruction is issued to output a notification indicating that an abnormal value is detected. Although the notification here is an error display displayed on a display screen of the information display device 12 (for example, a character display of "a bean clogging error has occurred in the first grinder 5A"), an error notification sound may be output from a speaker provided in the information display device 12. The processing unit 11a records a log indicating that an abnormal value is detected in the storage unit 11b (step S16). Either the abnormality notification or the abnormality log recording may be performed first, or may be performed at the same time. Alternatively, only one of the abnormality notification and the abnormality log recording may be executed, or both the abnormality notification and the abnormality log recording may not be executed.

When the execution of step S16 is completed, the process returns to step S11, and the processing unit 11e outputs an instruction to start forward rotation of the first motor.

(c) of FIG. 26 shows a state in which the rotation of the first motor returns to the forward rotation, and the roasted coffee beans B are normally pulverized. The reverse rotation of the first motor shown in (b) of FIG. 26 is instantaneous, and the first motor is immediately returned to the forward rotation. The reverse rotation of the first motor may be continued for a predetermined time. For example, the reverse rotation of the first motor may be continued while an abnormality is being notified, and when the first motor returns to the forward rotation, an error resolution notification saying that "the bean clogging error has been resolved" may be output.

The falling stone St in (b) of FIG. 26 arrives the second grinder 5B. Since the second grinder 5B is a grinder for fine grinding, a gap between the fixed blade 57b and the rotary blade 58b is narrow, the possibility that the stone St enters this gap is low, and the stone St remains on the fixed blade 57b. After the error notification in step S15 or the abnormality log storage in step S16, maintenance of the pulverizing device 5 is performed, and the stone St is removed at that time.

As described above, although the reverse rotation of the first motor is performed during the grinding process of the first grinder 5A executed by the processing unit 11a, an instruction to start the reverse rotation of the first motor may be output from an external terminal such as the mobile terminal 17 shown in FIG. 19. Alternatively, an instruction to stop the rotation of the first motor may be output from the external terminal. Further, an instruction to stop the operation of the entire coffee bean grinding machine GM may be output from the external terminal. The processing unit 11a controls the actuator group 14 according to such instructions from the external terminal.

In the description using FIG. 26, an example in which a stone is caught between the fixed blade 57a and the rotary blade 58a has been described, but in some cases, roasted coffee beans that are extremely hard and degraded may be caught between the fixed blade 57a and the rotary blade 58a, and even in such a case, it is possible to continue the grinding process of the first grinder 5A by performing the reverse rotation control of step S14. Damages to the first motor, the fixed blade 57a, and the rotary blade 58a are avoided.

A reverse rotation switch for reversely rotating the first motor may be provided, and when an abnormal value is detected, the reverse rotation control of step S14 is not performed and an instruction for the abnormality notification of step S15 is issued, and the reverse rotation of the first motor may be performed by a user of the coffee bean grinding machine GM operating the reverse rotation switch.

Roasted coffee beans can be more accurately weighed using the weighing unit 404 shown in FIG. 21, but the roasted coffee beans can be weighed by the first grinder 5A on the assumption that a predetermined amount of roasted coffee beans is continuously supplied to the first grinder 5A per unit time without using the weighing unit 404. That is, by measuring the time from when the current value of the first motor of the first grinder 5A becomes high after starting to grind beans, it is possible to calculate an amount of the beans ground by the first grinder 5A.

The grinding process of the first grinder 5A described above with reference to FIGS. 26 and 27 is also applicable to the grinding process of the first grinder 5A in the beverage production device 1 shown in FIG. 1. Further, the grinding process of the first grinder 5A described with reference to FIGS. 26 and 27 is also applicable to the grinding process of the second grinder 5B.

According to the above description, "a coffee machine [for example, the beverage production device 1 shown in FIG. 1 or the coffee bean grinding machine GM shown in FIG. 18] including a grinder [for example, the first grinder 5A] for grinding coffee beans, in which the grinder includes a grinding unit [for example, the rotary blade 58a] capable of performing a predetermined rotation operation, and includes a determination device [for example, the processing unit 11a that executes step S13 shown in FIG. 27] that determines whether the grinding unit is in a normal state capable of performing a normal rotation operation" has been described.

According to this coffee machine, it is possible to detect, based on a determination result of the determination device, an abnormal state in which the grinding unit is not performing a normal rotation operation.

"The coffee machine further including a control device configured to control the grinder [for example, the processing unit 11a shown in FIG. 10 or FIG. 19], in which the control device can cause the grinding unit to perform a rotation operation in a direction opposite to the predetermined rotation operation when the determination device determines that the grinding unit is not in the normal state [for example, step S14 shown in FIG. 27]" has also been described.

"The coffee machine further including a drive unit [for example, the motor 52a shown in FIG. 12 and the first motor] configured to drive the grinding unit, in which the determination device determines whether the grinding unit is in the normal state based on whether a current flowing through the drive unit exceeds a predetermined value [for example, step S13 shown in FIG. 27]" has also been described.

"The coffee machine further including: a notification device [for example, the information display device 12] configured to, when the determination device determines that the grinding unit is not in the normal state, notify that the grinding unit is in an abnormal state [for example, output an error display or an error notification sound]" has also been described.

"The coffee machine further including: a storage device [for example, the storage unit 11b shown in FIG. 10 or FIG. 19] capable of storing an abnormal state [for example, an abnormality log] when the determination device determines that the grinding unit is not in the normal state" has also been described.

Further, "a coffee machine system (for example, FIG. 10 or FIG. 19) including an external device (for example, the server 16 or the mobile terminal 17) capable of communicating with the coffee machine" has also been described.

"A grinding method of coffee beans, including: a start step of starting a rotation operation of a grinding unit grinding coffee beans [for example, step S11 shown in FIG. 27]; and a determination step of determining whether the grinding unit is in a normal state capable of performing a normal rotation operation [for example, step S13 shown in FIG. 27]" has also been described.

Next, the suction unit 6A, which is not shown in FIG. 25, will be described.

(a) of FIG. 28 is a diagram showing the separation device 6. (a) of FIG. 28 shows the suction unit 6A and the forming unit 6B constituting the separation device 6.

A configuration of the forming unit 6B shown in (a) of FIG. 28 is the same as the configuration of the forming unit 6B described with reference to FIGS. 13 to 17, and a detailed description thereof will be omitted here.

The suction unit 6A shown in (a) of FIG. 28 is a unit that communicates with the separation chamber SC (see FIGS. 13 and 15 as well) in a direction (in this example, the left-right direction) intersecting with a passing direction BP (in this example, the upper-lower direction) of ground beans and suctions the air in the separation chamber SC. By suctioning the air in the separation chamber SC, lightweight objects such as chaff and fine powder are suctioned. As a result, wastes can be separated from the ground beans.

The suction unit 6A is a mechanism of a centrifugal separation type. The suction unit 6A includes the air blowing unit 60A and the collection container 60B. The air blowing unit 60A is a fan motor, and when the fan motor is driven, the air in the separation chamber SC is suctioned, and lightweight objects such as chaff and fine powder are collected in the collection container 60B. The air blowing unit 60A is covered with a casing 60C shown in FIG. 18, and the air blowing unit 60A is not visible in the external perspective view of the coffee bean grinding machine GM shown in FIG. 18. An exhaust slit (not shown) is provided on a back surface side of the casing 60C, and the air suctioned by the air blowing unit 60A is exhausted from the exhaust slit to the outside of the coffee bean grinding machine GM. An air volume dial 60D) (see FIG. 18) is provided above the air blowing unit 60A. By operating the air volume dial 60D, a suction volume of the fan motor of the air blowing unit 60A can be changed.

Similarly to the collection container 60B described with reference to FIGS. 13 and 14, the collection container 60B shown in (a) of FIG. 28 includes the upper portion 61 and the lower portion 62.

(b) of FIG. 28 is a diagram showing a state in which the outer circumferential wall 61a (see (a) of FIG. 28) of the upper portion 61 of the collection container 60B is removed.

(b) of FIG. 28 shows the air blowing unit 60A attached to the removed outer circumferential wall 61a. Further, the exhaust pipe 61b of the upper portion 61 is also shown. Similarly to the exhaust pipe 61b shown in FIG. 14, the exhaust pipe 61b shown in (h) of FIG. 28 also has a plurality of fins 61d formed on a circumferential surface thereof. The plurality of fins 61d are disposed in a circumferential direction of the exhaust pipe 61b. Each of the fins 61d is inclined obliquely with respect to an axial direction of the exhaust pipe 61b. The provision of such fins 61d facilitates the swirling of the air containing wastes around the exhaust pipe 61b.

(b) of FIG. 28 shows an internal structure of the lower portion 62 of the collection container 60B. Unlike the lower portion 62 shown in FIG. 14, the lower portion 62 shown in (h) of FIG. 28 has a double structure including an outer case 60Bo and an inner case 60Bi. In (b) of FIG. 28, a part of the inner case 60Bi disposed inside the outer case 60Bo is visible. The inner case 60Bi includes an upper end opening 6uo opened upward, and the exhaust pipe 61b is positioned above and inside the upper end opening 6uo.

(a) of FIG. 29 is a perspective view of the separation device 6 from which the outer case 60Bo is removed, as viewed obliquely from below.

(a) of FIG. 29 shows the inner case 60Bi. A plurality of (four in this example) openings bio are provided at intervals in a circumferential direction in a lower portion pf a circumferential wall 6iw of the inner case 60Bi. Lower edges 6ioe of the edges defining the openings bio are a part of an outer circumferential edge of a bottom surface 61bs of the inner case 60Bi.

(b) of FIG. 29 is a perspective view of the outer case 60Bo showing a positional relation between the outer case 60Bo and the inner case 60Bi.

As shown in (b) of FIG. 29, the bottom surface 6ibs of the inner case 60Bi is positioned near a middle position in a height direction of the outer case 60Bo. A predetermined gap is provided between an inner circumferential surface 6ois of the outer case 60Bo and an outer circumferential surface 6ios of the inner case 60Bi.

(a) of FIG. 30 is a diagram schematically showing a phenomenon such as an air flow in the separation device shown in FIG. 29. In (a) of FIG. 30 and (b) of FIG. 30 to be described later, an air flow containing wastes such as chaff and fine powder is indicated by solid and dotted arrows, the movement of the wastes is indicated by a one-dot chain line arrow, and an air flow from which the wastes is separated is indicated by a two-dot chain line arrow.

When the air blowing unit 60A is driven, air containing wastes such as chaff and fine powder arrives the inside of the upper portion 61 of the collection container 60B through the connecting portion 61c from the separation chamber SC in the forming unit 6B shown in (a) of FIG. 29. The connecting portion 61c is open to the side of the exhaust pipe 61b, the air containing wastes swirls around the exhaust pipe 61b as indica ted by the solid and dotted arrows in (a) of FIG. 30, and eventually enters the inner case 60Bi from the upper end opening 6uo of the inner case 605i. In an upper part of the inner case 60Bi, wastes such as chaff and fine powder fall due to their weights (see the one-dot chain line arrow), further fall into the outer case 60Bo from the plurality of openings bio provided in the vicinity of the bottom surface bibs of the inner case 60Bi (see the one-dot chain line arrow), and accumulate on a bottom surface bobs of the outer case 60Bo. The air from which the wastes fall and are separated in the inner case 605i becomes an upward air flow in the inner case 60Bi as indicated by the two-dot chain line arrow, rises along a central axis of the exhaust pipe 61b, and is exhausted to the outside of the coffee bean grinding machine GM from the exhaust slit (not shown) provided on the back surface side of the casing 600 shown in FIG. 18. As a result, the case (outer case 60Bo) in which the wastes such as chaff and fine powder are accumulated is different from the case (inner case 60Bi) in which the upward air flow is generated, so that the wastes hardly rise up, and the backflow of the wastes is reduced.

Both the outer case 60Bo and the inner case 60Bi have an entire transparent body, and the state of the inside can be checked from the outside. Therefore, it is possible to check an accumulation state of the wastes such as chaff and fine powder and an air flow from the outside. The entire body may not be transparent, or a part of the entire body may be transparent, and the entire body may be translucent instead of being transparent.

(b) of FIG. 30 is a diagram schematically showing a phenomenon such as an air flow in a separation device according to a modification.

In this modification, an upper end of the inner case 60Bi is not open and is closed by a doughnut-shaped top plate bub. The air that swirls around the exhaust pipe 61b and contains wastes such as chaff and fine powder continues to swirl along the outer circumferential surface 6ios of the inner case 60Bi and heads toward the bottom surface 6ibs of the inner case 60Bi (see the solid and dotted arrows). Eventually, the air enters the inner case 60Bi through the plurality of openings 6io provided in the vicinity of the bottom surface 6ibs of the inner case 60Bi. At this time, the wastes such as chaff and fine powder fall due to their weights (see the one-dot chain line arrow) and accumulates on the bottom surface 6obs of the outer case 60Bo. The air from which the wastes fall and are separated becomes an upward air flow in the inner case 60 as indicated by the two-dot chain line arrow, rises along a central axis of the inner case 60, heads upward through the inside of the exhaust pipe 61b, and is exhausted to the outside of the coffee bean grinding machine GM from the exhaust slit (not shown) provided on the back surface side of the casing 60C shown in FIG. 18. In this modification as well, the case (outer case 60Eo) in which the wastes such as chaff and fine powder are accumulated is different from the case (inner case 60Bi) in which the upward air flow is generated, so that the wastes hardly rise up, and the backflow of the wastes is reduced.

The separation device 6 described above with reference to FIGS. 28 to 30 is also applicable to the separation device of the beverage production device 1 shown in FIG. 1.

According to the above description, "a coffee machine [for example, the beverage production device 1 shown in FIG. 1 or the coffee bean grinding machine GM shown in FIG. 18] including: a grinder [for example, the first grinder 5A] configured to grind coffee beans; a separation unit [for example, the separation chamber SC] configured to separate a waste [for example, chaff and fine powder] from coffee beans; and a reservoir unit [for example, the lower portion 62 of the collection container 60B] configured to store the waste separated from the coffee beans in the separation unit, in which the reservoir unit includes an outer case body [for example, the outer case 60Bo shown in FIG. 28 or (b) of FIG. 29] and an inner case body, [for example, the inner case 60Bi shown in FIG. 29] inside the outer case body, and the inner case body has, in a circumferential wall [for example, the circumferential wall 6iw shown in (a) of FIG. 29] thereof, an opening [for example, the opening 6io] connected to the inside of the outer case body" has been described.

The opening may allow the waste to pass therethrough or may allow an air flow to pass therethrough.

"The coffee machine further including a suction unit [for example, the air blowing unit 60A] above the reservoir unit, in which the inner case body is configured such that an air flow containing the waste enters inside the circumferential wall, the waste falls by an own weight thereof inside the circumferential wall [for example, the one-dot chain line shown in (a) of FIG. 30], and an air flow [for example, the two-dot chain line shown in (a) of FIG. 30] is suctioned by the suction unit and rises, and the outer case body stores the waste [for example, the one-dot chain line shown in (a) of FIG. 30] passed through the opening" has also been described.

The inner case body may be configured such that the air flow containing the waste swirls along the circumferential wall, the waste falls by an own weight thereof in the vicinity of the opening [for example, the one-dot chain line arrow shown in (h) of FIG. 30], and an air flow [for example, the two-dot chain line arrow shown in (b) of FIG. 30] is suctioned by the suction unit and rises, and the outer case body may store the waste [for example, the one-dot chain line arrow shown in (b) of FIG. 30] fallen from the vicinity of the opening.

"The coffee machine in which the outer case body is provided with a transparent portion [for example, an entire transparent body]" has also been described.

"The coffee machine in which the inner case body is provided with a transparent portion [for example, an entire transparent body]" has also been described.

"The coffee machine in which a discharge unit [for example, the exhaust slit provided on the back surface side of the casing 600] configured to discharge air in the reservoir unit to an outside is provided above the reservoir unit" has also been described.

"The coffee machine in which the grinder includes a first grinder [for example, the first grinder 5A] and a second grinder [for example, the second grinder 5B], and the separation unit is provided downstream of the first grinder and upstream of the second grinder" has also been described.

Further, "a coffee machine system (for example, FIG. 10 or FIG. 19) including an external device (for example, the server 16 or the mobile terminal 17) capable of communicating with the coffee machine" has also been described.

"A method for collecting a waste generated from coffee beans when the coffee beans are ground, the method including: a separation step of separating a waste from coffee beans; a first step of directing an air flow containing the waste inside a circumferential wall of an inner case body which is disposed inside an outer case body and in which the circumferential wall is provided with an opening connected to the inside of the outer case body; and a second step of generating an upward air flow inside the circumferential wall by suctioning the inside of the circumferential wall from above" has also been described.

According to this method for collecting a waste, in the second step, the waste may fall on a bottom wall of the inner case body by an own weight thereof, and may further fall from the opening to a bottom wall of the outer case body.

Next, the coupling duct 661 will be described.

FIG. 31 is a diagram in which the manual setting disc dial 695 shown in FIG. 25 is removed so that the entire coupling duct 661 can be seen.

FIG. 31 shows the rotary blade 58b that constitutes the second grinder 5B, the fixed blade 57b that can move up and down with respect to the rotary blade 58b, and shows the worm wheel 691 and the worm gear 692 that meshes with the worm wheel 691 as a part of a lifting mechanism of the fixed blade 57b. The worm wheel 691 includes a gear portion 691g, a connecting portion 691c, and a coupling port 691j (see FIG. 32). FIG. 31 shows a holder portion 693 provided between the fixed blade 57b and the worm wheel 691. The fixed blade 57b is screwed to the connecting portion 691c of the worm wheel 691 via the holder portion 693. Therefore, when the gear portion 691g of the worm wheel. 691 rotates, the fixed blade 57b also rotates together with the holder portion 693. A screw groove 693s is provided on an outer circumferential surface of the holder portion 693.

The coupling port 691j of the worm wheel 691 connected to a lower end of the coupling duct 661. As a result, a path through which roasted coffee beans pass is formed in the order of the discharge port 66 of the forming unit 6B, the coupling duct 661, the worm wheel 691, the holder portion 693, the fixed blade 57b, and the rotary blade 58b. As shown in FIG. 31, air suction ports 661a are provided in a lower portion of the coupling duct 661. The air suction port 661a has the same function as that of a gap between the discharge port 66 and the inlet 50b of the second grinder 5B shown in FIG. 13, and suction of air from the air suction port 661a improves the performance of separating ground beans and wastes.

FIG. 32 is a diagram schematically showing a configuration of the second grinder 5B.

The second grinder 5B includes the second motor 52b, a motor base 502, a base portion 505a, and a particle size adjusting mechanism 503.

The second motor 52b is a drive source of the second grinder 5B, and is supported above the motor base 502. A pinion gear 52b' fixed to an output shaft of the second motor 52b and a gear 502a that meshes with the pinion gear are disposed above the motor base 502.

A gear 55b' that meshes with the gear 502a is disposed above the base portion 505a. The rotation shaft 54b is fixed to the gear 55b', and the rotation shaft 54b is rotatably supported by the base portion 505a. The rotation shaft 54b is rotated by a driving force of the second motor 52b transmitted to the gear 55b' via the gear 502a. The rotary blade 58b is provided at an end portion of the rotation shaft 54b, and the fixed blade 57b is provided above the rotary blade 58b. That is, the fixed blade 57b is disposed to face the rotary blade 58b.

The particle size adjusting mechanism 503 includes a motor 503a as a drive source thereof and the worm gear 692 rotated by a driving force of the motor 503a. The gear portion 691g of the worm wheel 691 meshes with the worm gear 692.

FIG. 32 shows a frame member 694. The frame member 694 is fixedly disposed in a casing (not shown), and a screw groove is provided on an inner circumferential surface of the frame member 694. The screw groove 693s provided on the outer circumferential surface of the holder portion 693 meshes with the screw groove of the frame member 694. As described above, the fixed blade 57b is screwed to the connecting portion of the worm wheel 691 via the holder portion 693. Therefore, when the gear portion 691g of the worm wheel 691 rotates, the fixed blade 57b moves up and down in an axial direction of the gear portion 691g. The coupling port 691j of the worm wheel 691 is connected so as to overlap the lower end of the coupling duct 661, and the connection with the lower end of the coupling duct 661 is maintained even when the worm wheel 691 moves downward. The fixed blade 57b shown in FIG. 32 is positioned at an initial position and is in a state of being most distant from the rotary blade 58b.

The processing unit 11a shown in FIG. 19 controls a rotation amount of the motor 503a to adjust a gap between the rotary blade 58b and the fixed blade 57b. By adjusting this gap, a particle size of ground beans in the second grinder 5B can be adjusted.

The fixed blade 57b that moves up and down has a detection position that is a predetermined distance (for example, 0.7 mm) separated from the rotary blade 58b. The detection position is a position closer to the rotary blade 58b than the initial position of the fixed blade 57b. The second grinder 5B is provided with a sensor 57c that detects the fixed blade 57b is at the detection position.

The second grinder 5B described above performs an initial operation when the coffee bean grinding machine GM is turned on. In the initial operation of the second grinder 5B, calibration is executed.

FIG. 33 is a flowchart showing steps of the calibration executed in the initial operation. FIG. 34 is a diagram showing a state of the calibration in stages.

In the second grinder 5B, when the pulverizing of roasted coffee beans is finished, the fixed blade 57b returns to the initial position.

When the initial operation is started, the fixed blade 57b is positioned at the initial position, and a contact step (step S51) shown in FIG. 33 is executed as a first step of the calibration. In the contact step, the processing unit 11a shown in FIG. 19 drives the motor 503a shown in FIG. 32. The gear portion 691q of the worm wheel 691 is rotated by the driving of the motor 503a, and the fixed blade 57b at the initial position is lowered until it comes into contact with the rotary blade 58b. (a) of FIG. 34 is a diagram showing a state in which a first contact step is executed. In (a) of FIG. 34, the fixed blade 57b positioned at the initial position is indicated by a two-dot chain line. In the assembly of the second grinder 5B, even if the fixed blade 57b and the rotary blade 58b are intended to be attached as designed, a slight attaching error may occur, and an attaching posture of the fixed blade 57b and the rotary blade 58b may be out of alignment. The fixed blade 57b and the rotary blade 58b may be out of alignment when used for a long time. Further, the frame member 694 and the rotation shaft 54b may be obliquely attached. FIG. 34 exaggeratedly shows that the fixed blade 57b and the rotary blade 58b are out of alignment in the attaching posture. As designed, both the fixed blade 57b and the rotary blade 58b always maintain a horizontal posture, but the rotary blade 58b shown in (a) of FIG. 34 is in a posture inclined upward to the right, and the fixed blade 57b is in a posture inclined downward to the right. When the contact step is executed, the fixed blade 57b moves downward as indicated by an arrow in the drawing, and as indicated by a solid line in (a) of FIG. 34, a portion of the fixed blade 57b that is positioned at a lowermost position due to the inclination comes into contact with a portion of the rotary blade 58b that is positioned at an uppermost position due to the inclination. When any part of the fixed blade 57b comes into contact with any part of the rotary blade 58b, a rotational torque or a current value of the motor 503a increases. When the processing unit 11a detects an increase in the rotational torque or an increase in the current value, the processing unit. 11a stops the motor 503a, and the contact step ends.

Next, a moving step (step S52) is executed, in the moving step, the processing unit 11a rotates the motor 503a in a direction opposite to that in the contact step, and raises the fixed blade 57b to the detection position. (b) of FIG. 34 is a diagram showing a state in which a first moving step is executed. When the moving step is executed, the fixed blade 57b moves upward as shown by an arrow in the drawing, and the fixed blade 57 continues to move upward until the fixed blade 57b is detected by the sensor 57c shown in FIG. 32. When the processing unit 11a acquires a detection signal from the sensor 57c, the processing unit 11a stops the rotation of the motor 503a. The motor 503a is a stepping motor, and the processing unit 11a counts the number of steps from the start to the stop of the rotation of the motor 503a in the moving step, and stores the counted number in the storage unit 11b shown in FIG. 19. The moving step of (b) of FIG. 34 is 20150 steps.

Next, a rotation step (step S53) is executed. In the rotation step, the processing unit 11a rotates the second motor 52b shown in FIG. 32 by a predetermined rotation angle. The predetermined rotation angle referred to herein may be an angle other than 360 degrees, and is set to 90 degrees here for easy understanding, but is actually, for example, a predetermined angle of around 35 degrees. As a result, the state of the rotary blade 58b shown in (c) of FIG. 34 is changed to a posture inclined upward toward a back side of a paper surface. The second motor 52b may be rotated for a predetermined time (for example, 0.1 seconds).

Next, step S54 is executed to determine whether the rotary blade 58b has made one rotation after the calibration is started. In this example, since the predetermined rotation angle in the rotation step of step S53 is less than 360 degrees, in step S54, it is determined whether the rotary blade 58b has made one rotation, but step S54 is a step for determining whether a count value of the number of steps has been acquired a plurality of times. In order to increase the accuracy, step S54 may be a step for determining whether the count value of the number of steps has been acquired a predetermined number of times. As the number of the predetermined number of times increases, the accuracy of the calibration improves, but it takes time to finish the calibration. An example of the predetermined number of times is about 10 times.

In the case of NO in the determination of step S54, a data acquisition process including three steps of the contact step (step S51), the moving step (step S52), and the rotation step (step S53) is executed again. In (d) of FIG. 34, a second contact step is executed, and the fixed blade 57b moves downward as shown by an arrow in the drawing. Since the rotation step is executed, a position in a circumferential direction of an uppermost portion of the rotary blade 58b is different from that in the first contact step. Therefore, in the fixed blade 57b and the rotary blade 58b shown in (d) of FIG. 34, portions different from those in the first contact step are in contact with each other. In (e) of FIG. 34, a second moving step is executed. The second moving step is 20170 steps. In (f) of FIG. 34, a second rotation step is executed, and the rotary blade 58b is rotated by 90 degrees. As a result, the state of the rotary blade 58b shown in (f) of FIG. 34 is changed to a posture inclined upward to the left.

When the rotation step in (f) of FIG. 34 is finished, the rotary blade 58b has rotated 180 degrees from the start of the calibration, and a third data acquisition process is executed. In (g) of FIG. 34, a third contact step is executed, and the fixed blade 57b moves downward as shown by an arrow in the drawing. As a result of the second rotation step being executed, in the fixed blade 57b and the rotary blade 58b shown in (g) of FIG. 34, portions different from those in the previous contact steps are in contact with each other. In (h) of FIG. 34, a third moving step is executed. The third moving step is 20160 steps. In (i) of FIG. 34, a second rotation step is executed, and the rotary blade 58b is rotated by 90 degrees. As a result, the state of the rotary blade 58b shown in (i) of FIG. 34 is changed to a posture inclined upward toward a front side of the paper surface.

When the rotation step (i) of FIG. 34 is finished, the rotary blade 58b has rotated 270 degrees from the start of the calibration, and a fourth data acquisition process is executed. In FIG. 34, the state of the fourth data acquisition process is not shown, but is similar to (d) to (f) of FIG. 34. A fourth moving step was 20168 steps. When a fourth rotation step is executed, the rotary blade 58b rotates 360 degrees from the start of the calibration, "Yes" is determined in the determination of step S54 shown in FIG. 33, and the process proceeds to step 355.

In step S55, the processing unit 11a shown in FIG. 19 executes a calibration value calculation step. The storage unit 11b stores the count values of the number of steps of the motor 503a acquired in the four data acquisition processes.

The processing unit 11*a* calculates a calibration value based on these four count values. The calibration value may be an average value of the four count values, or may be a median value of the four count values (½ of the sum of a minimum value and a maximum value). In the example shown in FIG. 34, the average value is 20162 steps, and the median value is 20160 steps. The calculated calibration value is stored in the storage unit. 11*b*. The calibration value is updated every time the coffee bean grinding machine GM is turned on and the initial operation is performed. When the execution of step S55 is completed, the calibration ends.

FIG. 35 is a diagram showing the second grinder 5B in a grinding process.

(a) of FIG. 35 is a diagram showing an example of an ideal state in which both the fixed blade 57*b* and the rotary blade 58*b* always maintain the horizontal posture as designed.

The diagram shown on a left side of (a) of FIG. 35 is a diagram showing a state in which the fixed blade 57*b* is positioned at the initial position. The processing unit 11*a* shown in FIG. 19 adjusts, according to various production conditions (recipes) for grinding roasted coffee beans stored in the storage unit 11*b*, a particle size of around beans in second grinder 5B using the particle size adjusting mechanism 503 shown in FIG. 32. In the above recipes, production conditions in an ideal state are defined, and in the particle size adjustment of ground beans in the second grinder 5B, the motor 503*a* is rotated by 20160 steps, and the fixed blade 57*b* is lowered from the initial position. The diagram shown on a right side of (a) of FIG. 35 is a diagram schematically showing how the roasted coffee beans B are being pulverized. The fixed blade 57*b* in the diagram on the right side is at a position defined by a recipe where the motor 503*a* is rotated by 20160 steps and the fixed blade 57*b* is lowered from the initial position.

(b) of FIG. 35 is a diagram showing an example of a state in which the attaching posture of the fixed blade 57*b* and the rotary blade 58*b* is out of alignment as shown in FIG. 34.

The diagram shown on the left side of (b) of FIG. 35 is also a diagram showing a state in which the fixed blade 57*b* is positioned at the initial position. The fixed blade 57*b* shown in (b) of FIG. 35 is in a posture inclined downward to the right. On the other hand, the rotary blade 58*b* shown in (h) of FIG. 35 is in a posture inclined upward to the right. Here, the same recipe as the example shown in (a) of FIG. 35 is used. Therefore, the motor 503*a* should be rotated by 20160 steps, but the rotation amount of the motor 503*a* is corrected using the calibration value obtained in step S55 shown in FIG. 33. In the ideal state shown in (a) of FIG. 35, the number of steps of the motor 503*a* required to raise the fixed blade 57*b* from a state in which the fixed blade 57*b* is in contact with the rotary blade 58*b* to the detection position is stored in advance as a reference value in the storage unit 11*b* shown in FIG. 19. In the correction of the rotation amount of the motor 503*a*, the rotation amount of ter the correction is calculated based on a ratio between the calibration value obtained in step S55 shown in FIG. 33 and the reference value stored in advance in the storage unit 11*b*. In this example, the rotation amount after the correction is 20140 steps. The diagram shown on a right side of (b) of FIG. 35 is also a diagram schematically showing how the roasted coffee beans B are being pulverized. The fixed blade 57*b* in the diagram on the right side is at a corrected position where the motor 503*a* is rotated by 20140 steps and the fixed blade 57*b* is lowered from the initial position. However, an average interval between the fixed blade 57*b* and the rotary blade 58*b* shown in (b) of FIG. 35 is substantially the same as an interval between the fixed blade 57*b* and the rotary blade 58*b* shown in (a) of FIG. 35. Therefore, even when the roasted coffee beans B are pulverized in the state shown on the right side of (b) of FIG. 35, ground beans having the same particle size as in the case where the roasted coffee beans B are pulverized in the state shown on the right side of (a) of FIG. 35 can be obtained.

In the above description, although the calibration value is obtained by using the number of steps of the motor 503*a* when the fixed blade 57*b* is raised to the detection position, the calibration value can also be obtained by using the number of steps until the fixed blade 57*b* is lowered from the detection position and comes into contact with the rotary blade 58*b*.

In addition, although only the fixed blade 57*b* of the fixed blade 57*b* and the rotary blade 58*b* is configured to move up and down, the rotary blade 58*b* may also be configured to move up and down, and in this case, the calibration value may be obtained using the number of steps for both blades. Further, the movement of the blade is not limited to the vertical movement, and may be horizontal movement, for example. Positions of the fixed blade 57*b* and the rotary blade 58*b* may be opposite to each other, and the fixed blade 57*b* may be disposed on the lower side and the rotary blade 58*b* may be disposed on the upper side.

When the roasted coffee beans B are pulverized, the fixed blade 57*b* does not rotate, but even when the fixed blade 57*b* rotates, the calibration method shown in FIG. 33 can be applied. Although the calibration method shown in FIG. 33 is a method for the second grinder 5B, the calibration method shown in FIG. 33 can be performed in the same manner for the first grinder 5A.

The calibration value calculation step of step S55 shown in FIG. 33 may not be executed at the calibration stage, and the calibration value may be calculated at the stage where only count values for a plurality of times are stored in the storage unit 11*b* and a recipe to be used is determined, or the rotation amount may be directly corrected based on the stored count values for a plurality of times. The calculation of the calibration value and the correction of the rotation amount may be performed by a control unit of the information display device 12 instead of the processing unit 11*a* shown in FIG. 19.

According to the above description, "an extraction target pulverizing device [for example, the second grinder 5B] including: a first pulverizing unit [for example, the rotary blade 58*b*]; a second pulverizing unit. [for example, the fixed blade 57*b*]; a rotation mechanism [for example, the second motor 52*b*, the pinion gear 52*b*', the gear 502*a*, the gear 55*b*', the rotation shaft 54*b*] configured to rotate at least one pulverizing unit [for example, the rotary blade 58*b*] out of the first pulverizing unit and the second pulverizing unit; a moving mechanism [for example, the particle size adjusting mechanism 503] configured to move [for example, raise and lower] at least the second pulverizing unit out of the first pulverizing unit and the second pulverizing unit to adjust an interval between the first pulverizing unit and the second pulverizing unit; a sensor [for example, the sensor 57*c*] configured to detect the second pulverizing unit at a position [for example, the detection position] separated by a predetermined distance [for example, 0.7 mm] from the first pulverizing unit; and a control unit [for example, the processing unit 11*a* shown in FIG. 19] configured to control the moving mechanism, in which an extraction target [for example, roasted coffee beans stored in the reservoir device 4 or the roasted coffee beans B (ground beans) ground by the first grinder 5A)] is pulverized between the first pulverizing unit and the second pulverizing unit, an operation [for example, the operations shown by the arrows in (b), (e), and (h) of FIG. 34] of moving the second pulverizing unit from a state [for example, the states shown in (a), (d), and (g) of FIG. 34] in which the second pulverizing unit is in contact with the first pulverizing unit until the sensor detects the second pulverizing unit is performed a plurality of times by changing a state of the pulverizing unit [for example, a direction of the rotary blade 58b] by the rotation of the rotation mechanism, and the control unit controls the moving mechanism [For example, a calibration value is obtained, and the motor 503a is rotated by a rotation amount corrected using the calibration value] based on a value [For example, the count value of the number of steps of the motor 503a] related to a movement amount of the second pulverizing unit in the plurality of operations" has been described.

The rotation mechanism may rotate the first pulverizing unit, may rotate the second pulverizing unit, or may rotate blades of both the first pulverizing unit and the second pulverizing unit.

The moving mechanism may move only the second pulverizing unit out of the first pulverizing unit and the second pulverizing unit, or may also move the first pulverizing unit.

The operation may be an operation of moving only the second pulverizing unit out of the first pulverizing unit and the second pulverizing unit, or may be an operation of moving blades of both the first pulverizing unit and the second pulverizing unit.

The state change of the pulverizing unit in the operation may be a state change of the first pulverizing unit, a state change of the second pulverizing unit, or a state change of both pulverizing units of the first pulverizing unit and the second pulverizing unit. The state change referred to herein may be a direction change or a posture change.

"An extraction target pulverizing device [for example, the second grinder 5B] including: a first pulverizing unit [for example, the rotary blade 58b]; a second pulverizing unit [for example, the fixed blade 57b]; a rotation mechanism [for example, the second motor 52b, the pinion gear 52b', the gear 502a, the gear 55b', the rotation shaft 54b] configured to rotate at least one pulverizing unit [for example, the rotary blade 58b] out of the first pulverizing unit and the second pulverizing unit; a moving mechanism. [for example, the particle size adjusting mechanism 503] configured to move [for example, raise and lower] at least the second pulverizing unit out of the first pulverizing unit and the second pulverizing unit to adjust an interval between the first pulverizing unit and the second pulverizing unit; a sensor [for example, the sensor 57c] configured to detect the second pulverizing unit at a position [for example, the detection position] separated by a predetermined distance [for example, 0.7 mm] from the first pulverizing unit; and a control unit [for example, the processing unit 11a shown in FIG. 19] configured to control the moving mechanism, in which an extraction target is pulverized between the first pulverizing unit and the second pulverizing unit, an operation [for example, the operations shown by the arrows in (a), (d), and (g) of FIG. 34] of moving the second pulverizing unit from a state [for example, the states shown in (b), (e), and (h) of FIG. 34] in which the second pulverizing unit is separated by a predetermined distance from the first pulverizing unit until the second pulverizing unit comes into contact with the first pulverizing unit is performed a plurality of times by changing a state of the pulverizing unit [for example, a direction of the rotary blade 58b] by the rotation [for example, the rotations shown by arrows in (c), (f), and (i) of FIG. 34] of the rotation mechanism, and the control unit controls the moving mechanism [For example, a calibration value is obtained, and the motor 503a is rotated by a rotation amount corrected using the calibration value] based on a value [For example, the count value of the number of steps of the motor 503a] related to a movement amount of the second pulverizing unit in the plurality of operations" has also been described.

In addition, the extraction target pulverizing device may be an extraction target pulverizing device including: a first pulverizing unit; a second pulverizing unit attached to face the first pulverizing unit; a rotation mechanism configured to rotate the first pulverizing unit; a moving mechanism configured to move the second pulverizing unit in a direction toward and away from the one blade; a sensor configured to detect the second pulverizing unit at a position separated by a predetermined distance from the first pulverizing unit; and a control unit configured to control the moving mechanism, in which an extraction target is pulverized between the first pulverizing unit and the second pulverizing unit, an operation of moving the second pulverizing unit from a state in which the second pulverizing unit is in contact with the first pulverizing unit until the sensor detects the second pulverizing unit is performed a plurality of times by changing a direction of the first pulverizing unit by the rotation of the rotation mechanism, and the control unit controls the moving mechanism based on values related to a movement amount of the second pulverizing unit in the plurality of operations.

"The extraction target pulverizing device in which the control unit controls the moving mechanism based on an average value or a median value [for example, ½ of the sum of a minimum value and a maximum value] of the values related to the movement amount of the second pulverizing unit in the plurality of operations" has also been described.

"The extraction target pulverizing device in which the operation is performed in an initial operation when the power is turned on" has also been described.

"The extraction target pulverizing device in which the control unit controls the moving mechanism according to a desired particle size [for example, the particle size of ground beans] after the pulverizing of the extraction target, and causes the moving mechanism to adjust the interval" has also been described.

"The extraction target pulverizing device in which the moving mechanism includes a motor [for example, the second motor 52b] as a drive source, and the value related to the movement amount of the second pulverizing unit is a value related to a rotation amount of the motor [for example, a count value of the number of steps of the motor 503a]" has also been described.

"The extraction target pulverizing device in which the first pulverizing unit is a first blade [for example, the rotary blade 58b], the second pulverizing unit is a second blade [for example, the fixed blade 57b], and the second pulverizing unit is attached facing the first pulverizing unit" has also been described.

"The extraction target pulverizing device in which an operation of moving the second pulverizing unit from a state in which the second pulverizing unit is in contact with the first pulverizing unit until the sensor detects the second pulverizing unit is performed a plurality of times by changing a direction of the pulverizing unit by the rotation of the rotation mechanism [for example, the example shown in FIG. 34]" has also been described.

According to the above description, "a calibration method [for example, the calibration method shown in FIG. 33]

executed when power is turned on in an extraction target pulverizing device [for example, the second grinder 5B] including: a moving step [for example, the moving step of Step S52, (b), (e), and (h) of FIG. 34] of moving a second pulverizing unit [for example, the fixed blade 57b] from a state in which a first pulverizing unit [for example, the rotary blade 58b] and the second pulverizing unit are in contact with each other until the second pulverizing unit is separated by a predetermined distance [for example, 0.7 mm] from the first pulverizing unit; a state changing step of changing a state of at least one pulverizing unit [for example, the rotary blade 58b] out of the first pulverizing unit and the second pulverizing unit after the moving step is performed (for example, the rotation step of Step S53, (c), (f), and (i) of FIG. 4); and a contact step of bringing the second pulverizing unit separated by the predetermined distance from the first pulverizing unit into contact with the first pulverizing unit in a state in which the state of the pulverizing unit is changed by the state changing step [for example, Step S51, (a), (d), and (g) of FIG. 34], in which, by repeatedly executing the moving step, the state changing step, and the contact step (for example, the data acquisition process shown in FIG. 33), the state of the pulverizing unit [for example, the direction of the rotary blade 58b] is changed to acquire a value [for example, a count value of the number of steps of the motor 503a] related to a movement amount of the second pulverizing unit a plurality of times" has also been described.

The state changing step may be a rotation step of rotating at least one pulverizing unit out of the first pulverizing unit and the second pulverizing unit to change the direction of the pulverizing unit after the moving step is performed, and may be an aspect in which, by repeatedly executing the moving step, the rotation step, and the contact step, the direction of the pulverizing unit is changed to acquire the value related to the movement amount of the second pulverizing unit a plurality of times.

The value related to the movement amount of the second pulverizing unit may be a value related to a movement amount [for example, an increase amount] of the second pulverizing unit in the moving step, or may be a value related to a movement amount [for example, a decrease amount] of the second pulverizing unit in the contact step. Alternatively, the two movement amounts may be used in combination.

A calibration value calculation process [for example, the calibration value calculation step of step S55] of calculating a calibration value based on the movement amounts of the second pulverizing unit acquired a plurality of times may be included. The calibration value may be an average value or a median value of the movement amounts of the second pulverizing unit acquired a plurality of times.

In the above description, the fixed blade 57b is moved up and down by being driven by the second motor 52b, but the fixed blade 57b can also be moved up and down manually to set the particle size of ground beans. The manual setting of the particle size of ground beans can be performed using a manual setting disc dial and a fine adjustment knob dial.

(a) of FIG. 36 is a diagram showing the manual setting disc dial 695 and a fine adjustment knob dial 696 together with the second motor 503a, and (b) of FIG. 36 is a diagram showing a coupling dial 697 and a rotation shaft 6961 of the fine adjustment knob dial 696 with the manual setting disc dial 695 and the second motor 503a removed. FIG. 36 shows a part of the coupling duct. 661 and the forming unit 6E. (b) of FIG. 36 also shows a hammer member GM32, which will be described in detail later.

FIG. 36 also shows a lever member 698. As shown in (a) of FIG. 36, a rotation shaft 6921 of the worm gear 692 that meshes with the gear portion 691q of the worm wheel 691 is pivotally supported by the lever member 698. The lever member 698 is pivotally supported by the rotation shaft 6961 of the fine adjustment knob dial 696 shown in (b) of FIG. 36. A posture of the lever member 698 shown in FIG. 36 is an initial posture. When the lever member 698 is in the initial posture, the worm gear 692 meshes with the gear portion 691g of the worm wheel 691, and when the worm gear 692 rotates, the worm wheel 691 rotates and the fixed blade 57b moves up and down. The lever member 698 is rotatable about the rotation shaft 6961 of the fine adjustment knob dial 696 in a direction of an arrow shown in (b) of FIG. 36. The lever member 698 is lifted by rotating in the direction of the arrow and changed to a released posture, and can maintain the released posture. When the lever member 698 is lifted and changed to the released posture, the worm gear 692 pivotally supported by the lever member 698 is separated from the gear portion 691g of the worm wheel 691, and is released from meshing with the gear portion 691g. The lever member 698 is capable of changing its posture between the initial posture and the released posture, and a biasing force is applied to the lever member 698 in a direction in which the lever member 698 returns to the initial posture by a spring member 6981 provided on the rotation shaft 6961. When the lever member 698 is in the released posture, the worm wheel 691 is in a rotatable state, and the fixed blade 57b is also in a rotatable state. When a grinding process is performed in this state, the fixed blade 57b also rotates with the rotation of the rotary blade 58b, and the interval between the fixed blade 57b and the rotary blade 58b increases. Therefore, it is necessary to return the lever member 698 to the initial posture during the grinding process.

(a) of FIG. 36 shows a pinion gear 503b attached to a rotation shaft of the second motor 503a, and the pinion gear 503b is also shown in (b) of FIG. 36 with the second motor 503a removed. A rotational driving force of the second motor 503a is transmitted from the pinion gear 503b to the gear portion 691g of the worm wheel 691 from the worm gear 692 via a two-stage gear and a transmission gear 6962, which will be described later.

The coupling dial 697 shown in (b) of FIG. 6 connects the manual setting disc dial 695 and the worm gear 692. (b) of FIG. 36 shows the coupling dial 697 coupled to the worm wheel 691, both of which rotate together. A coupling gear 697g is provided on an upper surface of the coupling dial 697. The manual setting disc dial 695 shown in (a) of FIG. 36 is provided with a gear (not shown) that meshes with the coupling gear 697g, and when the manual setting disc dial 695 is placed on the coupling dial. 697, the gear (not shown) meshes with the coupling gear 697g.

When the lever member 698 is in the initial posture, the worm gear 692 meshes with the gear portion 691g of the worm wheel 691, and thus the manual setting disc dial 695 cannot be rotated. On the other hand, when the lever member 698 is in the released posture, the worm gear 692 does not mesh with the gear portion 691g of the worm wheel 691, and thus the manual setting disc dial 695 can be rotated. When the manual setting disc dial 695 is rotated, the worm gear 692 is rotated via the coupling gear portion 697g, and the fixed blade 57b can be raised and lowered.

The minimum unit that can be adjusted by rotating the manual setting disc dial 695 is one tooth of the gear portion 691q of the worm wheel 691. That is, unless the gear portion 691g of the worm wheel 691 is rotated by one tooth, the worm gear 692 cannot mesh with the gear portion 691*g*, and the lever member 698 cannot return from the released posture to the initial posture. Therefore, the adjustment of less than one tooth is not possible with the manual setting disc dial 695.

On the other hand, when the second motor 503*a* rotates and the worm gear 692 rotates, it takes time to perform a large adjustment (adjustment of one tooth or more) by a reduction ratio of the worm gear 692. Therefore, in order to perform a large adjustment, it is possible to perform a quick adjustment by operating the manual setting disc dial. 695 capable of directly rotating the worm wheel 691. In the adjustment using the manual setting disc dial 695, the fixed blade 57*b* is lowered, and a position of the fixed blade 57*b* at the moment when the fixed blade 57*b* hits the rotary blade 58*b* is set to a reference point (zero point). The moment of this hitting can be recognized by the sound of the blade hitting. Although not shown, the manual setting disc dial 695 has a scale including 0 in a circumferential direction. The manual setting disc dial 695 rotates below the center casing GM10 shown in FIG. 18 and the like, and a reference line GM10*k* is marked on a lower end portion of the center casing GM10. The manual setting disc dial 695 is rotated to lower the fixed blade 57*b*, and when the fixed blade 57*b* hits the rotary blade 58*b*, the rotation operation is stopped at that time. The manual setting disc dial 695 is lifted up, the scale of 0 is aligned with the reference line GM10*k* marked on the center casing GM10, and then the lifted manual setting disc dial 695 is lowered downward. In this way, the reference point (zero point) can be recorded. In particle size setting of ground beans, the fixed blade 57*b* is raised and lowered with reference to the reference point (zero point) recorded in this way, and the interval between the fixed blade 57*b* and the rotary blade 58*b* is adjusted.

The transmission gear 6962 is provided at a terminal end of the rotation shaft 6961 of the fine adjustment knob dial 696. The transmission gear 6962 meshes with a second gear 503*c*2 (see (b) of FIG. 36) of the two-stage gear and also meshes with the worm gear 692. A first gear 503*c*1 of the two-stage gear is meshed with the pinion gear 503*b*. Therefore, when the second motor 503*a* is rotationally driven, the fine adjustment knob dial 696 and the worm wheel 691 also rotates. In a state in which the second motor 503*a* is stopped, the fine adjustment knob dial 696 can be rotated, and the worm wheel 691 is also rotated by rotating the fine adjustment knob dial 696. When the fine adjustment knob dial 696 is rotated once, the gear portion 691*g* of the worm wheel 691 is rotated by one tooth. Therefore, when the fine adjustment knob dial 696 is rotated, the adjustment of less than one tooth of the worm gear 692 can be performed as in the case where the second motor 503*a* is rotationally driven to rotate the worm wheel 691. In manual setting of the particle size of ground beans, the manual setting disc dial 695 is used to roughly set the particle size, and the fine adjustment knob dial 696 is used to perform fine adjustment of the particle size setting. In this way, it is possible to set the particle size quickly and finely.

The manual setting by the manual setting disc dial 695 and the fine adjustment knob dial 696 is also applicable to the second grinder 5B of the beverage production device 1 shown in FIG. 1.

Next, a contrivance to control an input amount of ground beans to be put into the second grinder 5B will be described.

As described above, roasted coffee beans are crushed to a predetermined size (for example, about ¼) by the first grinder 5A. Hereinafter, beans crushed to a predetermined size by the first grinder 5A are referred to as cracked beans to be distinguished from ground beans (in particular, coarsely ground beans). The second grinder 5B grinds the cracked beans crushed by the first grinder 5A into ground beans having a desired particle size. Here, when a large amount of cracked beans exceeding an appropriate allowable amount of a grinding process by the second grinder 5B is fed from the first grinder 5A, the cracked beans excessively enter between the fixed blade 57*b* and the rotary blade 58*b*, and the ground beans stay between the fixed blade 57*b* and the rotary blade 58*b*. The staying ground beans receive frictional heat from the rotating rotary blade 58*b* and heat up. In particular, in a finely ground state, the ground beans are easily affected by heat and a surface thereof easily produce more oil than necessary. A coffee beverage extracted from the ground beans ground in this way tends to be too rich in taste.

In a case where the first grinder 5A is driven at an upper limit of the processing capacity, when the number of rotations of a first motor for the first grinder 5A is reduced, an amount of the cracked beans fed from the first grinder 5A per unit time is reduced.

FIG. 37 is a flowchart showing a control process of the processing unit 11*a* in the grinding process.

The control process shown in FIG. 37 is started in response to pressing of the start button GM15 shown in FIG. 24. When the weighing unit 404 shown in FIG. 21 is attached to the option attachment portion GM11, the control process may be started in response to the start of the rotation of the screw blade ESC2 shown in (b) of FIG. 21.

First, the processing unit 11*a* starts the rotation of the first motor for the first grinder 5A and the second motor 503*a* for the second grinder 5B (step S21). In step S21, both the first motor and the second motor 503*a* start rotating at preset rotation speeds. As a result, the rotary blade 58*a* starts rotating in the first grinder 5A, and the rotary blade 58*b* starts rotating in the second grinder 5B. The rotation of the first motor and the rotation of the second motor 503*a* may not be started at the same time, and the rotation of the second motor 503*a* may be started after the rotation of the first motor is started. For example, when the grinding process is started by the first grinder 5A, the rotational torque or the current value of the first motor increases. The processing unit 11*a* may start the rotation of the second motor 503*a* when detecting an increase in the rotational torque or an increase in the current value of the first motor. When the first motor for the first grinder 5A starts to rotate, the cracked beans are fed to the second grinder 5B.

In the subsequent step S22, it is determined whether to continue the rotation of the first motor. For example, if a predetermined time elapses after the electric screw conveyor ESC finishes conveying, if a predetermined time elapses after the rotational torque of the first motor decreases, or if a predetermined time elapses after the current value of the first motor decreases, the determination result is No, and the rotation of the first motor is stopped (step S27). On the other hand, if the determination result is Yes, the process proceeds to step S23.

A sensor for detecting passage of the cracked beans is provided in the vicinity of an inlet of the second grinder 5B, and the processing unit 11*a* shown in FIG. 19 monitors an input amount of the cracked beans to be put into the second grinder 5B per unit time. In step S23, it is determined whether the input amount per unit time exceeds a reference value. The reference value is a variable that varies depending on the type of coffee beans, the particle size of around beans, the rotation speed set in the second motor 503*a*, and the like, and a plurality of types of reference values are stored in the storage unit 11b shown in FIG. 19. For example, the harder the coffee beans, the smaller the reference value. The recipe specifies the type of coffee beans, the particle size of ground beans, and the like, and the processing unit 11a selects a reference value according to the recipe and executes the determination process of step S23, or selects a reference value according to various set values and executes the determination process of step S23. When the input amount per unit time exceeds the reference value, the rotation speed of the first motor is reduced (step S24), and the process returns to step S22. A rate of reducing the rotation speed of the first motor may be a predetermined rate, or may be a rate corresponding to a degree at which the input amount exceeds the reference value. When the rotation speed of the first motor is decreased, the amount of cracked beans fed out from the first grinder 5A per unit time is reduced. As a result, the input amount can also be reduced, the ground beans can be prevented from staying between the fixed blade 57b and the rotary blade 58b, and the ground beans are hardly affected by heat. A coffee beverage extracted from the ground beans around in this way tends to have a refreshing taste without being adversely affected by oil content.

If it is determined in step 323 that the input amount is equal to or less than the reference value, it is determined whether the rotation speed of the first motor is in a state of being reduced. If the rotation speed is not in a state of being reduced, the process returns to step S22, and if the rotation speed is in a state of being reduced, the rotation speed is restored to the set rotation speed (step 326), and then the process returns to step S22.

In step S28 following step S27 of stopping the rotation of the first motor, it is determined whether to stop the rotation of the second motor 503a this time. For example, if a predetermined time elapses after the rotational torque of the second motor 503a decreases or if a predetermined time elapses after the current value of the second motor 503a decreases, the determination result is Yes, the rotation of the second motor 503a is stopped (step S29), and the control process ends.

In the control process described above, although the input amount of ground beans to be put into the second grinder 5B is controlled by controlling the rotation speed of the first motor for the first grinder 5A, the input amount of ground beans to be put into the second grinder 5B can also be controlled by controlling a rotation speed of the motor ESC3 that rotates the screw blade ESC2 of the weighing unit 404 shown in FIG. 21. By controlling both the rotation speed of the first motor and the rotation speed of the motor ESC3, it is also possible to control the input amount of ground beans to be put into the second grinder 5B.

The control process shown in FIG. 37 can also be executed by the processing unit 11a shown in FIG. 10, and by controlling the rotation speed of the motor 52a for the first grinder 5A shown in FIG. 12 or by controlling a conveying speed of the conveyor 41 shown in FIG. 2, the input amount of ground beans to be put into the second grinder 5B shown in FIG. 2 can be controlled.

A rotation speed of the rotary blade 58a of the first grinder 5A may change depending on the hardness or the like of roasted coffee beans. Originally, although the rotation speed of the first motor of the first grinder 5A is set so as not to exceed the allowable amount of the grinding process by the second grinder 5B, the number of rotations per unit time (rotation speed) of the rotary blade 58a or the first motor of the first grinder 5A may be monitored, and when the number of rotations per unit time exceeds the reference value, the rotation speed of the first motor may be reduced.

The control process in the grinding process described above with reference to FIG. 37 is also applicable to the control process in the grinding process of the pulverizing device of the beverage production device 1 shown in FIG. 1. An instruction to reduce or restore the rotation speed of the first motor may be output from an external terminal such as the mobile terminal 17 shown in FIG. 19.

According to the above description, "a coffee machine [for example, the coffee bean grinding machine GM shown in FIG. 18 or the beverage production device 1 shown in FIG. 1] including: a second grinder configured to grind coffee beans [for example, the second grinder 5B], in which an input amount of coffee beans to be put into the second grinder is controlled [for example, step S24 shown in FIG. 37]" has been described.

According to this coffee machine, the input amount is controlled in consideration of a state for grinding coffee beans in the grinder.

The coffee beans referred to herein may be cracked beans, ground beans, or beans that are not cracked or ground.

The input amount is controlled to prevent ground beans from staying in the second grinder for an unnecessarily long time. In the second grinder, when the input amount of coffee beans is larger than an output amount of ground beans, the ground beans stay in the second grinder for a longer time, and the ground beans are easily adversely affected by heat. Therefore, in the coffee machine, the input amount is controlled to prevent this from happening. Therefore, the machine is controlled in consideration of a state for grinding coffee beans in the grinder.

"The coffee machine in which the input amount is con trolled according to a type of coffee beans" has also been described.

The type of coffee beans may be a variety of coffee beans, a degree of roasting of coffee beans, or a combination of the type and the degree of roasting:

"The coffee machine further including: a first grinder [for example, the first grinder 5A] provided upstream of the second grinder and configured to grind coffee beans, in which the input amount of coffee beans to be put into the second grinder is controlled by controlling a speed [for example, the rotation speed of the first motor] at which the first grinder grinds coffee beans" has also been described.

"The coffee machine further including: a supply device [for example, the weighing unit 404 shown in FIG. 21 and the conveyor 41 shown in FIG. 2] provided upstream of the second grinder and configured to supply coffee beans downstream, in which the input amount of coffee beans to be put into the second grinder is controlled by controlling a supply speed of coffee beans by the supply device" has also been described.

"The coffee machine further including: a first grinder [for example, the first grinder 5A] disposed upstream of the second grinder and configured to grind coffee beans; and a supply device [for example, the weighing unit 404 shown in FIG. 21 and the conveyor 41 shown in FIG. 2] disposed upstream of the first grinder and configured to supply coffee beans downstream, in which at least one of the first grinder or the supply device is controlled to reduce the input amount of coffee beans to be put into the second grinder" has also been described.

For example, both the first grinder and the supply device may be controlled to reduce the input amount of coffee beans to be put into the second grinder.

Further, "a coffee machine system (for example, FIG. 10 or FIG. 19) including an external device (for example, the server 16 or the mobile terminal 17) capable of communicating with the coffee machine" has also been described.

In addition, "a grinding method of coffee beans including: a step of starting to put coffee beans into a second grinder (step 321 shown in FIG. 37); and a step of controlling an input amount of coffee beans to be prat into the second grinder (step 324 shown in FIG. 37)" has also been described.

Ground beans ground by the second grinder 5B are discharged from a chute GM31 shown in FIG. 18.

The chute GM31 shown in FIG. 18 guides the around beans fed out in a substantially horizontal direction downward. The coffee bean grinding machine GM shown in FIG. 18 is provided with a hammer member GM32 that strikes the chute GM31. The hammer member GM32 pivots about a pivot shaft GM321 extending in the upper-lower direction. The ground beans fed out in a substantially horizontal direction may collide with and adhere to an inner wall of the chute GM31. A user pivots the hammer member GM32 to strike the chute GM31, and applies an impact to the adhered ground beans to cause the ground beans to fall.

Next, an example in which a grinding process is executed according to order information from the outside of the coffee bean grinding machine GM (for example, the server 16 or the mobile terminal 17 shown in FIG. 19) will be described.

FIG. 38 is a flowchart showing a control process executed by the processing unit 11a when a grinding process is executed according to order information.

In step S31, it is determined whether order information is received. If the order information is not received, step S31 is repeatedly executed. If the order information is received, the process proceeds to step S32. Specific contents of the order information will be described later.

In step S32, the received order information is displayed on the information display device 12 shown in FIG. 19, and the process proceeds to step S33.

In step S33, it is determined whether a grinding start operation of coffee beans is received. The grinding start operation here is an operation of the information display device 12, which will be described in detail later. If the grinding start operation is not received, the process proceeds to step 334, and if the grinding start operation is received, the process proceeds to step S36.

In step S34, it is determined whether an order information change operation is received. The order information change operation here is also an operation of the information display device 12, which will be described in detail later. If the order information change operation is received, the process proceeds to step S35, and if the order information change operation is not received, the process returns to step S33.

In step the received order information is updated according to the order information change operation, and the process returns to step S33.

During the period from the reception of the order information to the reception of the grinding start operation, the received order information can be changed in steps S34 and S35. The grinding start operation and the order information change operation are not limited to the operation of the information display device 12, an operation from the mobile terminal 17 may be received, and as long as the information of this operation is transmitted to the coffee bean grinding machine GM, a transmission path thereof may be any path.

In step S36, a grinding process of coffee beans is executed. First, an amount of roasted coffee beans specified by the order information is supplied from the reservoir device 4 to the first grinder 5B. In the first grinder 5B, the ground cracked beans are supplied to the second grinder 5B after wastes are separated by the separation device 6. In the second grinder 5B, coffee beans are around while the interval between the fixed blade 57b and the rotary blade 58b is changed at a predetermined interval (for example, every 50 μm) according to the order information, and the ground coffee beans are discharged from the chute DM31 shown in FIG. 18. When the grinding process ends, a process of producing ground coffee beans ends.

In the above example, although a case where the grinding process is executed according to the order information from the outside of the ground coffee bean machine GM has been described, the order information may be directly input to the ground coffee bean machine GM using the information display device 12. In the case of this configuration, step S32, step S34, and step S35 shown in FIG. 38 may be omitted.

In the above example, although the order information can be changed during the period from the reception of the order information to the reception of the grinding start operation, the grinding process may be started as soon as the order information is received without providing an opportunity for such changes.

Here, a recipe will be described in detail. The recipe includes a grindinq recipe including only grind information for grinding coffee beans, and a beverage production recipe including information on various production conditions for preparing a coffee beverage, such as extraction conditions for a coffee beverage, in addition to the grind information. In the coffee bean grinding machine GM, a grinding process can be executed as long as there is a grinding recipe, but if a beverage production recipe is displayed on the information display device 12, grinding conditions may be corrected in view of conditions of a coffee beverage extraction process executed after the grinding process, and a better quality coffee beverage may be obtained.

The storage unit 11b shown in FIG. 19 may keep storing a recipe, or may acquire a recipe from the server 16 before starting the grinding process, store the recipe only while the grinding process is being executed, and delete the recipe from the storage unit 11b when the grinding process ends. Alternatively, only a part of the information of a recipe (for example, beans information or recipe creator information) may be stored in the storage unit 11b, the remaining information of the recipe (for example, information of various conditions for grinding coffee beans) may be acquired from the server 16 before the grinding process is started, and the remaining information may be deleted from the storage unit 11b when the grinding process ends. Recipes stored in the storage unit 11b are encrypted.

The recipes are managed as a database in the server 16.

(A) to (C) of FIG. 39 are diagrams showing an example of data stored in the server 16. (A) of FIG. 39 shows data 1500 stored in a beverage information database. The data 1500 includes a recipe ID 1501, creator information 1502 indicating a creator of a recipe, number-of-times-of-production information 1503 indicating the number of times of production in which beverage information has been selected by a user in the past, raw material information, a production method, and types 1512 and 1513. The raw material information includes beans information 1504 indicating a type of beans production area information 1505 indicating a production area of beans, and information of a degree of roasting 1506 indicating a degree of roasting of beans. The production method includes the amount of beans used in one extraction 1507, a grinding particle size of beans 1508, a steaming hot water amount 1509, a steaming time 1510, and an extracted hot water amount 1511. Among these pieces of information, the most necessary information in a grinding process is the grinding particle size of beans 1508, but other pieces of information may also be necessary in considering the grinding particle size of beans 1508. A type 1 (1512) is type information indicating whether a beverage is a hot beverage or an iced beverage, and a type 2 (1513) is type information indicating the flavor of the beverage. In the present embodiment, although the number-of-times-of-production information 1503 is described as the number of times a beverage corresponding to the number-of-times-of-production information 1503 has been produced by a plurality of beverage production devices, the number-of-times-of-production information 1503 may be stored for each of the beverage production devices.

(B) of FIG. 39 shows exemplary data 1520 of a user information database. A user may be a store, or a clerk or a customer of the store. The data 1520 includes ID information 1521 indicating a user identifier, name information 1522 indicating a name of a user, age information 1523 indicating the age of a user, and gender information 1524 indicating the gender of a user. For example, the data 1520 may further include information corresponding to an address of a user, nickname information of a user, and photograph data of a user.

(C) of FIG. 39 shows exemplary data 1530 of a grinding history database. The data 1530 includes user information 1531 on a user who instructed grinding, date and time information 1532 on a grinding date and time, a recipe ID 1533 used in a grinding process, a machine ID 1534 corresponding to the coffee bean grinding machine GM that performed a grinding process, and a store ID 1535 corresponding to a store where the coffee bean grinding machine GM is installed. For example, the data 1530 may further include price information corresponding to the price of ground beans of around coffee. In addition, a coffee beverage production history database may also be stored, similar to the grinding history database.

The data 1500, 1510, and 1530 described above may also be stored in the storage unit 11b of the control device 11 in the coffee bean grinding machine GM.

Next, while referring to the flow of the control process described with reference to FIG. 38, an example of an operation for the order information will be described with reference to FIG. 40 to FIG. 45. FIG. 40 to FIG. 42 are diagrams showing a state when the order information is input. FIG. 43 is a diagram showing a state when the order information is changed. FIG. 44 is a diagram showing an example of control parameters of the second grinder 5B for an order. FIG. 45 is a diagram showing an example of display during execution of a grinding process.

In this example, it is assumed that an application for transmitting order information on ground beans of coffee is installed in the mobile terminal 17 such as a smartphone. FIG. 40 shows an example of an order information input screen using this application. On this input screen, there are displayed an order title input field 170, a desired type of coffee beans 1711, the amount of coffee beans 1712, an input table 172 for specifying a ratio with respect to a particle size at the time of grinding coffee beans a fine grinding to coarse grinding button 173a for indicating a grinding way from a fine grinding state to a coarse grinding state, a coarse grinding to fine grinding button 173b for indicating a grinding way from a coarse grinding state to a fine grinding state, a graph area 174 for displaying contents input to the input table 172 in a graph, a send button 175 for sending order information, and a recipe registration button 176 for registering order Information as a grinding recipe. As for the desired type of coffee beans, selectable types of coffee beans are transmitted from the coffee bean grinding machine GM with which the mobile terminal 17 communicates, and all the transmitted selectable types of coffee beans are displayed by tapping a pull-down button at a right end. For example, all types of beans stored in canisters currently accommodated in the canister accommodation unit 401 shown in FIG. 18 are displayed. Alternatively, all types of beans prepared in a store where the coffee bean grinding machine GM is installed may be displayed. The types of coffee beans are distinguished from each other not only by a variety of coffee beans but also by a name of a cultivated farm. The types of coffee beans are also distinguished by the degree of roasting (extremely light roast, light roast, medium light roast, medium roast, medium dark roast, dark roast, extremely dark roast, and totally dark roast). The amount of coffee beans 1712 can also be specified in increments of 5 g using a pull-down menu. Direct input may be possible. The grinding way coffee beans will be described in detail later.

FIG. 41 is a diagram showing an example of an input screen in a state in which order information is input. On this input screen, a character "Geisha For French press" is input in the title input field 170. In the type of coffee beans 1711, coffee beans cultivated in a Copey farm and having a variety name of Geisha are selected and are roasted in an extremely dark roast manner, and the amount of the coffee beans is selected to be 60 p. In the input table 172, "40" indicating a ratio of a particle size of 200 μm and "60" indicating a ratio of a particle size of 800 μm are input, and it is shown that a total ratio is "100"%. It is shown that comments corresponding to the particle size of 200 μm, the particle size of 800 μm, and the total are input. In addition, the fine grinding to coarse grinding button 173a is selected. In the graph area 174, the content input to the input table 172 is displayed as a graph. Two peaks are shown in this graph, where a left peak indicates that the ratio of the particle size of 200 μm is 40%, and a right peak indicates that the ratio of the particle size of 800 μm is 60%.

In the graph area 174, the content input to the input table 172 can be indirectly changed by dragging a part of the graph. FIG. 42 shows an example in which the right peak of the two peaks in the graph area 174 shown in FIG. 41 is moved to the left. This operation indicates that "60" indicating the ratio of the particle size of 800 μm input to the input table 172 is changed to "0" and "0" indicating a ratio of a particle size of 600 μm is changed to "60". Such an input method by dragging the graph is not limited to changing the particle size, and may also change the ratio. For example, the ratio of the corresponding particle size may be increased or decreased by vertically dragging a part of the graph.

In the example shown in FIG. 42, after a value is input to the input table 172, the value input to the input table 172 is changed by dragging a part of the graph. Without being limited to this configuration, a graph (a flat straight line, shown by a thick line in FIG. 39) of an initial state may be displayed in the graph area 174 from a state (initial state) before a value is input to the input table 172, and the value in the input table 172 may be set by dragging the graph.

By the input method using the graph as described above, a user can set the ratio of the particle size more intuitively.

In addition, when the magnitude of one peak is increased, the magnitude of another peak may be relatively decreased, for example, by increasing or decreasing the magnitude of one peak, the magnitude of another peak may be relatively increased or decreased. If a size of the graph area 174 is limited, the graph area 174 can be more effectively used.

After the title, the type and amount of coffee beans, the ratio of the particle size, and the grinding way (fine to coarse, coarse to fine) are set, by tapping the send button 175, order information is transmitted to the control device 11 of the coffee bean grinding machine GM via the communication network 15 shown in FIG. 19. After being transmitted to the server 16 once, the order information may, be transmitted to the coffee bean grinding machine GM via the server 16 and the communication network 15.

Here, although the order information such as the title, the type and amount of coffee beans, the ratio of the particle size, and the grinding way (fine to coarse, coarse to fine) is set, it is also possible to store these pieces of order information and use the order information as a grinding recipe. In this case, the order information transmitted to the server 16 via the communication network 15 by tapping the recipe registration button 176. The server 16 also manages grinding recipes in the form of a database, and adds a grinding recipe ID to the transmitted order information and stores the order information. At the time of transmission to the server 16, restrictions may be set on recipes. For example, the mobile terminal 17 may display a screen for selecting various restrictions such as production (grind) prohibition, display prohibition, download prohibition, duplication prohibition, and alteration prohibition. On the above screen, a method of releasing these restrictions (charging, elapse of a period of time, use of a given number of times or more by charging, and the like) may also be set. In addition, a comment input by a creator is also stored as a part of the grinding recipe, and the comment can be displayed at the time of displaying the recipe.

Further, a chaff removal strength (a chaff removal rate) (%) may be set as the order information and the grinding recipe.

When the order information is received, the content of the received order information is displayed on the information display device 12 (Yes in step S31 and step S32 of FIG. 38). (A) of FIG. 43 shows an example in which the control device 11 receives the order information transmitted with the content shown in FIG. 42, and the content is displayed on the information display device 12. Specifically, the title input in the title input field 170 of FIG. 42 and the content of the input table 172 excluding a row of a particle size in which the ratio is 0 and a comment field is blank (rows of particle sizes of 400 μm and 1000 μm in FIG. 42) are displayed in a reception table 121. Further, in a grinding way indication field 122, it is shown that a grinding way from a fine grinding state to a coarse grinding state is indicated by selecting the fine grinding to coarse grinding button 173a in FIG. 42. The received type of beans is shown in a bean type field 1231, and the received amount of beans is shown in a bean amount field 123. The amount of beans may be set separately at a store.

When a grinding start button 124 is tapped in this state, a grinding process of coffee beans is executed (details will be described later), and in a state before the grinding start button 124 is tapped, the order information can be changed (No in step S33, Yes in step S34, and step S35 in FIG. 38). When the order information is changed, the grinding process of coffee beans is executed according to this information. Depending on a temperature and humidity at the time of grinding, the particle size of ground coffee beans may be small (or large), and the order information can be changed and adjusted at a store.

For example, although the order information of (A) of FIG. 43 is received, since the humidity is low, it is assumed that the particle size of ground coffee beans is fine. At this time, for example, as shown in (B) of FIG. 43, in the reception table 121, "40" indicating the ratio of the particle size of 200 μm is changed to "45", and "60" indicating the ratio of the particle size of 600 μm is changed to "55", so that the particle size of ground coffee beans can be adjusted to a preferable large particle size. In the example of (B) of FIG. 43, a description of "low humidity to ratio increase" is added to the comment field, and with such a comment, for example, information such as a correction reason can be transmitted. As described above, the order information (here, the particle size of ground beans) can be adjusted according to an installation environment of the coffee bean grinding machine GM.

A recipe registration button 125 is also provided on the display screen of the information display device 12, and the order information can also be registered in the server 16 from the information display device 12 (coffee bean grinding machine GM) as a grinding recipe. IL is possible to store, in the server 16 with a comment, a grinding recipe including a parameter corrected according to the installation environment of the coffee bean grinding machine GM. The grinding recipe may include environmental information (temperature, humidity, atmospheric pressure, and the like) at the time of creating the order information (recipe). A temperature and humidity sensor and an atmospheric pressure sensor may be provided in the coffee bean grinding machine GM, and when the recipe registration button 125 is tapped, the environmental information acquired by these sensors may be automatically added to the grinding recipe. Further, when the coffee bean grinding machine GM transmits the order information to the server 16, a selection screen may also be displayed on the display screen of the information display device 12 so that recipe restrictions can be set. On the selection screen, a method of releasing these restrictions may also be set.

In addition, the order information may be encrypted and stored in the storage unit 11b of the control device 11 in the coffee bean grinding machine GM as a grinding recipe. The mobile terminal 17 may also be able to encrypt and store the order information in the storage unit 11b as a grinding recipe.

The grinding recipe registered in this way can also be used in a coffee beverage production device equipped with the coffee bean grinding machine GM and a coffee extraction device.

Next, an operation after the grinding start button 124 is tapped will be described by taking a case where the grinding start button 124 is tapped in a state shown in (B) of FIG. 43 as an example. When the grinding start button 124 is tapped, a grinding process of coffee beans is executed according to the order information (Yes in step 333 and step 336 in FIG. 38). If coffee beans other than the coffee beans stored in the reservoir device 4 are specified, the grinding process is started after the specified coffee beans are set in the reservoir device 4.

Alternatively, the grinding process may be started after the calibration executed in the initial operation described with reference to FIG. 33 is performed. The execution or non-execution of the calibration is transmitted from the mobile terminal 17 together with the order information. That is, it is possible to specify that the mobile terminal 17 to execute the calibration before starting the grinding process based on the order information.

(A) of FIG. 44 shows the particle sizes and the ratios specified in (B) of FIG. 43. In this grinding process, the processing unit 11a shown in FIG. 19 performs control of grinding coffee beans while changing the interval between the blades (the interval between the fixed blade 57b and the rotary blade 58*b*) of the second grinder 5B at a predetermined interval (for example, every 50 μm) such that a particle size distribution of ground coffee beans to be produced spreads to a range (in the present embodiment, a range of ±100 μm to 150 μm) with respect to the particle size of the around coffee beans specified by the order information. For example, (B) of FIG. 44 shows that an operation time for operating the second grinder 5B while changing the interval between the blades of the second grinder 5B within a range of 50 μm to 350 μm is set with respect to the specification of the particle size of 200 μm specified in (A) of FIG. 44. (B) of FIG. 44 shows that an operation time for operating the second grinder 5B while changing the interval between the blades of the second grinder 5B within a range of 450 μm to 700 μm is set with respect to the specification of the particle size of 600 μm specified in (A) of FIG. 44. (C) of FIG. 44 is a graph showing a length of the operation time for each interval between the blades of the second grinder 5B shown in (B) of FIG. 44. Since the interval between the blades of the second grinder 5B and the operation time thereof set here are calculated by the processing unit 11*a* based on the order information and correspond to the particle size distribution of the ground coffee beans to be produced, it can be said that the particle size distribution is set. When the calibration is executed in the initial operation before the start of the grinding process, the processing unit 11*a* performs control to change the interval between the blades of the second grinder 5B while correcting the rotation amount of the motor 503*a* using the calibration value obtained in step S55 shown in FIG. 33.

In the above example, it is assumed that it takes 30 seconds in total to produce 60 g of ground coffee beans specified by the order information. Then, 45% (13.5 seconds) of the operation time is assigned to an operation for the particle size of 200 μm. In the above example, since the second grinder 5B is operated while the interval between the blades of the second grinder 5B is changed in the range of 50 μm to 350 μm with respect to the specification of the particle size of 200 μm, the operation time of 13.5 seconds is assigned to the operation of the grinder in this range. In (B) of FIG. 44, the total operation time of the grinder in the interval range of 50 μm to 350 μm is 13.5 seconds. In addition, 55% (16.5 seconds) of the operation time of 30 seconds in total is assigned to an operation for the particle size of 600 μm. In the above example, since the second grinder 5B is operated while the interval between the blades of the second grinder 5B is changed in the range of 450 μm to 700 μm with respect to the specification of the particle size of 600 μm, the operation time of 16.5 seconds is assigned to the operation of the grinder in this range. In (B) of FIG. 44, the total operation time of the grinder in the interval range of 450 μm to 700 μm is 16.5 seconds. As described above, the operation time shown in (B) of FIG. 44 is derived from the time required for the production of around coffee beans. In (B) of FIG. 44, an example has been described in which the ranges of the interval between the blades of the second grinder 5B with respect to the specification of the two types of particle size do not overlap, and when these ranges overlap each other, the operation time for the overlapping part is added.

As described in the example of (B) of FIG. 44, by producing ground coffee beans while changing the interval between the blades of the second grinder 5B, the particle size of the ground coffee beans can be dispersed. Coffee extracted from the ground coffee beans having a dispersed particle size can have various tastes as compared with coffee extracted from ground coffee beans having no dispersed particle size. For example, an operation time as shown in (C) of FIG. 44 may be set for a person who does not like such tastes. In (C) of FIG. 44, the operation time of the second grinder 5B is set only for an operation at an interval of the blades having the same value as the particle size specified by the order information, and corresponds to a particle size distribution in which the particle size dispersion is prevented. These configurations are merely examples, and the range of the particle size distribution may be specified when the particle size is specified.

In the example of (B) of FIG. 44, although the operation time at the interval of the blades having the same value as the particle size specified by the order information is the longest, and the operation time is shorter as a difference between the specified particle size and the interval of the blades of the second grinder 5B is larger, for example, the operation times may be set to the same value for the operation of the second grinder 5B at intervals of the blades of ±50 μm with respect to the specified particle size, or a plurality of patterns of the particle size distribution may be provided so as to be selectable therefrom.

Information of the operation time as shown in (B) of FIG. 44 may be input when the order information is created, and when the information of the operation time is included in the order information, the grinding process may be executed according to the information of the operation time.

Further, the information of the operation time shown in (B) or (C) of FIG. 44 (a change pattern of the interval between the blades of the second grinder 5B) may also be stored in the server 16 or the storage unit 11*b* as a part of a grinding recipe. That is, various types of information may be stored in the server 16 or the storage unit 11*b* in association with the particle size of ground beans. In addition, these pieces of information and grinding recipes stored in the storage unit 11*b* may be able to be output to an external terminal such as the server 16 or the mobile terminal 17 via the communication network 15.

Although two types of particle size values are set in (A) of FIG. 44, the number of types of the particle size for which a value is specified may be one instead of a plurality of types. For example, when one type of a particle size value is set, the operation time is set based on this value.

In addition, the input of the order information from an external terminal (mobile terminal 17) and the calculation of the control parameters of the second grinder 5B based on the order information, which have been described with reference to FIGS. 40 to 45, are also applicable to the beverage production device 1 shown in FIG. 1.

According to the above description, "a coffee bean grinding machine [for example, the beverage production device 1 shown in FIG. 1 or the coffee bean grinding machine GM shown in FIG. 18] including: a grinder [for example, the second grinder 5B] configured to grind coffee beans under set conditions [for example, the interval between the blades and the operation time according to the particle size specified by the order information, which are shown in (B) or (C) of FIG. 44]; a reception unit [for example, the I/F unit 11*c* shown in FIG. 10 or FIG. 19] configured to receive a specification [for example, the order information from the mobile terminal 17 such as a smartphone] from a user; and a setting unit [for example, the processing unit 11*a* shown in FIG. 10 or FIG. 19] configured to set the conditions, in which the setting unit is capable of setting the conditions based on the specification received by the reception unit [for example, the processing unit 11*a* calculates control data shown in (B) or (C) of FIG. 44 based on the order information and controls the second grinder 5B based on the control data], and the reception unit is capable of receiving a signal including the specification from the outside [for example, FIG. 10 or FIG. 19]" has been described.

According to this coffee bean grinding machine, a specification from a user can be easily performed.

The specification is a specification of a particle size of ground beans or a specification of executing calibration in an initial operation of the grinder. The specification may be various specifications (for example, a specification of a type or the amount of coffee beans to be used, or a specification of a grinding way) in a grinding recipe.

"The coffee bean grinding machine in which the setting unit is capable of acquiring a calibration value [for example, a calibration value calculated in step S55 shown in FIG. 33] at the time of setting the conditions based on the specification [for example, a specification for performing calibration regarding the interval between the fixed blade 57b and the rotary blade 58b in the initial operation of the second grinder 5B] received by the reception unit" has also been described.

"The coffee bean grinding machine further including a storage device [for example, the storage unit 11b shown in FIG. 10 or FIG. 19] configured to store a specification [for example, a grinding recipe or a beverage production recipe] received by the reception unit" has also been described.

"The coffee bean grinding machine in which the reception unit receives at least a specification of a particle size of ground beans [for example, a specification of the particle size in the input table 172 shown in FIG. 41] as the specification, and the storage device is capable of storing various types of information [for example, the control data shown in (B) or (C) of FIG. 44] in association with the particle size of the ground beans" has also been described.

The particle size may be a particle size represented by a peak in a particle size distribution. The various types of information may be conditions set in the grinder in order to grind coffee beans to the particle size by the grinder.

"The coffee bean grinding machine in which information stored in the storage device is allowed be output to the outside [for example, the server 16 or the mobile terminal 17]" has also been described.

Further, "a coffee bean grinding system (for example, FIG. 10 or FIG. 19) including an external device (for example, the server 16 or the mobile terminal 17) capable of communicating with the coffee bean grinding machine, in which the external device is operated by a user to perform a specification operation" has also been described.

"A grinding method of coffee beans in a grinder for grinding coffee beans under set conditions, the method including: a receiving step [for example, a process as a premise of step S31 shown in FIG. 38] of receiving a specification [for example, order information from the mobile terminal 17 such as a smartphone] from a user; and a condition setting step of setting the conditions according to the specification received in the receiving step [for example, a process performed between step S32 and step S33 or a process performed between step S34 and step S33 shown in FIG. 38]" has also been described.

According to the above description, "a coffee bean grinding machine [for example, the beverage production device 1 shown in FIG. 1 or the coffee bean grinding machine GM shown in FIG. 18] including: a grinder [for example, the second grinder 5B] configured to grind coffee beans under set conditions [for example, the interval between the blades and the operation time according to the particle size specified by the order information, which are shown in (B) or (C) of FIG. 44]; a setting unit [for example, the processing unit. 11a shown in FIG. 10 or FIG. 19] capable of setting the conditions; and an operation unit [for example, the manual setting disc dial 695, the fine adjustment knob dial 696] capable of being operated by a user, in which the setting unit is capable of setting the condition based on input information [for example, the processing unit. 11a calculates control data shown in (B) or (C) of FIG. 44 based on order information, and controls the second grinder 5B based on the control data], and among the conditions, the operation unit is capable of changing, according to an operation, a condition [for example, the interval between the fixed blade 57b and the rotary blade 58b] related to a particle size of ground beans" has also been described.

According to this coffee bean grinding machine, the conditions are set based on the input information, and conditions related to the particle size of around beans can be manually adjusted.

The particle size may be a particle size represented by a peak in a particle size distribution. The input information may be information on the particle size of around beans or information for instructing execution of calibration in an initial operation of the grinder. The input information may be various types of information (for example, information on a type or the amount of coffee beans to be used, or information of a grinding way) in a grinding recipe.

"The coffee bean grinding machine in which the setting unit is capable of acquiring a calibration value [for example, a calibration value calculated in step S55 shown in FIG. 33] for setting the conditions" has also been described.

"The coffee bean grinding machine further including a storage device [for example, the storage unit 11b shown in FIG. 10 or FIG. 19] configured to store the input information [for example, a grinding recipe or a beverage production recipe]" has also been described.

"The coffee bean grinding machine in which the setting unit is capable of setting a condition related to a particle size of ground beans [for example, the interval between the blades and the operation time according to the particle size specified by the order information shown in (B) or (C) of FIG. 44] based on the input information [for example, a specification of the particle size in the input table 172 shown in FIG. 41], and the storage device is capable of storing various types of information [for example, the control data shown in (B) or (C) of FIG. 44] in association with the particle size of the around beans" has also been described.

The various types of information may be conditions set in the grinder in order to grind coffee beans to the particle size by the grinder.

"The coffee bean grinding machine in which information stored in the storage device is allowed to be output to the outside [for example, the server 16 or the mobile terminal 17]" has also been described.

Further, "a coffee bean grinding system (for example, FIG. 10 or FIG. 19) including an external device (for example, the server 16 or the mobile terminal 17) capable of communicating with the coffee bean grinding machine, in which the external device is operated by a user to perform an operation of specifying the conditions" has also been described.

"A grinding method of coffee beans in a grinder for grinding coffee beans under set conditions, the method including: an automatic setting step of automatically setting the conditions based on input information; and a manual change step of changing, according to an operation, a condition related to a particle size of ground beans among the conditions" has also been described.

Either the automatic setting step or the manual change step may be executed first, or only one of the automatic setting step and the manual change step may be executed.

The second grinder 5B in the present embodiment includes two types of grinding ways, that is, a grinding way from a fine grinding state to a coarse grinding state and a grinding way from a coarse grinding state to a fine grinding state, and any one of the ways is specified by using the fine grinding to coarse grinding button 173a and the coarse grinding to fine grinding button 173b described with reference to FIG. 40. When the grinding way from a fine grinding state to a coarse grinding state is specified, while the interval between the blades of the second grinder 5B is increased from 50 μm to 1000 μm, the second grinder 5B is operated for an operation time set for each interval. On the other hand, when the grinding way from a coarse grinding state to a fine grinding state is specified, while the interval between the blades of the second grinder 5B is reduced from 1000 μm to 50 μm, the second grinder. 5B is operated for an operation time set for each interval. Depending on the grinding way, a slight difference may occur in a particle size distribution of ground coffee beans to be produced, which may cause a difference in taste. Therefore, the present embodiment adopts a configuration in which these grinding ways can be set.

In (B) of FIG. 43, since the grinding way from a fine grinding state to a coarse grinding state is specified, while the interval between the blades of the second grinder 5B is increased from 50 μm to 1000 μm, the second grinder 5B is operated for an operation time set for each interval. At this time, a graph shown in (D) of FIG. 44 is displayed on the information display device 12, and a color of in the graph region changes according to the progress of this operation. (A) of FIG. 45 shows a state when 12.4 seconds have elapsed from the start of grinding. At this time, the interval between the blades of the second grinder 5B is set to 250 μm, and in (A) of FIG. 45, it is indicated by hatching that a color of a left side region of the boundary of 250 μm has changed. This hatching is an example indicating that the grinding process of the corresponding region has been completed. (B) of FIG. 45 shows a state in which the grinding process is completed after 30 seconds have elapsed from the start of the grinding. In of FIG. 45, all the regions are hatched as an example indicating that all the grinding processes have been completed. As in the examples of (A) and (B) of FIG. 45, by displaying the progress of the grinding process, efficient work may be possible, such as preventing a customer from getting bored while waiting, or allowing a store clerk to do other work during that time.

(a) of FIG. 46 is a diagram showing an example of a porter filter used for producing an espresso beverage. A porter filter PF shown in (a) of FIG. 46 is of a naked type, and a metal basket. PFb (see (c) of FIG. 46) having a filter structure at a bottom surface is filled with ground beans, and the basket PFb is held by a cylindrical holding portion PFr. The holding portion PFh is provided with a handle PFh.

(b) of FIG. 46 is a diagram showing a state in which the basket PFb held by the holding portion PFr is attached to the chute GM31 of a coffee bean grinding machine with the handle PFh being held. Ground beans are discharged from the chute GM31, and the basket PFb is filled with the ground beans. This operation is referred to as dosing. The basket PFb may be fixed to a discharge port of the chute GM31 to save the time and effort required for an operator to hold and attach the handle PFh. Next, a leveling operation is performed such that the ground beans are evenly filled in the basket PFb. Finally, an operation of tamping is performed in which the evenly filled ground beans are pressed and packed.

(c) of FIG. 46 is a diagram schematically showing a state in which ground beans ground in a grinding way from a fine grinding state to a coarse grinding state are filled into the basket PFb and subjected to leveling and tamping.

(c) of FIG. 46 shows the basket PFb held by the holding portion PFr. A bottom surface PFf of the basket PFb has a filter structure. (c) of FIG. 46 schematically shows meshes Fi of the filter, but actually, the meshes Fi of the filter are finer meshes. A region on the bottom surface PFf side is filled with extra-fine around beans Bvt having a particle size of 200 μm as a peak in a particle size distribution. In (c) of FIG. 46, a state in which the extra-fine ground beans Bvt are filled is shown by fine cross-hatching. A region above the region is filled with medium-fine ground beans Bmt having a particle size of 600 μm as a peak in a particle size distribution. In (c) of FIG. 46, a state in which the medium-fine ground beans Bmt are filled is shown by coarse cross-hatching. That is, relatively fine ground beans are accommodated in a region close to the filter, and relatively coarse ground beans are accommodated in a region far from the filter.

When an extraction operation is performed using the porter filter PF prepared in this way, hot water is favorably drained in the region with a large particle size, and an extraction efficiency, which is an indicator of how the taste comes out, decreases. On the other hand, in the region with a signal particle size, the extraction efficiency is increased due to poor draining of hot water. Hot water poured from above (from a side opposite to the filter) first passes through the region where the extraction efficiency is low, and finally passes through a particle size where the extraction efficiency is high. Here, considering the opposite, it is expected that the poured hot water becomes a strong coffee beverage in a first region, coffee components are hardly extracted from ground beans having a large particle size in a last region, and the ground beans in the last region are likely to be wasted. This expectation is based on the fact that coffee components are easily extracted from hot water, but coffee components hardly extracted from a coffee beverage. The poured hot water first passes through the region with a low extraction efficiency, whereby a coffee beverage is sufficiently extracted from the ground beans in the region. However, the coffee beverage is weak. However, since the coffee beverage is weak, the coffee beverage has a margin in its concentration, and the coffee beverage is sufficiently extracted even when the poured hot water passes through the region with a high extraction efficiency. As described above in order to effectively utilize all of the ground beans in the porter filter PF, it is considered preferable that the closer the region to the filter, the finer the ground beans. In particular, it is effective in extracting a strong coffee beverage such as espresso.

Similarly, in the second grinder 5B in the beverage production device 1 shown in FIG. 1, the grinding way from a fine grinding state to a coarse grinding state or the grinding way from a coarse grinding state to a fine grinding state can be performed. In the beverage production device 1 shown in FIG. 1, ground beans are accommodated in the extraction container 9. The extraction container 9 is inverted, and at the time of accommodation of ground beans (before the extraction container 9 is inverted), relatively coarse ground beans are accommodated in a lower region, relatively fine ground beans are accommodated in an upper region. By the inversion of the extraction container 9, relatively fine ground beans are positioned in the lower region, and relatively coarse ground beans are positioned in the upper region. However, when the filter provided in the lid unit 91 shown in FIG. 6 and the like is viewed as a reference, similarly to the basket PFb, relatively fine ground beans are accommodated in a region close to the filter, and relatively coarse ground beans are accommodated in a region far from the filter.

A plurality of sets of grinding processes may be performed such that around beans for extraction for a plurality of times are around in one grinding start operation. In this way, a plurality of baskets PFb may be prepared, and a new basket PFb may be attached to the chute GM31 for each set.

In the example of (A) and (B) of FIG. 45, a display example has been described in which hatching spreads from the left side to the right side of the graph in a case where the grinding way from a fine grinding state to a coarse grinding state is specified, but in a case where the grinding way from a coarse grinding state to a fine grinding state is specified, unlike the example of (A) and (B) of FIG. 45, it is displayed that hatching spreads from the right side to the left side of the graph.

Further, in the above example, although the configuration in which the progress of the grinding process is displayed on the information display device 12 has been described, the progress of the grinding process may be displayed on the mobile terminal 17 that has transmitted the order information.

According to the above description, "a coffee bean grinding machine [for example, the coffee bean grinding machine GM shown in FIG. 18 or the beverage production device 1 shown in FIG. 1] including: a grinder configured to grind coffee beans [for example, the second grinder 5B]; and a container [for example, the basket PFb or the extraction container 9] configured to accommodate ground beans ground by the grinder, in which a set of grinding operations can be executed in response to a start operation by a user [for example, tapping of the grinding start button 124, pressing of the start button GM15, or an instruction to produce a coffee beverage], and the one set of grinding operations is an operation of grinding coffee beans to different particle sizes such that ground beans having a first particle size [for example, a relatively small particle size or a relatively large particle size] are accommodated in a first region [for example, a region relatively close to a filter or a region below the filter] of the container and ground beans having a second particle size [for example, a relatively large particle size or a relatively small particle size] are accommodated in a second region [for example, a region relatively far from the filter or a region above the filter] of the container" has been described.

The finer the particle size of the ground beans, the more difficult it is for hot water to be drained, which tends to increase the extraction efficiency. According to this coffee machine, by utilizing this tendency, regions in which ground beans having different particle sizes are accommodated are provided, and different regions can have different extraction efficiencies to improve the taste of the coffee beverage.

The amount of coffee beans to be ground by the one set of grinding operations may be an amount necessary for extracting one cup of coffee beverage, or may be an amount necessary for one extraction. The first particle size may be a particle size that is larger than the second particle size.

"The coffee bean grinding machine in which the first particle size is a particle size smaller than the second particle size" has also been described.

"The coffee bean grinding machine in which the container includes a filter [for example, meshes Fi of the filter provided on the bottom surface PFf shown in (c) of FIG. 46, or the filter provided on the lid unit 91 shown in FIG. 6 or the like], and the first region is a region closer to the filter than the second region in the container" has also been described.

The first region may be a region lower than the second region in the container.

"The coffee bean grinding machine further including a storage device [for example, the storage unit 11*b* shown in FIG. 10 or FIG. 19] capable of storing the one set of grinding operations as a recipe" has also been described.

"The coffee bean grinding machine in which in response to a start operation by a user, the one set of grinding operations can be executed a plurality of times [for example, ground beans for extraction for a plurality of times can be ground]" has also been described.

Further, "a coffee bean grinding machine system (for example, FIG. 10 or FIG. 19) including an external device (for example, the server 16 or the mobile terminal 17) capable of communicating with the coffee bean grinding machine" has also been described.

"A grinding method of coffee beans including: a first step of accommodating ground beans having a first particle size [for example, a relatively small particle size or a relatively large particle size] in a first region [for example, a region relatively close to a filter or a region below the filter] of a container [for example, the basket PFb or the extraction container 9], and a second step of accommodating ground beans having a second particle size [for example, a relatively large particle size or a relatively small particle size] in a second region [for example, a region relatively far from the filter or a region above the filter] of the container" has also been described.

Next, a combination of the first grinder 5A and the second grinder 5B will be described.

As shown in FIG. 25 and the like, the first grinder 5A and the second grinder 5B are provided in series on the upstream side and the downstream side when viewed in a conveying direction of coffee beans. The first grinder 5A is capable of grinding coffee beans having a large particle size more accurately than the second grinder 5B, and the second grinder 5B is capable of grinding coffee beans having a small particle size more accurately than the first grinder 5A. More specifically, the first grinder 5A crushes roasted coffee beans to a predetermined size (for example, about ¼) to obtain cracked beans. The second grinder 5E grinds the cracked beans crushed by the first grinder 5A into ground beans having a desired particle size. For example, the second grinder 5B can perform coarse grinding, medium grinding, medium-fine grinding, fine grinding, and extra-fine grinding, and the first grinder 5A cannot grind as finely as coarse grinding. However, in order to facilitate separation of a waste adhering to coffee beans, it is preferable to crush the coffee beans to a predetermined size by the first grinder 5A.

However, if the ease of separation of a waste such as chaff and fine powder by the separation device 6 is ignored, it is also possible to perform a grinding process of coffee beans only by the second grinder 5B without driving the first grinder 5A.

(a) of FIG. 47 is a perspective view showing the single rotary blade 58*a* constituting the first grinder 5A.

The rotary blade 58*a* is provided with a guide passage 58*ag* extending obliquely downward around a rotation shaft 58*as* from each of the four blades 58*a*1 to 58*a*4. As shown in (a) of FIG. 47, when the rotary blade 58*a* does not rotate, the roasted coffee beans B fed from the reservoir device 4 pass through the guide passage 58*aq* and are fed to the second grinder 5B while maintaining their shapes and sizes.

Then, the roasted coffee beans B are ground to a desired particle size by the second grinder 5B. In this case, the pulverizing is not performed in two stages by the first grinder 5A and the second grinder 5B, but is performed in one stage by only the second grinder 5B.

Instead of the first grinder 5A, the same grinder as the second grinder 5B may be provided, and the grinder on the upstream side may also be able to perform coarse grinding, medium grinding, medium-fine grinding, fine grinding, and extra-fine grinding. In this case, for example, coarse grinding may be performed by the grinder on the upstream side, wastes may be separated by the separation device 6, and then fine grinding below medium grinding may be performed by the second grinder 5B. Alternatively, medium-fine grinding may be performed by the grinder on the upstream side, wastes may be separated by the separation device 6, and then ground beans subjected to the medium-fine grinding may be discharged from the chute GM31 without performing the grinding process in the second grinder 5B.

(b) of FIG. 47 is a diagram showing a modification of the pulverizing device 5 shown in FIG. 25 and the like.

In the pulverizing device 5 shown in FIG. 25 and the like, two grinders are disposed in series, but in a pulverizing device 5' of this modification, two grinders on a downstream side among three grinders are disposed in parallel. The first grinder 5A is disposed on a downstream side of the reservoir device 4 shown in (b) of FIG. 47. In the pulverizing device 5 shown in FIG. 25 and the like, the forming unit 6B is provided downstream of the first grinder 5A, but in this modification, the forming unit 6B is omitted, and a cylindrical guiding passage 60 is provided. Two second grinders 5B to which the coupling ducts 661 are respectively connected are disposed on a downstream side of the guiding passage 6C. The guiding passage 60 is a passage through which cracked beans subjected to the grinding process by the first grinder 5A are distributed to any one of the two second grinders 5B. The number of the second grinders 5B is not limited to two, and may be three or more. Passage switching of the guiding passage 6C is executed by the processing unit 11a shown in FIG. 19. The passage switching of the guiding passage 60 may be performed manually. Alternatively, the passage switching may be performed in response to an instruction from an external terminal such as the mobile terminal 17. In this modification, a selection step of selecting a grinder for grinding coffee beans from a total of three grinders such as one first grinder 5A and two second grinders 5B provided in the coffee bean grinding machine GM, a supply step of supplying coffee beans to the selected grinder, and a grinding step of grinding the coffee beans supplied in the supply step with the grinder are executed. In the supply step, when one of the two second grinders 5B is selected, coffee beans are supplied to the selected second grinder 5B through the guiding passage 60. In the selection step, the one first grinder 5A is freely selected, but in the selection of two second grinders 5B, one of the second grinders 5B may always be selected. Alternatively, when the two second grinder 5B are not selected, coffee beans may be directly discharged from the guiding passage 60.

According to this modification, since a plurality of second grinders 5B are installed, grinding processes by the second grinders 5B can be performed in parallel. For example, in the control of the input amount of ground beans to the second grinder 5B described with reference to FIG. 37, when it becomes necessary to reduce the input amount to the first second grinder 5B, by switching the guiding passage 60 and starting the input to the second grinder 5B, it is no longer necessary to reduce the input amount, and a reduction in the efficiency of the grinding process can be avoided.

Although the forming unit 6B is omitted in the modification shown in (b) of FIG. 47, the forming unit 6B may be provided at an upstream end of the guiding passage 60, and wastes may be separated after the passage switching is completed. In addition, an aspect may be adopted in which a fixed passage is provided instead of the switchable guiding passage 60, and the grinder is switched by a plurality of provided second grinders 5B moving to a downstream end of the fixed passage. Further, instead of providing a plurality of grinders having the same function in parallel, a plurality of grinders having different functions may be provided in parallel. For example, a grinder dedicated to coarse grinding, a grinder dedicated to medium grinding, a grinder dedicated to medium-fine grinding, a grinder dedicated to fine grinding, and a grinder dedicated to extra-fine grinding may be provided in parallel so as to be selectable. In addition, the first grinder 5A on the upstream side may be omitted. Alternatively, a grinder may be further provided downstream of the second grinder 5B. The number of grinders provided downstream of the second grinder 5B may be one or more. In the case of a plurality of grinders, the grinders may be disposed in series or in parallel.

The aspect of the pulverizing device 5 described above with reference to FIG. 47 is also applicable to the pulverizing device of the beverage production device 1 shown in FIG. 1.

According to the above description, "a coffee bean grinding machine [for example, the coffee bean grinding machine GM shown in FIG. 18 or the beverage production device 1 shown in FIG. 1] including a plurality of grinders [for example, the first grinder 5A and the second grinder 5B in a serial relation or a plurality of second grinders 5B in a parallel relation], in which a grinder for grinding coffee beans is selectable from the plurality of grinders [for example, both the first grinder 5A and the second grinder 5B in a serial relation are selected, only the second grinder 5B is selected, or the plurality of second grinders 5B in a parallel relation are selected one by one]" has been described.

According to this coffee bean grinding machine, since the grinder for grinding coffee beans can be selected from a plurality of grinders, it is easier to meet a demand for a larger number of grinding processes than a coffee bean grinding machine in the related art.

The number of grinders to be selected may be one or more.

"The coffee bean grinding machine in which the plurality of grinders include a first grinder [for example, the first grinder 5A] and a second grinder [for example, the second grinder 5B], and it is possible to select whether to grind coffee beans by one of the first grinder and the second grinder [for example, only the second grinder 5B] or both of the first grinder and the second grinder [for example, the first grinder 5A and the second grinder 5B]" has also been described.

"The coffee bean grinding machine in which the first grinder is capable of grinding coffee beans more accurately and coarsely than the second grinder [for example, roasted coffee beans are crushed to a predetermined size (for example, about ¼)], and the second grinder is capable of grinding coffee beans more accurately and finely than the first grinder [for example, coarse grinding, medium grinding, medium-fine grinding, fine grinding, and extra-fine grinding can be performed]" has also been described.

"The coffee bean grinding machine in which when coffee beans are ground by both the first grinder [for example, the first grinder 5A] and the second grinder [for example, the second gi-der 5B], the coffee beans ground by the first grinder [for example, the first grinder 5A on the upstream side] are further finely ground by the second grinder [for example, the second grinder 5B on the downstream side]" has also been described.

"The coffee bean grinding machine in which when coffee beans are ground by one of the first grinder [for example, the second grinder 5B on the left side shown in (b) of FIG. 47] and the second grinder [for example, the second grinder 5B on the right side shown in (b) of FIG. 47], the coffee beans are guided to the one grinder [for example, guided by the guiding passage 60]" has also been described.

That is, one of the first grinder and the second grinder may be provided with a guiding passage [for example, the guiding passage 6C shown in (b) of FIG. 47] for guiding coffee beans. Coffee beans may be guided to the one grinder by the movement of the guiding passage with respect to the one grinder, coffee beans may be guided to the one grinder by the movement of the one grinder with respect to the guiding passage, or coffee beans may be guided to the one grinder by the movement of the guiding passage and the movement of the one grinder.

Further, "a coffee bean grinding machine system (for example, FIG. 10 or FIG. 19) including an external device (for example, the server 16 or the mobile terminal 17) capable of communicating with the coffee bean grinding machine" has also been described.

"A grinding method of coffee beans including: a selection step of selecting a grinder for grinding coffee beans from a plurality of grinders provided in a coffee bean grinding machine; a supply step of supplying coffee beans to the selected grinder; and a grinding step of grinding the coffee beans supplied in the supply step with the grinder" has also been described.

The number of grinders to be selected may be one or more.

The present invention is not limited to the embodiments and examples described above, and the contents thereof can be combined with each other without departing from the spirit of the present invention, and may be partially changed according to an object or the like. The individual terms described in the present specification are merely used for describing the present invention, and it is needless to say that the present invention is not limited to the strict meaning of the terms, and can include equivalents thereof. For example, expressions such as "device" and "portion" may be rephrased as "unit", "module", or the like.

REFERENCE SIGNS LIST 1 beverage production device
2 bean processing device
3 extraction device
4 reservoir device
401 canister accommodation unit
402 hopper unit
403 funnel unit
404 weighing unit
5 pulverizing device
5A first grinder
57a fixed blade
58a rotary blade
5B second grinder
57b fixed blade
58b rotary blade
6 separation device
6A suction unit
6B forming unit
60 guiding passage
60 suction unit
60B collection container
60Bo outer case
60Bi inner case
6io opening
695 manual setting disc dial
696 fine adjustment knob dial
698 lever member
7 fluid supply unit
9 extraction container
11 control device
11a processing unit
12 information display device
17 mobile terminal
GM coffee bean grinding machine
GM10 center casing
GM11 option attachment portion
GM20 bean outlet
GM21 lid unit
GM22 guide passage forming member
PF porter filter
PFb basket

The invention claimed is:

1. A coffee machine, comprising:
a first grinder configured to grind coffee beans by rotation of a first motor;
a second grinder disposed downstream of the first grinder, and configured to grind the coffee beans which are ground by the first grinder by rotation of a second motor;
a storage that stores a recipe which specifies information on various conditions for grinding coffee beans; and
a processor that controls rotation speed of the first and the second motors based on the recipe, wherein
the first motor and the second motor are different motors,
the processor controls the rotation speed of the first motor separately from the rotation speed of the second motor, and
the processor changes the rotation speed of the first motor according to a type of coffee beans specified in the recipe, and controls an input amount of coffee beans input to the second grinder from the first grinder.

2. The coffee machine according to claim 1, wherein the first grinder is a grinder for coarse grinding, and the second grinder is a grinder for fine grinding.

3. The coffee machine according to claim 1, wherein the first motor stops rotation before the second motor stops rotation.

* * * * *